(12) United States Patent
Masi et al.

(10) Patent No.: US 11,412,012 B2
(45) Date of Patent: Aug. 9, 2022

(54) METHOD, APPARATUS, AND COMPUTER-READABLE MEDIUM FOR DESKTOP SHARING OVER A WEB SOCKET CONNECTION IN A NETWORKED COLLABORATION WORKSPACE

(71) Applicant: Re Mago Holding LTD, London (GB)

(72) Inventors: Marco Valerio Masi, Lugano Paradiso (CH); Cristiano Fumagalli, Segrate (IT)

(73) Assignee: RE MAGO HOLDING LTD, London (GB)

( * ) Notice: Subject to any disclaimer, the term of this patent is extended or adjusted under 35 U.S.C. 154(b) by 726 days.

(21) Appl. No.: 15/995,878

(22) Filed: Jun. 1, 2018

(65) Prior Publication Data

US 2019/0068661 A1 Feb. 28, 2019

Related U.S. Application Data

(63) Continuation-in-part of application No. 15/685,533, filed on Aug. 24, 2017, now Pat. No. 10,380,038.

(51) Int. Cl.
*H04L 65/401* (2022.01)
*H04L 67/02* (2022.01)
*H04L 67/131* (2022.01)

(52) U.S. Cl.
CPC .......... *H04L 65/4015* (2013.01); *H04L 67/02* (2013.01); *H04L 67/38* (2013.01)

(58) Field of Classification Search
CPC ...... H04L 65/4015; H04L 67/38; H04L 67/02
See application file for complete search history.

(56) References Cited

U.S. PATENT DOCUMENTS

| 5,867,161 A | * | 2/1999 | Walsh | G06F 3/0481 715/808 |
| 2015/0007063 A1 | * | 1/2015 | DeGrazia | G06Q 10/10 715/753 |
| 2017/0024100 A1 | * | 1/2017 | Pieper | H04L 65/80 |

* cited by examiner

*Primary Examiner* — Benjamin R Bruckart
*Assistant Examiner* — Akshay Doshi
(74) *Attorney, Agent, or Firm* — Amardeep S. Grewal; Reed Smith LLP

(57) ABSTRACT

A system, method and computer-readable medium for desktop sharing over a web socket connection in a networked collaboration workspace, including transmitting a representation of a collaboration workspace hosted on a server and accessible to participants over a web socket connection, receiving a request to share at least one portion of a local desktop of a local computing device within the collaboration workspace and a selection of an area within the representation of the collaboration workspace, generating a streaming object configured to output a video stream of the at least one portion of the local desktop of the local computing device, and transmitting one or more commands to the server over the web socket connection, the one or more commands comprising the streaming object and information corresponding to the selected area and being configured to cause the server to insert the streaming object into the collaboration workspace at the selected area.

20 Claims, 43 Drawing Sheets

METHOD, APPARATUS, AND COMPUTER-READABLE MEDIUM FOR DESKTOP SHARING OVER A WEB SOCKET CONNECTION IN A NETWORKED COLLABORATION WORKSPACE

BACKGROUND

This application is a continuation-in-part of U.S. application Ser. No. 15/685,533, titled "METHOD, APPARATUS, AND COMPUTER-READABLE MEDIUM FOR IMPLEMENTATION OF A UNIVERSAL HARDWARE-SOFTWARE INTERFACE" and filed Aug. 24, 2017, the disclosure of which is hereby incorporated by reference in its entirety.

BACKGROUND

Operating systems and applications executing within operating systems frequently make use of external hardware devices to allow users to provide input to the program and to provide output to users. Common examples of external hardware devices include a keyboard, a computer mouse, a microphone, and external speakers. These external hardware devices interface with the operating system through the use of drivers, which are specialized software programs configured to interface between the hardware commands used by a particular hardware device and the operating system.

Applications will sometimes be designed to interface with certain hardware devices. For example, a voice-to-text word processing application can be designed to interface with an audio headset including a microphone. In this case, the application must be specifically configured to receive voice commands, perform voice recognition, convert the recognized words into textual content, and output the textual content into a document. This functionality will typically be embodied in the application's Application Programming Interface (API), which is a set of defined methods of communication between various software components. In the example of the voice recognition application, the API can include an interface between the application program and software on a driver that is responsible for interfacing with the hardware device (the microphone) itself.

One problem with existing software that makes use of specialized hardware devices is that the application or operating system software itself must be customized and specially designed in order to utilize the hardware device. This customization means that the hardware device cannot exceed the scope defined for it by the application and cannot be utilized for contexts outside the specific application for which it was designed to be used. For example, a user of the voice-to-text word processing application could not manipulate other application programs or other components within the operating system using voice commands unless those other application programs or the operating system were specifically designed to make use of voice commands received over the microphone.

FIG. 1 illustrates an example of the existing architecture of systems which make use of coupled hardware devices for user input. The operating system 100A of FIG. 1 includes executing applications 101A and 102A, each of which have their own APIs, 101B and 102B, respectively. The operating system 100A also has its own API 100B, as well as specialized drivers 100C, 101C, and 102C, configured to interface with hardware devices 100D, 101D, and 102D.

As shown in FIG. 1, application API 101B is configured to interface with driver 101C which itself interfaces with hardware device 101D. Similarly, application API 102B is configured to interface with driver 102C which itself interfaces with hardware device 102D. At the operating system level, the operating system API 100B is configured to interface with driver 100C, which itself interfaces with hardware device 100D.

The architecture of the system shown in FIG. 1 limits the ability of users to utilize hardware devices outside of certain application or operating system contexts. For example, a user could not utilize hardware device 101D to provide input to application 102A and could not utilize hardware device 102D to provide input to application 101A or to the operating system 100A.

Accordingly, improvements are needed in hardware-software interfaces which allow for utilization of hardware devices in multiple software contexts.

DETAILED DESCRIPTION

While methods, apparatuses, and computer-readable media are described herein by way of examples and embodiments, those skilled in the art recognize that methods, apparatuses, and computer-readable media for implementation of a universal hardware-software interface are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium that solves the problems associated with previous hardware-software interfaces used for hardware devices. In particular, Applicant has developed a universal hardware-software interface which allows users to utilize communicatively-coupled hardware devices in a variety of software contexts. The disclosed implementation removes the need for applications or operating systems to be custom designed to interface with a particular hardware device through the use of a specialized virtual driver and a corresponding transparent layer, as is described below in greater detail.

Figure 1:
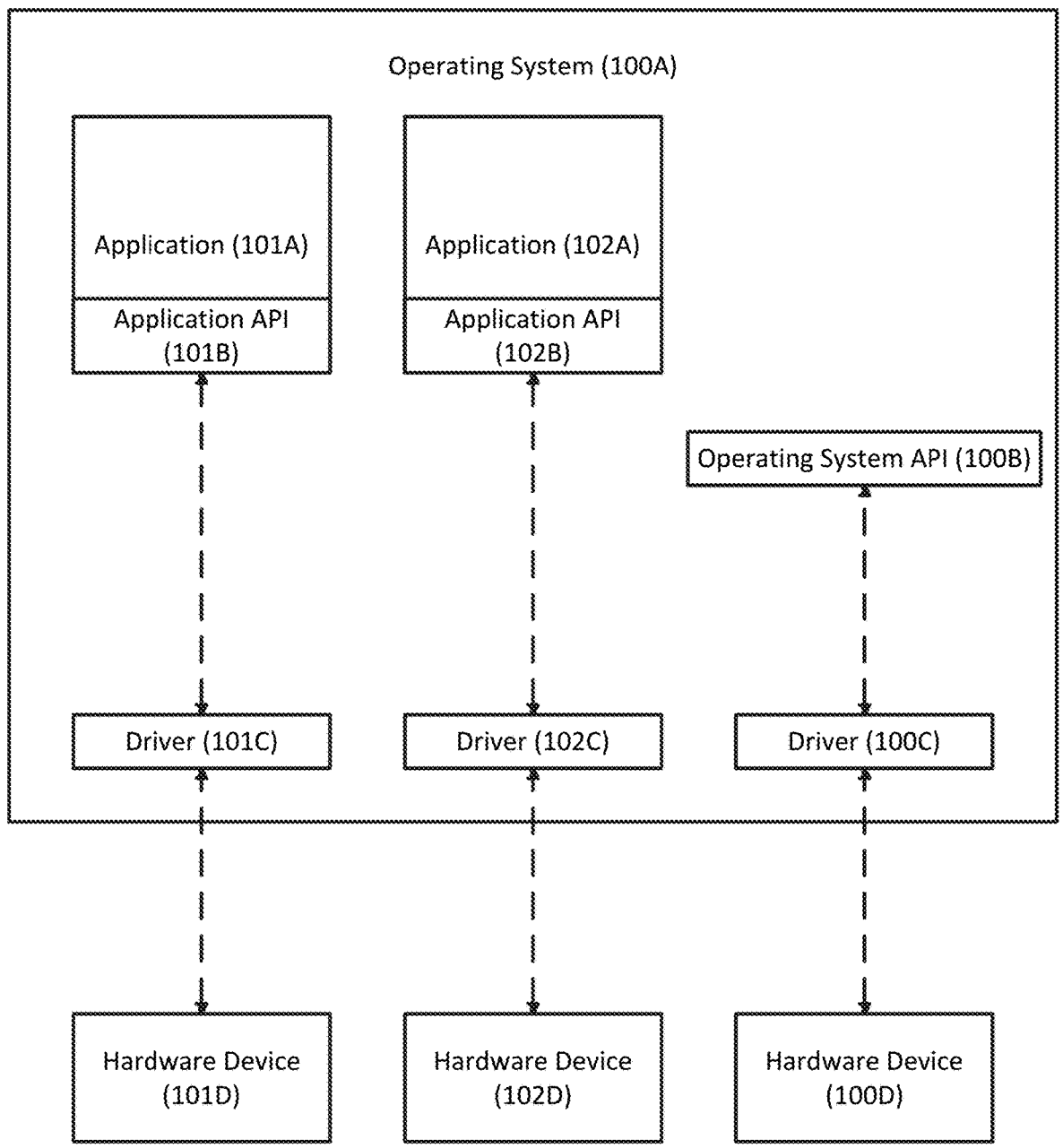
FIG. 1 illustrates an example of the existing architecture of systems which make use of coupled hardware devices for user input.
Figure 2:
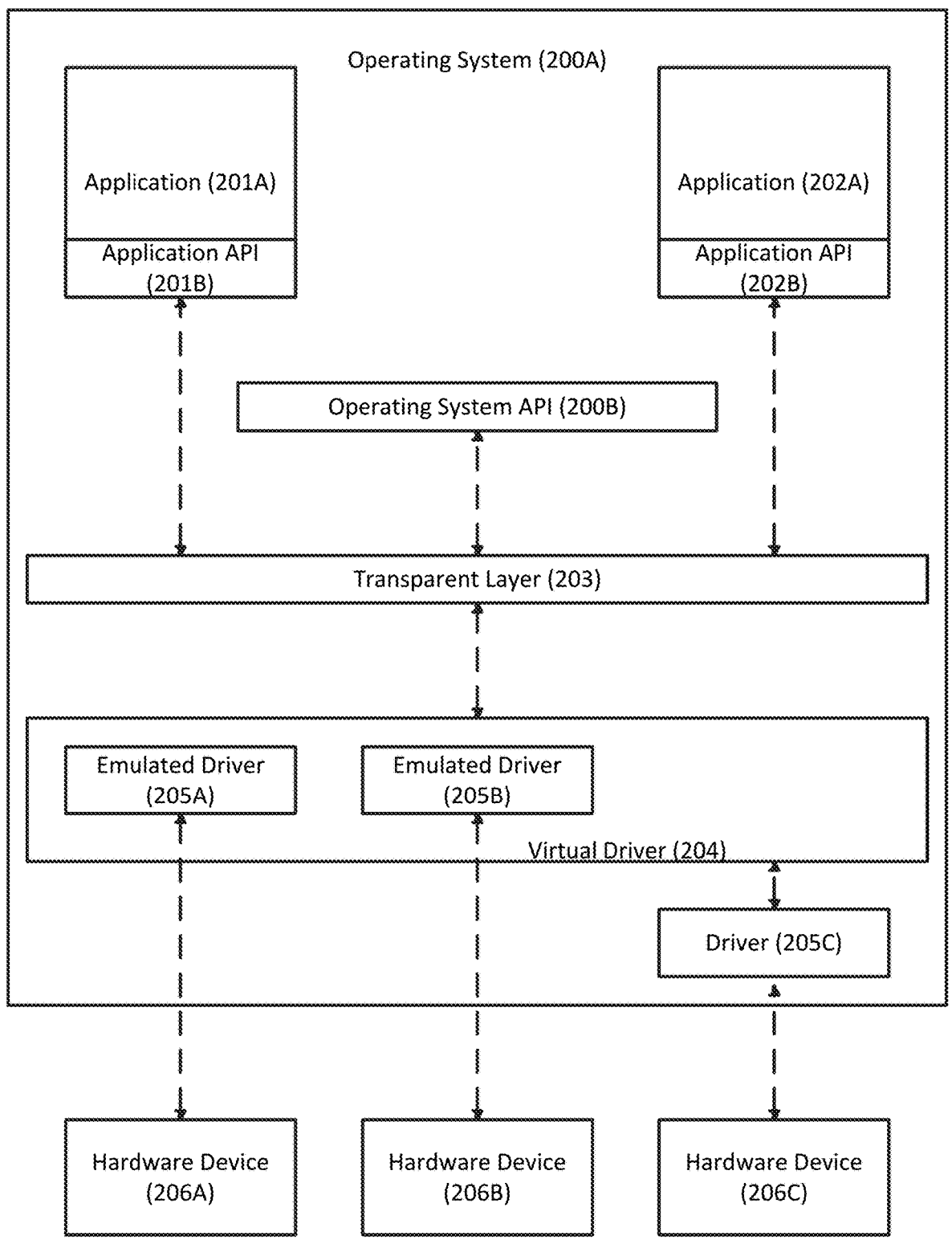
FIG. 2 illustrates the architecture of a system utilizing the universal hardware-software interface according to an exemplary embodiment.

FIG. 2 illustrates the architecture of a system utilizing the universal hardware-software interface according to an exemplary embodiment. As shown in FIG. 2, the operating system 200A includes a transparent layer 203 which communicates a virtual driver 204. As will be explained in greater detail below, the transparent layer 203 is an API configured to interface between a virtual driver and an operating system and/or application(s) executing on the operating system. In this example, the transparent layer 203 interfaces between the virtual driver 204 and API 201B of application 201A, API 202 B of application 202A, and operating system API 200B of operating system 200A.

The transparent layer 203 can be part of a software process running on the operating system and can have its own user interface (UI) elements, including a transparent UI superimposed on an underlying user interface and/or visible UI elements that a user is able to interact with.

The virtual driver 204 is configured to emulate drivers 205A and 205B, which interface with hardware devices 206A and 206B, respectively. The virtual driver can receive user input that instructs the virtual driver on which virtual driver to emulate, for example, in the form of a voice command, a selection made on a user interface, and/or a gesture made by the user in front of a coupled web camera. For example, each of the connected hardware devices can operate in a "listening" mode and each of the emulated drivers in the virtual driver 204 can be configured to detect an initialization signal which serves as a signal to the virtual driver to switch to a particular emulation mode. For example, a user stating "start voice commands" can activate the driver corresponding to a microphone to receive a new voice command. Similarly, a user giving a certain gesture can activate the driver corresponding to a web camera to receive gesture input or touch input.

The virtual driver can also be configured to interface with a native driver, such as native driver 205C, which itself communicates with hardware device 206C. In one example, hardware device 206C can be a standard input device, such as a keyboard or a mouse, which is natively supported by the operating system.

The system shown in FIG. 2 allows for implementation of a universal hardware-software interface in which users can utilize any coupled hardware device in a variety of contexts, such as a particular application or the operating system, without requiring the application or operating system to be customized to interface with the hardware device.

For example, hardware device 206A can capture information which is then received by the virtual driver 204 emulating driver 205A. The virtual driver 204 can determine a user input based upon the captured information. For example, if the information is a series of images of a user moving their hand, the virtual driver can determine that the user has performed a gesture.

Based upon an identified context (such as a particular application or the operating system), the user input can be converted into a transparent layer command and transmitted to the transparent layer 203 for execution. The transparent layer command can include native commands in the identified context. For example, if the identified context is application 201A, then the native commands would be in a format that is compatible with application API 201B of application 201A. Execution of the transparent layer command can then be configured to cause execution of one or more native commands in the identified context. This is accomplished by the transparent layer 203 interfacing with each of the APIs of the applications executing on the operating system 200A as well as the operating system API 200B. For example, if the native command is an operating system command, such as a command to launch a new program, then the transparent layer 203 can provide that native command to the operating system API 200B for execution.

As shown in FIG. 2, there is bidirectional communication between all of the components shown. This means, for example, that execution of a transparent layer command in the transparent layer 203 can result in transmission of information to the virtual driver 204 and on to one of the connected hardware devices. For example, after a voice command is recognized as input, converted to a transparent layer command including a native command, and executed by the transparent layer (resulting in execution of the native command in the identified context), a signal can be sent from the transparent layer to a speaker (via the virtual driver) to transmit the sound output "command received."

Of course, the architecture shown in FIG. 2 is for the purpose of explanation only, and it is understood that the number of applications executing, number and type of connected hardware devices, number of drivers, and emulated drivers can vary.

Figure 3:
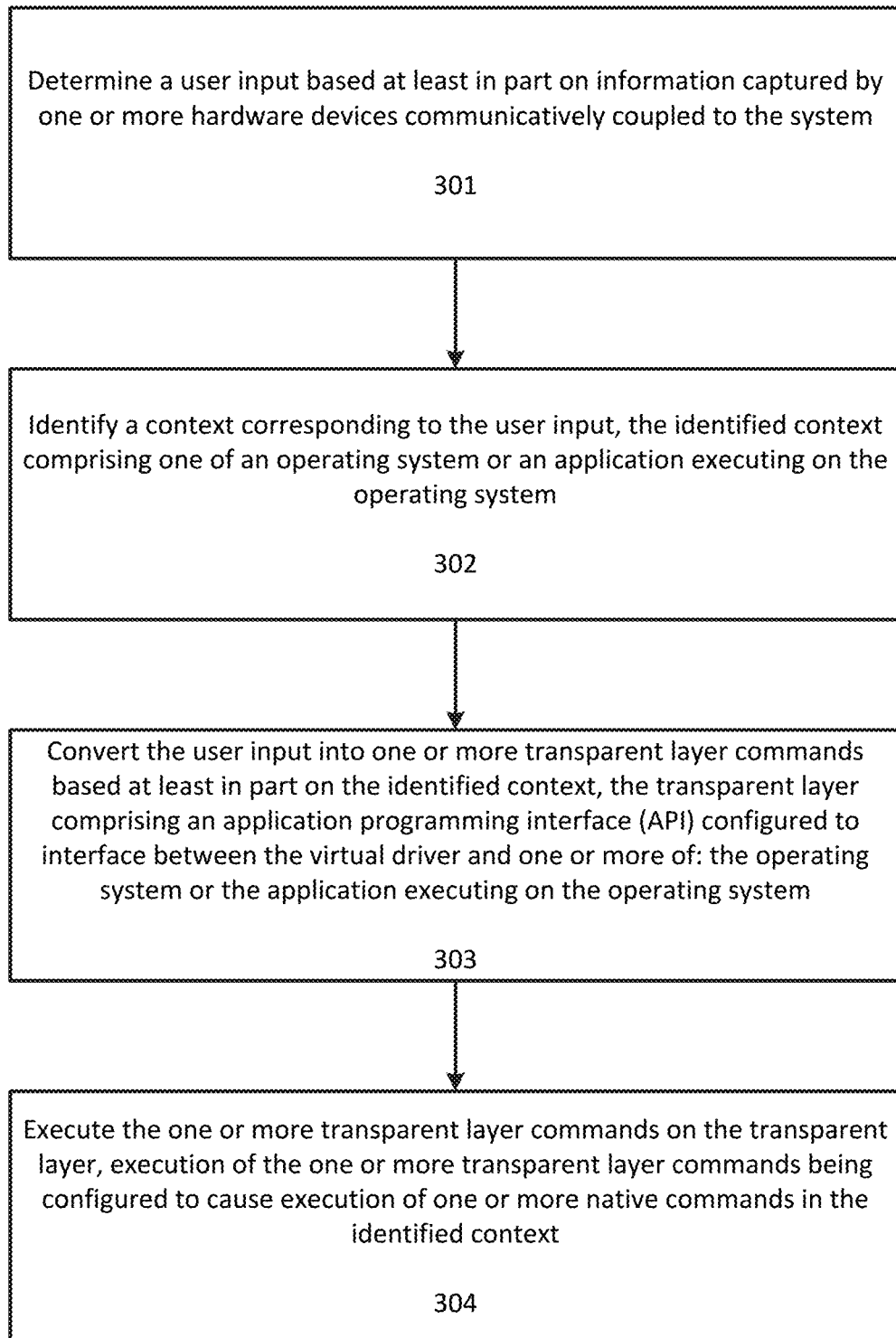
FIG. 3 illustrates a flowchart for implementation of a universal hardware-software interface according to an exemplary embodiment.

FIG. 3 illustrates a flowchart for implementation of a universal hardware-software interface according to an exemplary embodiment.

At step 301 a user input is determined based at least in part on information captured by one or more hardware devices communicatively coupled to the system. The system, as used herein, can refer to one or more computing devices executing the steps of the method, an apparatus comprising one or more processors and one or more memories executing the steps of the method, or any other computing system.

The user input can be determined by a virtual driver executing on the system. As discussed earlier, virtual driver can be operating in an emulation mode in which it is emulating other hardware drivers and thereby receiving the captured information from a hardware device or can optionally receive the captured information from one or more other hardware drivers which are configured to interface with a particular hardware device.

A variety of hardware devices can be utilized, such as a camera, a video camera, a microphone, a headset having bidirectional communication, a mouse, a touchpad, a trackpad, a controller, a game pad, a joystick, a touch screen, a motion capture device including accelerometers and/or a tilt sensors, a remote, a stylus, or any combination of these devices. Of course, this list of hardware devices is provided by way of example only, and any hardware device which can be utilized to detect voice, image, video, or touch information can be utilized.

The communicative coupling between the hardware devices and the system can take a variety of forms. For example, the hardware device can communicate with the system via a wireless network, Bluetooth protocol, radio frequency, infrared signals, and/or by a physical connection such as a Universal Serial Bus (USB) connection. The communication can also include both wireless and wired communications. For example, a hardware device can include two components, one of which wirelessly (such as over Bluetooth) transmits signals to a second component which itself connects to the system via a wired connection (such as USB). A variety of communication techniques can be utilized in accordance with the system described herein, and these examples are not intended to be limiting.

The information captured by the one or more hardware devices can be any type of information, such as image information including one or more images, frames of a video, sound information, and/or touch information. The captured information can be in any suitable format, such as .wav or .mp3 files for sound information, .jpeg files for images, numerical coordinates for touch information, etc.

The techniques described herein can allow for any display device to function effectively as a "touch" screen device in any context, even if the display device does not include any hardware to detect touch signals or touch-based gestures. This is described in greater detail below and can be accomplished through analysis of images captured by a camera or a video camera.

Figure 4:
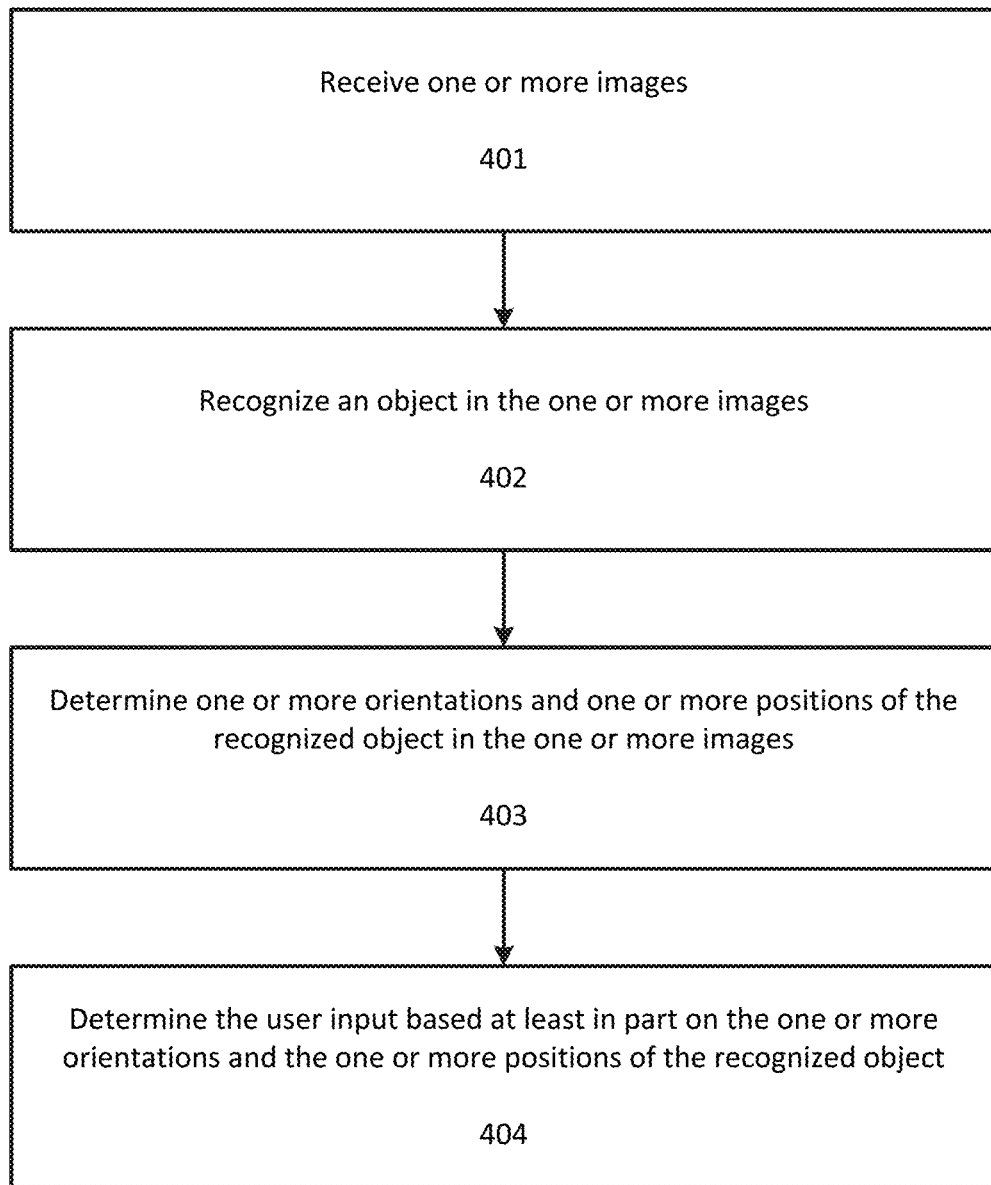
FIG. 4 illustrates a flowchart for determining a user input based at least in part on information captured by one or more hardware devices communicatively coupled to the system when the information captured by the one or more hardware devices comprises one or more images according to an exemplary embodiment.

FIG. 4 illustrates a flowchart for determining a user input based at least in part on information captured by one or more hardware devices communicatively coupled to the system when the information captured by the one or more hardware devices comprises one or more images.

At step 401 one or more images are received. These images can be captured by a hardware device such as a camera or video camera and can be received by the virtual driver, as discussed earlier.

At step 402 an object in the one or more images is recognized. The object can be, for example, a hand, finger, or other body part of a user. The object can also be a special purpose device, such as a stylus or pen, or a special-purpose hardware device, such as a motion tracking stylus/remote which is communicatively coupled to the system and which contains accelerometers and/or tilt sensors. The object recognition can be performed by the virtual driver can be based upon earlier training, such as through a calibration routine run using the object.

Figure 5A:
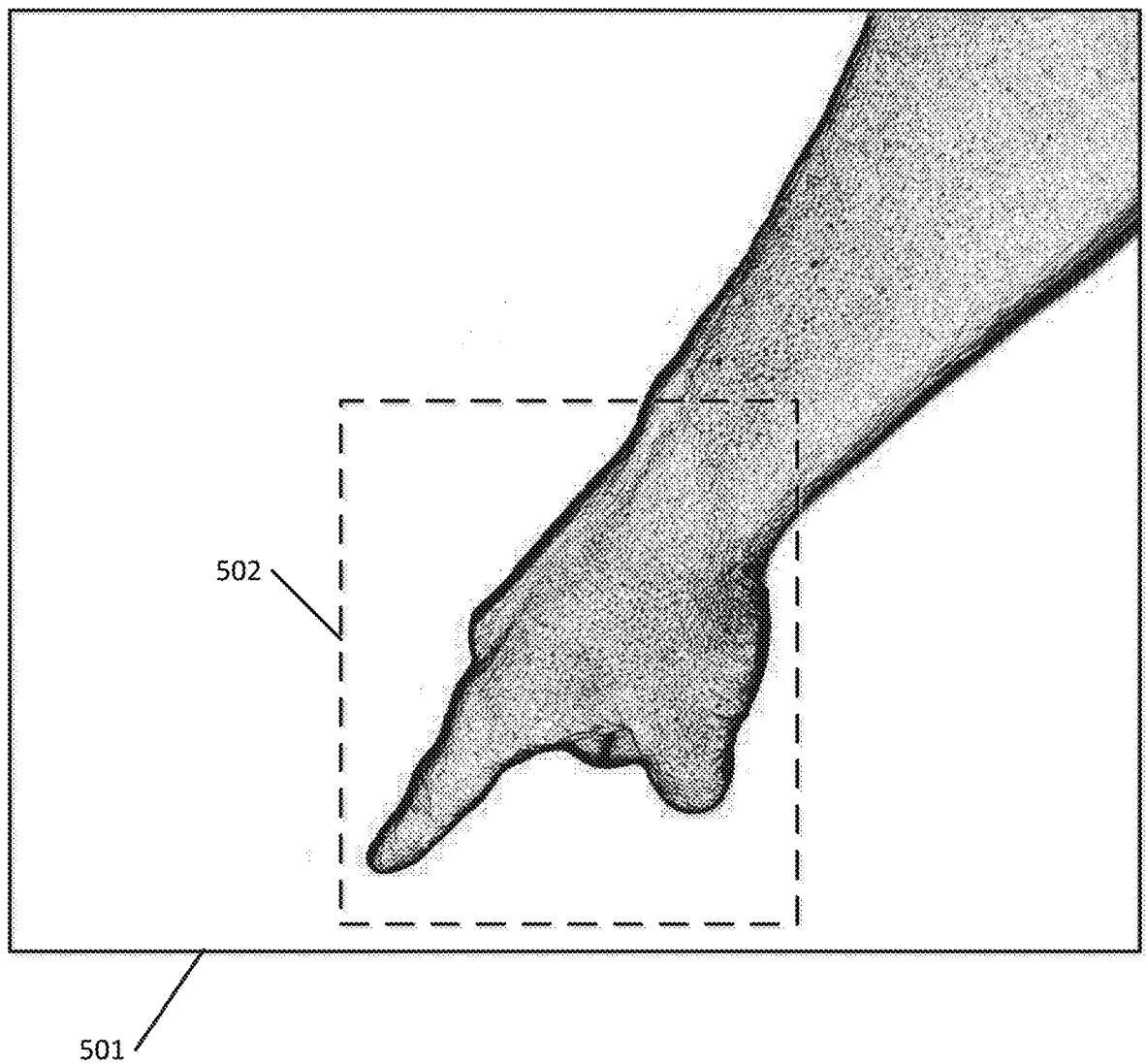
FIG. 5A illustrates an example of object recognition according to an exemplary embodiment.

FIG. 5A illustrates an example of object recognition according to an exemplary embodiment. As shown in FIG. 5A, image 501 includes a hand of the user that has been recognized as object 502. The recognition algorithm could of course be configured to recognize a different object, such as a finger.

Returning to FIG. 4, at step 403 one or more orientations and one or more positions of the recognized object are determined. This can be accomplished in a variety of ways. If the object is not a hardware device and is instead a body part, such as a hand or finger, the object can be mapped in a three-dimensional coordinate system using a known location of the camera as a reference point to determine the three dimensional coordinates of the object and the various angles relative to the X, Y, and Z axes. If the object is a hardware device and includes motion tracking hardware such as an accelerometer and/or tilt sensors, then the image information can be used in conjunction with the information indicated by the accelerometer and/or tilt sensors to determine the positions and orientations of the object.

At step 404 the user input is determined based at least in part on the one or more orientations and the one or more positions of the recognized object. This can include determining location coordinates on a transparent user interface (UI) of the transparent layer based at least in part the on the one or more orientations and the one or more positions. The transparent UI is part of the transparent layer and is superimposed on an underlying UI corresponding to the operating system and/or any applications executing on the operating system.

Figure 5B:
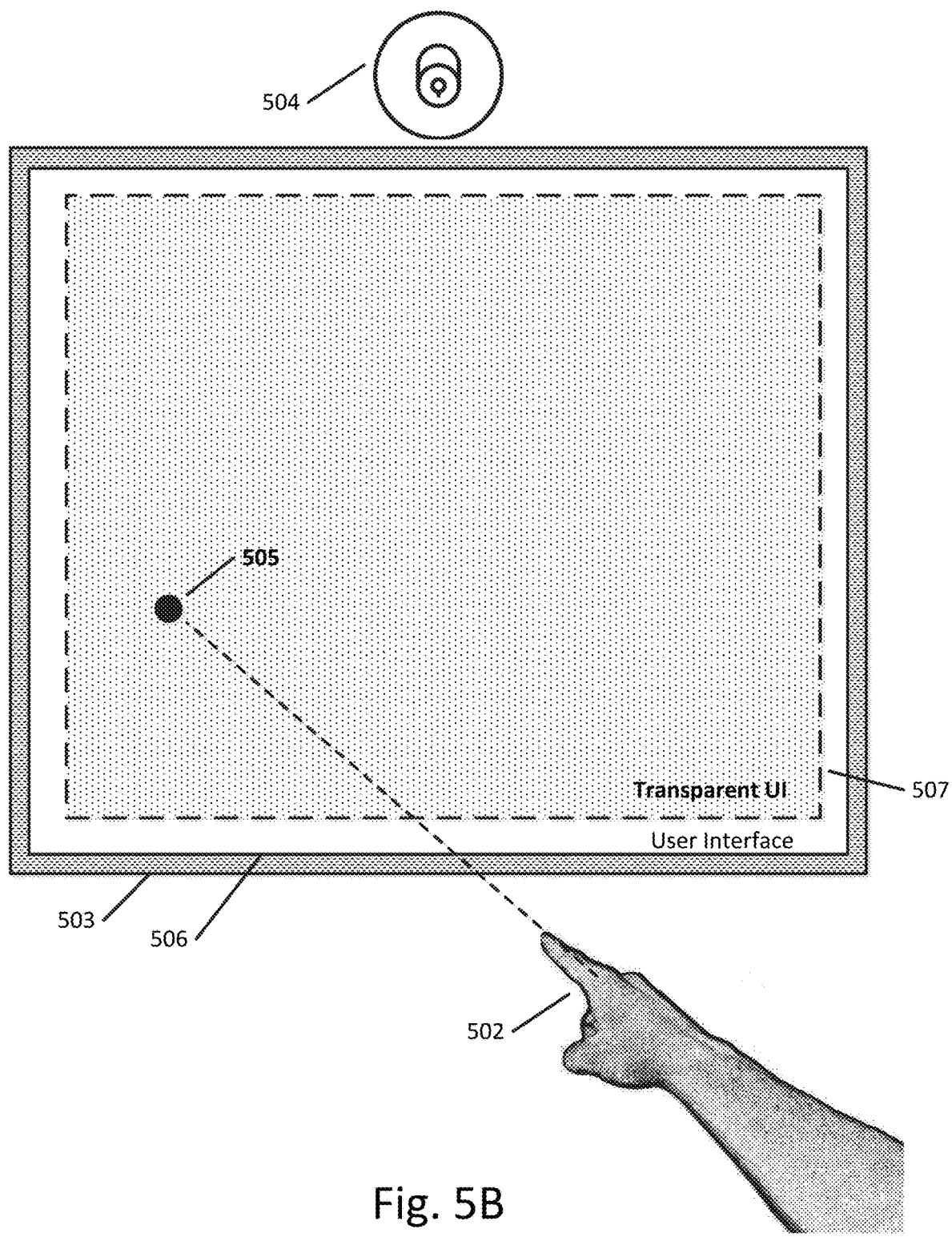
FIG. 5B illustrates an example of determining input location coordinates according to an exemplary embodiment.

FIG. 5B illustrates an example of this step when the object is a user's finger. As shown in FIG. 5B, display device 503 includes an underlying UI 506 and a transparent UI 507 superimposed over the underlying UI 506. For the purpose of clarity, the transparent UI 507 is shown with dot shading, but it is understood that in practice the transparent UI is a transparent layer that is not visible to the user. Additionally, the transparent UI 507 is shown as slightly smaller than the underlying UI 506 but it is understood that in practice the transparent UI would cover the same screen area as the underlying UI.

As shown in FIG. 5B, the position and orientation information of the object (the user's finger) is used to project a line onto the plane of the display device 503 and determine an intersection point 505. The image information captured by camera 504 and the known position of the display device 503 under the camera can be used to aid in this projection. As shown in FIG. 5B, the user input is determined to be input coordinates at the intersection point 505.

As will be discussed further below, the actual transparent layer command that is generated based on this input can be based upon user settings and/or an identified context. For example, the command can be a touch command indicating that an object at the coordinates of point 505 should be selected and/or opened. The command can also be a pointing command indicating that a pointer (such as a mouse pointer) should be moved to the coordinates of point 505. Additionally, the command can be an edit command which modifies the graphical output at the location (such as to annotate the interface or draw an element).

While FIG. 5B shows the recognized object 502 as being at some distance from the display device 503, a touch input can be detected regardless of the distance. For example, if the user were to physically touch the display device 503, the technique described above would still determine the input coordinates. In that case, the projection line between object 502 and the intersection point would just be shorter.

Of course, touch inputs are not the only type of user input that can be determined from captured images. The step of determining a user input based at least in part on the one or more orientations and the one or more positions of the recognized object can include determining gesture input. In particular, the positions and orientations of a recognized object across multiple images could be analyzed to determine a corresponding gesture, such as a swipe gesture, a pinch gesture, and/or any known or customized gesture. The user can calibrate the virtual driver to recognize custom gestures that are mapped to specific contexts and commands within those contexts. For example, the user can create a custom gesture that is mapped to an operating system context and results in the execution of a native operating system command which launches a particular application.

Figure 6:
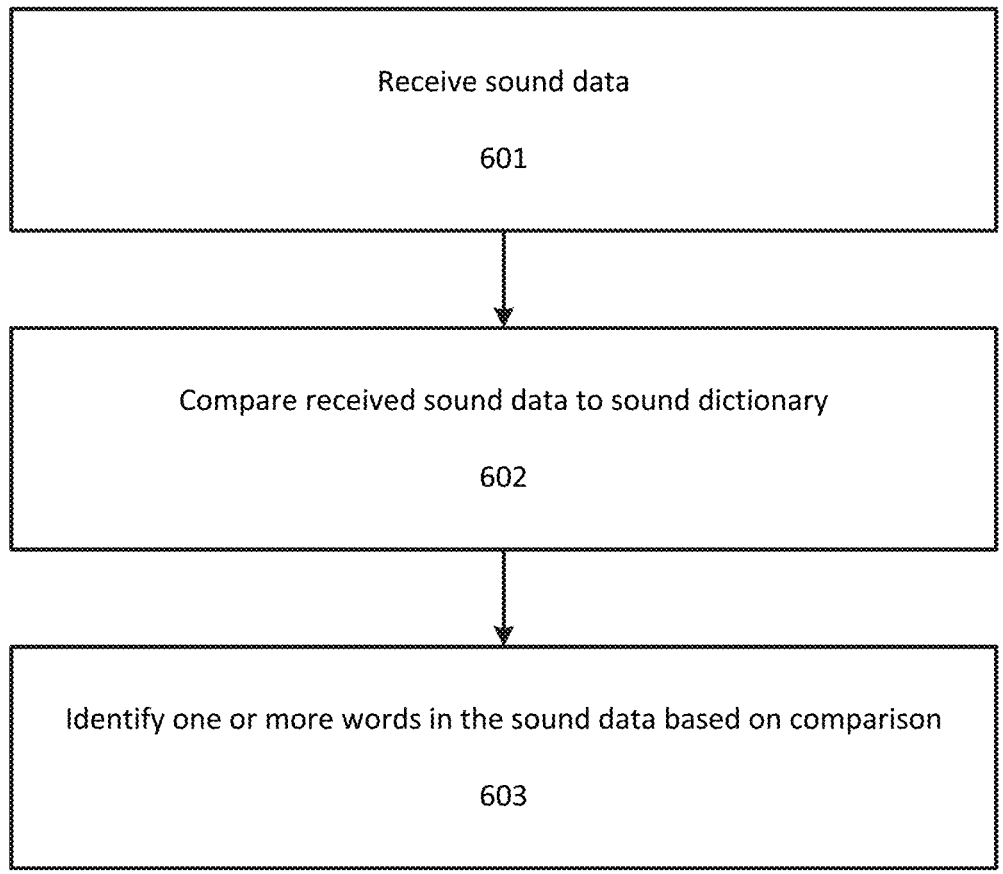
FIG. 6 illustrates a flowchart for determining a user input based at least in part on information captured by one or more hardware devices communicatively coupled to the system when the captured information is sound information according to an exemplary embodiment.

As discussed earlier, the information captured by the one or more hardware devices in step 301 of FIG. 3 can also include sound information captured by a microphone. FIG. 6 illustrates a flowchart for determining a user input based at least in part on information captured by one or more hardware devices communicatively coupled to the system when the captured information is sound information. As discussed below, voice recognition is performed on the sound information to identify one or more words corresponding to the user input.

At step 601 the sound data is received. The sound data can be captured by a hardware device such as a microphone and received by the virtual driver, as discussed above. At step 602 the received sound data can be compared to a sound dictionary. The sound dictionary can include sound signatures of one or more recognized words, such as command words or command modifiers. At step 603 one or more words in the sound data are identified as the user input based on the comparison. The identified one or more words can then be converted into transparent layer commands and passed to the transparent layer.

As discussed earlier, the driver emulated by the virtual driver, the expected type of user input, and the command generated based upon the user input can all be determined based at least in part on one or more settings or prior user inputs.

Figure 7:
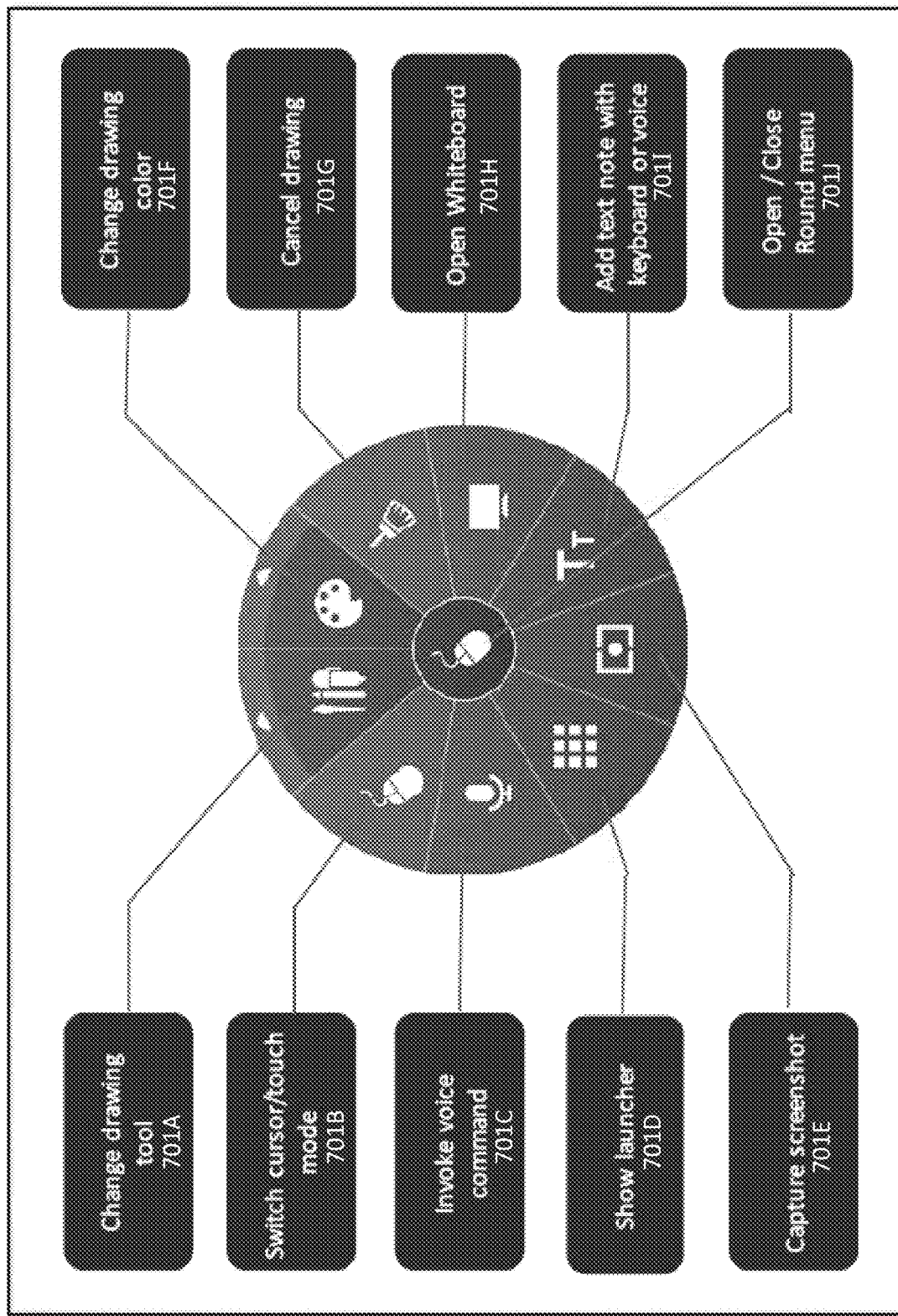
FIG. 7 illustrates a tool interface that can be part of the transparent layer according to an exemplary embodiment.

FIG. 7 illustrates a tool interface 701 that can also be part of the transparent layer. Unlike the transparent UI, the tool interface 701 is visible to the user and can be used to select between different options which alter the emulation mode of the virtual driver, the native commands generated based on user input, or perform additional functions.

Button 701A allows a user to select the type of drawing tool used to graphically modify the user interface when the user input is input coordinates (such as coordinates based upon a user touching the screening with their hand or a stylus/remote). The various drawing tools can include different brushes, colors, pens, highlighters, etc. These tools can result in graphical alterations of varying styles, thicknesses, colors, etc.

Button 701B allows the user to switch between selection, pointing, or drawing modes when input coordinates are received as user input. In a selection mode, the input coordinates can be processed as a "touch" and result in selection or opening of an object at the input coordinates. In pointing mode the coordinates can be processed as a pointer (such as a mouse pointer) position, effectively allowing the user to emulate a mouse. In drawing mode, the coordinates can be processed as a location at which to alter the graphical output of the user interface to present the appearance of drawing or writing on the user interface. The nature of the alteration can depend on a selected drawing tool, as discussed with reference to button 701A. Button 701B can also alert the virtual driver to expect image input and/or motion input (if a motion tracking device is used) and to emulate the appropriate drivers accordingly.

Button 701C alerts the virtual driver to expect a voice command. This can cause the virtual driver to emulate drivers corresponding to a coupled microphone to receive voice input and to parse the voice input as described with respect to FIG. 6.

Button 701D opens a launcher application which can be part of the transparent layer and can be used to launch applications within the operating system or to launch specific commands within an application. Launcher can also be used to customize options in the transparent layer, such as custom voice commands, custom gestures, custom native commands for applications associated with user input and/or to calibrate hardware devices and user input (such as voice calibration, motion capture device calibration, and/or object recognition calibration).

Button 701E can be used to capture a screenshot of the user interface and to export the screenshot as an image. This can be used in conjunction with the drawing mode of button 701B and the drawing tools of 701A. After a user has marked up a particular user interface, the marked up version can be exported as an image.

Button 701F also allows for graphical editing and can be used to change the color of a drawing or aspects of a drawing that the user is creating on the user interface. Similar to the draw mode of button 701B, this button alters the nature of a graphical alteration at input coordinates.

Button 701G cancels a drawing on the user interface. Selection of this button can remove all graphical markings on the user interface and reset the underlying UI to the state it was in prior to the user creating a drawing.

Button 701H can be used to launch a whiteboard application that allows a user to create a drawing or write using draw mode on a virtual whiteboard.

Button 701I can be used to add textual notes to objects, such as objects shown in the operating system UI or an application UI. The textual notes can be interpreted from voice signals or typed by the user using a keyboard.

Button 701J can be used to open or close the tool interface 701. When closed, the tool interface can be minimized or removed entirely from the underlying user interface.

Figure 8:
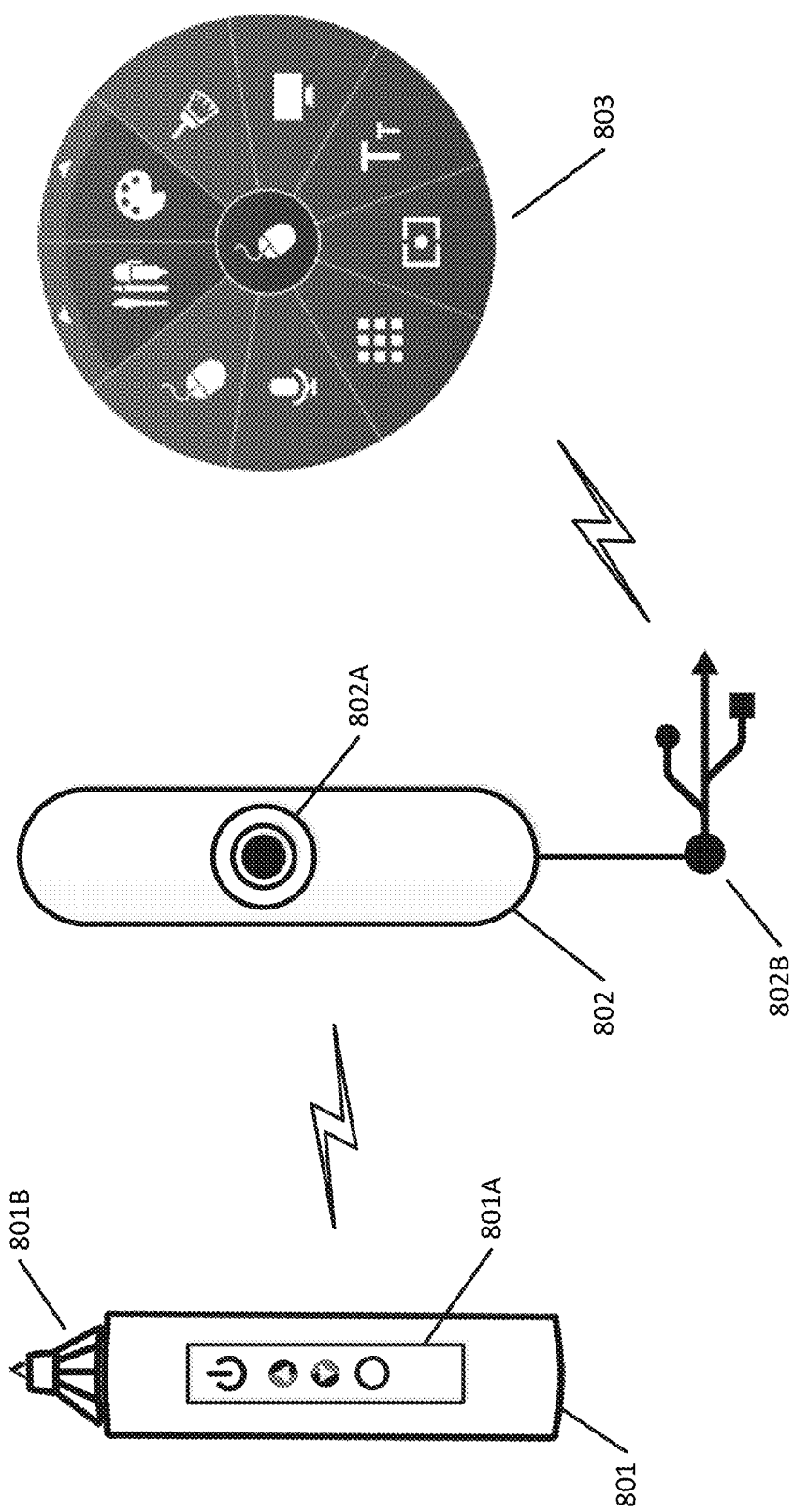
FIG. 8 illustrates an example of a stylus that can be part of the system according to an exemplary embodiment.

As discussed earlier, a stylus or remote hardware device can be used with the present system, in conjunction with other hardware devices, such as a camera or video camera. FIG. 8 illustrates an example of a stylus 801 that can be used with the system. The stylus 801 can communicate with a hardware receiver 802, such as over Bluetooth. The hardware receiver can connect to computer system, such as via USB 802B and the signals from the stylus passed to computer system via hardware receiver can be used to control and interact with menu 803, which is similar to the tool interface shown in FIG. 7.

As shown in FIG. 8, the stylus 801 can include physical buttons 801A. These physical buttons 801 can be used to power the stylus on, navigate the menu 803, and make selections. Additionally, the stylus 801 can include a distinctive tip 801B which is captured in images by a camera and recognized by the virtual driver. This can allow the stylus 801 to be used for drawing and editing when in draw mode. The stylus 801 can also include motion tracking hardware, such an accelerometer and/or tilt sensors to aid in position detection when the stylus is used to provide input coordinates or gestures. Additionally, the hardware receiver 802 can include a calibration button 802A, which when depressed, can launch a calibration utility in the user interface. This allows for calibration of the stylus.

Returning to FIG. 3, at step 302 a context is identified corresponding to the user input. The identified context comprises one of an operating system or an application executing on the operating system.

Figure 9:
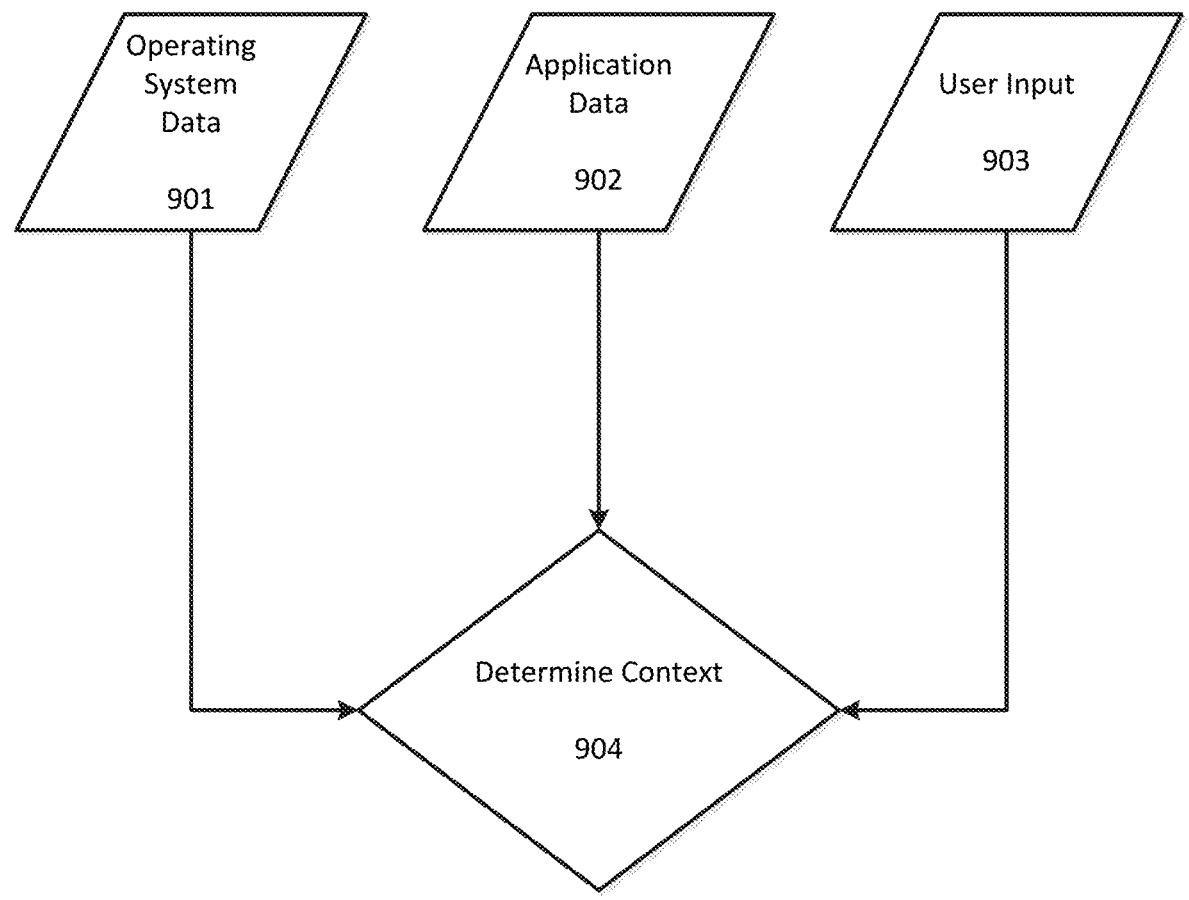
FIG. 9 illustrates a flowchart for identifying a context corresponding to the user input according to an exemplary embodiment.

FIG. 9 illustrates a flowchart for identifying a context corresponding to the user input according to an exemplary embodiment. As shown in FIG. 9, operating system data 901, application data 902, and user input data 903 can all be used to determine a context 904.

Operating system data 901 can include, for example, information regarding an active window in the operating system. For example, if the active window is a calculator window, then the context can be determined to be a calculator application. Similarly, if the active window is a Microsoft Word window, then the context can be determined to be the Microsoft Word application. On the other hand, if the active window is a file folder, then the active context can be determined to be the operating system. Operating system data can also include additional information such as which applications are currently executing, a last launched application, and any other operating system information that can be used to determine context.

Application data 902 can include, for example, information about one or more applications that are executing and/or information mapping particular applications to certain types of user input. For example, a first application may be mapped to voice input so that whenever a voice command is received, the context is automatically determined to be the first application. In another example, a particular gesture can be associated with a second application, so that when that gesture is received as input, the second application is launched or closed or some action within the second application is performed.

User input 903 can also be used to determine the context in a variety of ways. As discussed above, certain types of user input can be mapped to certain applications. In the above example, voice input is associated with a context of a first application. Additionally, the attributes of the user input can also be used to determine a context. Gestures or motions can be mapped to applications or to the operating system. Specific words in voice commands can also be mapped to applications or to the operating system. Input coordinates can also be used to determine a context. For example, a window in the user interface at the position of the input coordinates can be determined and an application corresponding to that window can be determined as the context.

Figure 10:
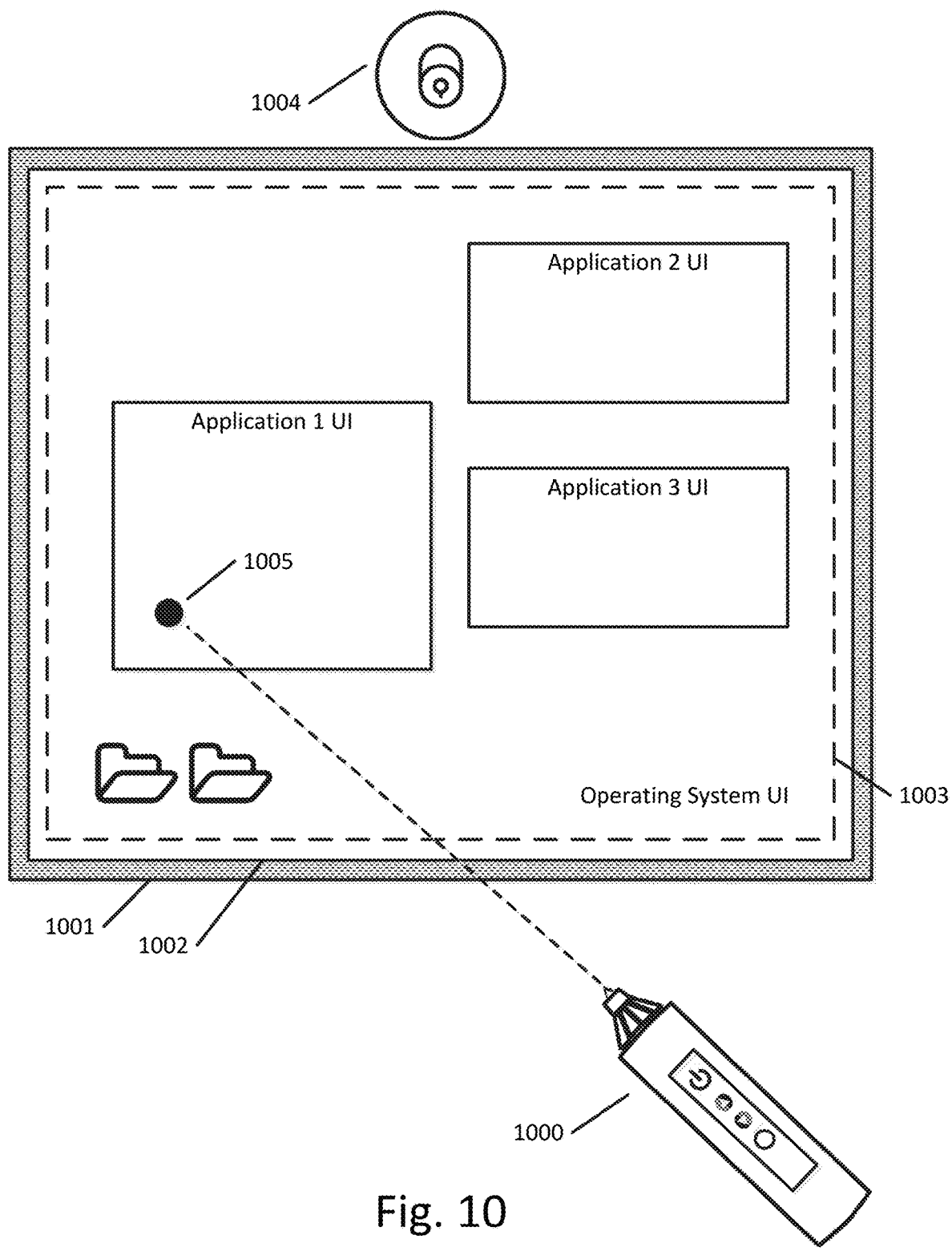
FIG. 10 illustrates an example of using the input coordinates to determine a context according to an exemplary embodiment.

FIG. 10 illustrates an example of using the input coordinates to determine a context. As shown in FIG. 10, the display device 1001 is displaying a user interface 1002. Also shown is a camera 1004 and transparent layer 1003 superimposed over underlying user interface 1003. A user utilizes a stylus 1000 to point to location 1005 in user interface 1002. Since location 1005 lies within an application window corresponding to Application 1, then Application 1 can be determined to be the context for the user input, as opposed to Application 2, Application 3, or the Operating System.

Returning to FIG. 3, at step 303 the user input is converted into one or more transparent layer commands based at least in part on the identified context. As discussed earlier, the transparent layer comprises an application programming interface (API) configured to interface between the virtual driver and the operating system and/or an application executing on the operating system.

Figure 11:
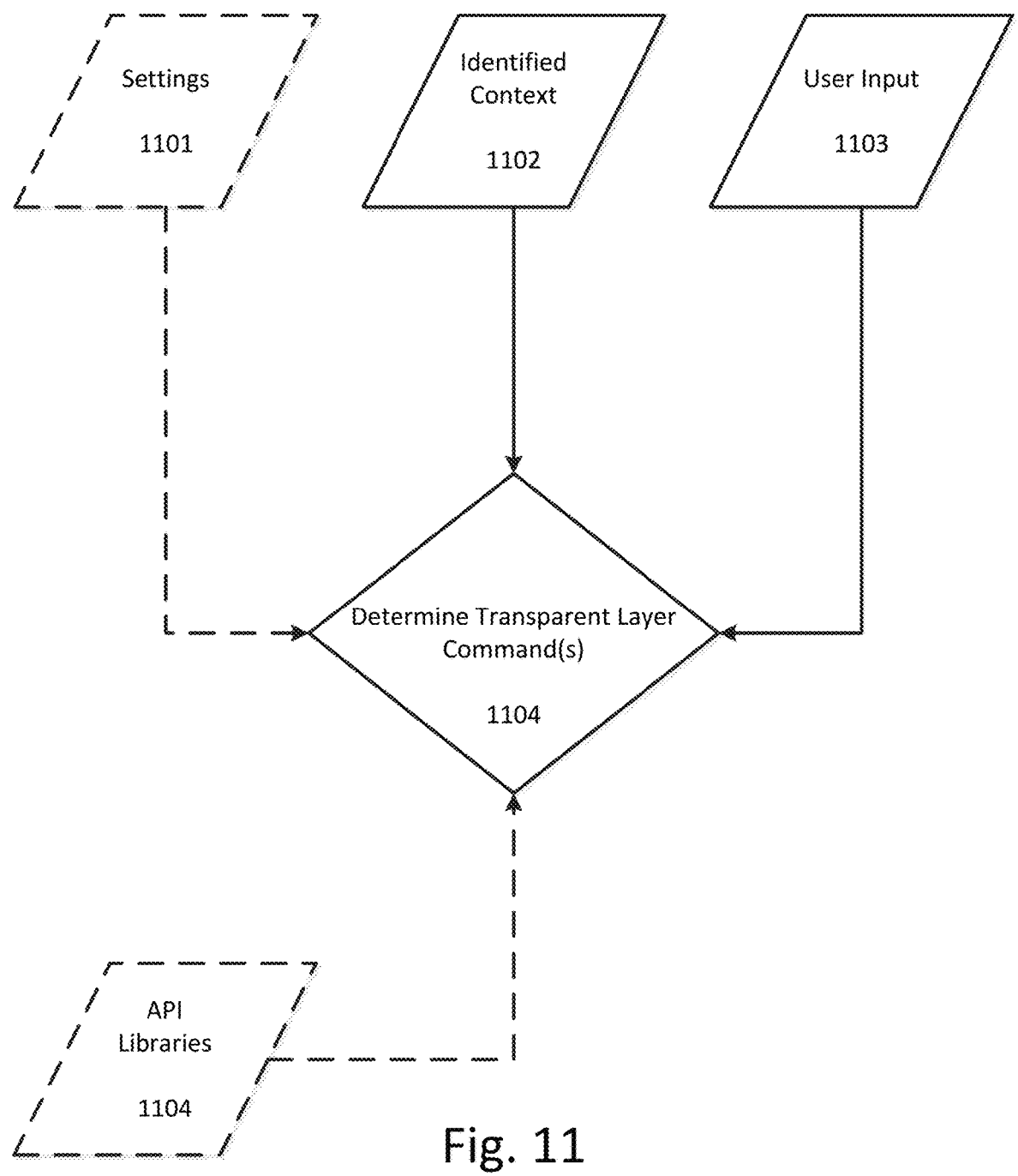
FIG. 11 illustrates a flowchart for converting user input into transparent layer commands according to an exemplary embodiment.

FIG. 11 illustrates a flowchart for converting user input into transparent layer commands. As shown at step 1104 of FIG. 11, the transparent layer command can be determined based at least in part on the identified context 1102 and the user input 1103. The transparent layer command can include one or more native commands configured to execute in one or more corresponding contexts. The transparent layer command can also include response outputs to be transmitted to the virtual driver and on to hardware device(s).

The identified context 1102 can be used to determine which transparent layer command should be mapped to the user input. For example, if the identified context is "operating system," then a swipe gesture input can be mapped to a transparent layer command that results in the user interface scrolling through currently open windows within the operating system (by minimizing one open window and maximize a next open window). Alternatively, if the identified context is "web browser application," then the same swipe gesture input can be mapped to a transparent layer command that results in a web page being scrolled.

The user input 1103 also determines the transparent layer command since user inputs are specifically mapped to certain native commands within one or more contexts and these native commands are part of the transparent layer command. For example, a voice command "Open email" can be mapped to a specific operating system native command to launch the email application Outlook. When voice input is received that includes the recognized words "Open email," this results in a transparent layer command being determined which includes the native command to launch Outlook.

As shown in FIG. 11, transparent layer commands can also be determined based upon one or more user settings 1101 and API libraries 1104. API libraries 1104 can be used to lookup native commands corresponding to an identified context and particular user input. In the example of the swipe gesture and a web browser application context, the API library corresponding to the web browser application can be queried for the appropriate API calls to cause scrolling of a web page. Alternatively, the API libraries 1104 can be omitted and native commands can be mapped directed to a particular user inputs and identified contexts.

In the situation where the user input is determined to be input coordinates the transparent layer command is determined based at least in part on the input location coordinates and the identified context. In this case, the transparent layer command can include at least one native command in the identified context, the at least one native command being configured to perform an action at the corresponding location coordinates in the underlying UI.

When there is more than one possible action mapped to a particular context and user input, settings 1101 can be used to determine the corresponding transparent layer command. For example, button 701B of FIG. 7 allows user to select between selection, pointing, or draw modes when input coordinates are received as user input. This setting can be used to determine the transparent layer command, and by extension, which native command is performed and which action is performed. In this case, the possible native commands can include a selection command configured to select an object associated with the corresponding location coordinates in the underlying UI, a pointer command configured to move a pointer to the corresponding location coordinates in the underlying UI, and a graphical command configured to alter the display output at the corresponding location coordinates in the underlying UI.

Figure 12A:
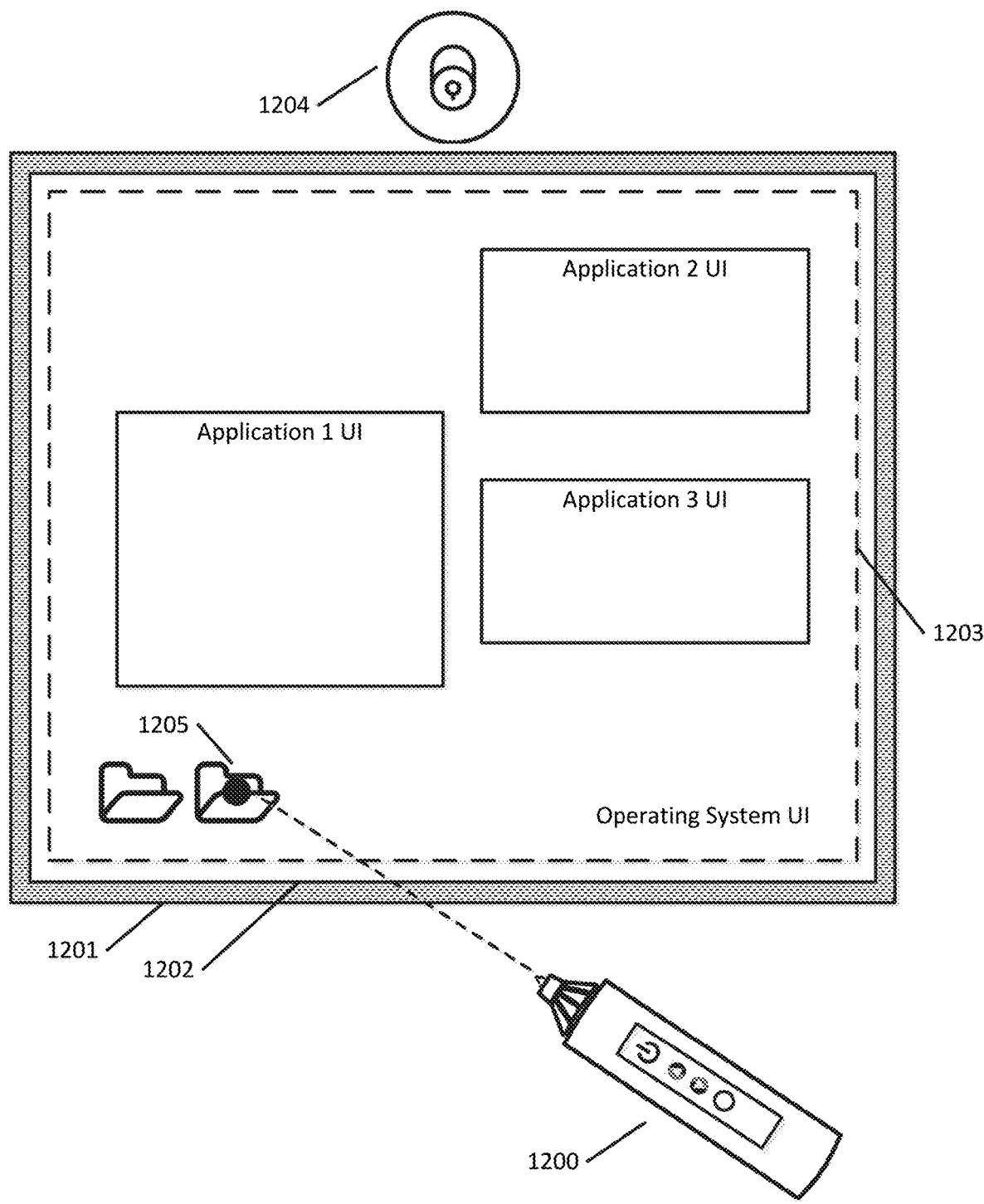
FIG. 12A illustrates an example of receiving input coordinates when the selection mode is toggled according to an exemplary embodiment.

FIG. 12A illustrates an example of receiving input coordinates when the selection mode is toggled. As shown in FIG. 12A, the user has pointed stylus 1200 at operating system UI 1202 (having superimposed transparent UI 1203) on display device 1201. Similar to earlier examples, camera 1204 can be used to determine the position and orientation information for stylus 1200 and the input coordinates. Since the selection mode is toggled and the stylus 1200 is pointed at folder 1205 within the operating system UI 1202, the determined transparent layer command can include a native operating system command to select an object associated with the input coordinates (which in this case is folder 1205). In another example, if a window was located at the input coordinates, this would result in selection of the entire window.

Figure 12B:
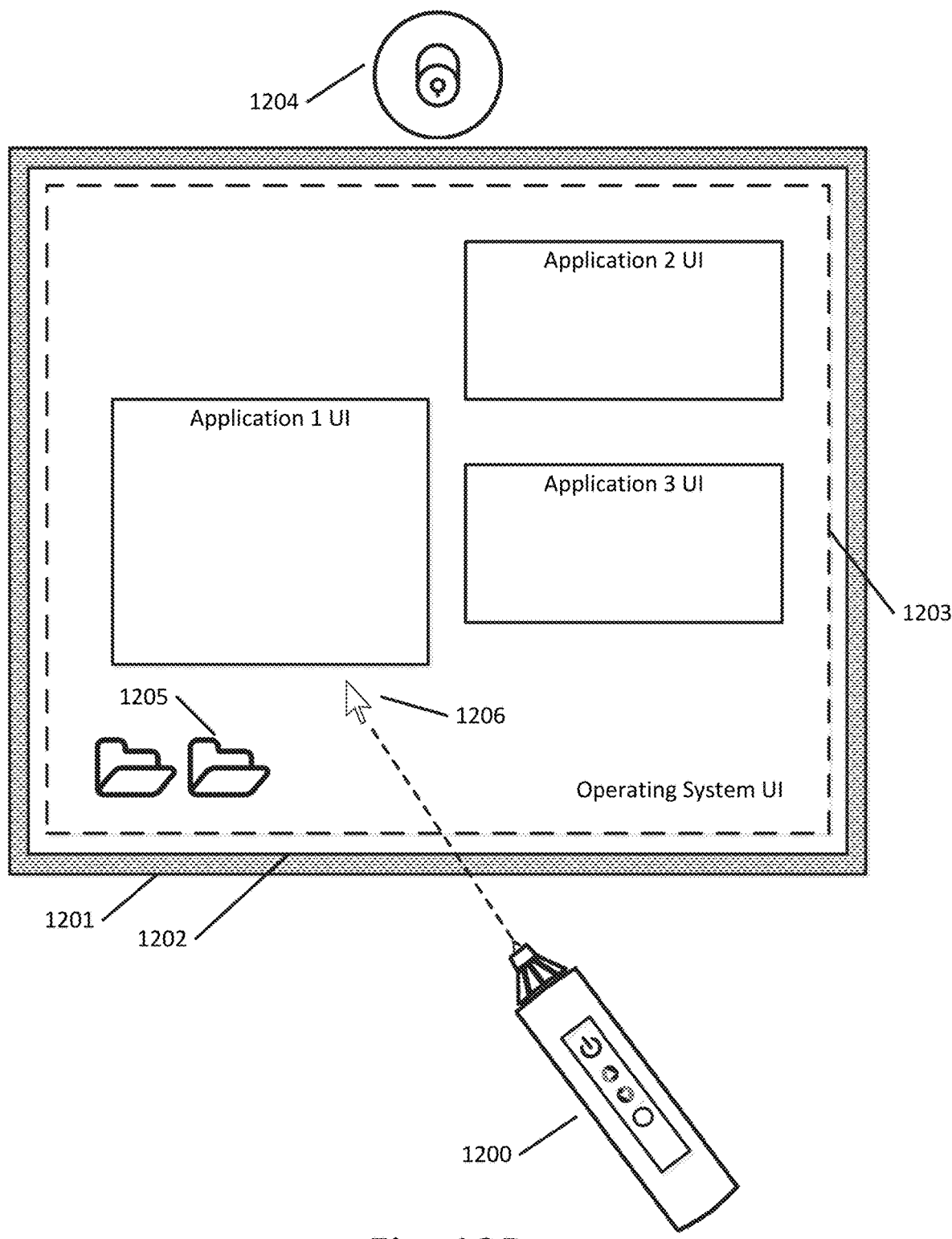
FIG. 12B illustrates an example of receiving input coordinates when the pointing mode is toggled according to an exemplary embodiment.

FIG. 12B illustrates an example of receiving input coordinates when the pointing mode is toggled. In this case, the determined transparent layer command can include a native operating system command to move mouse pointer 1206 to the location of the input coordinates.

Figure 12C:
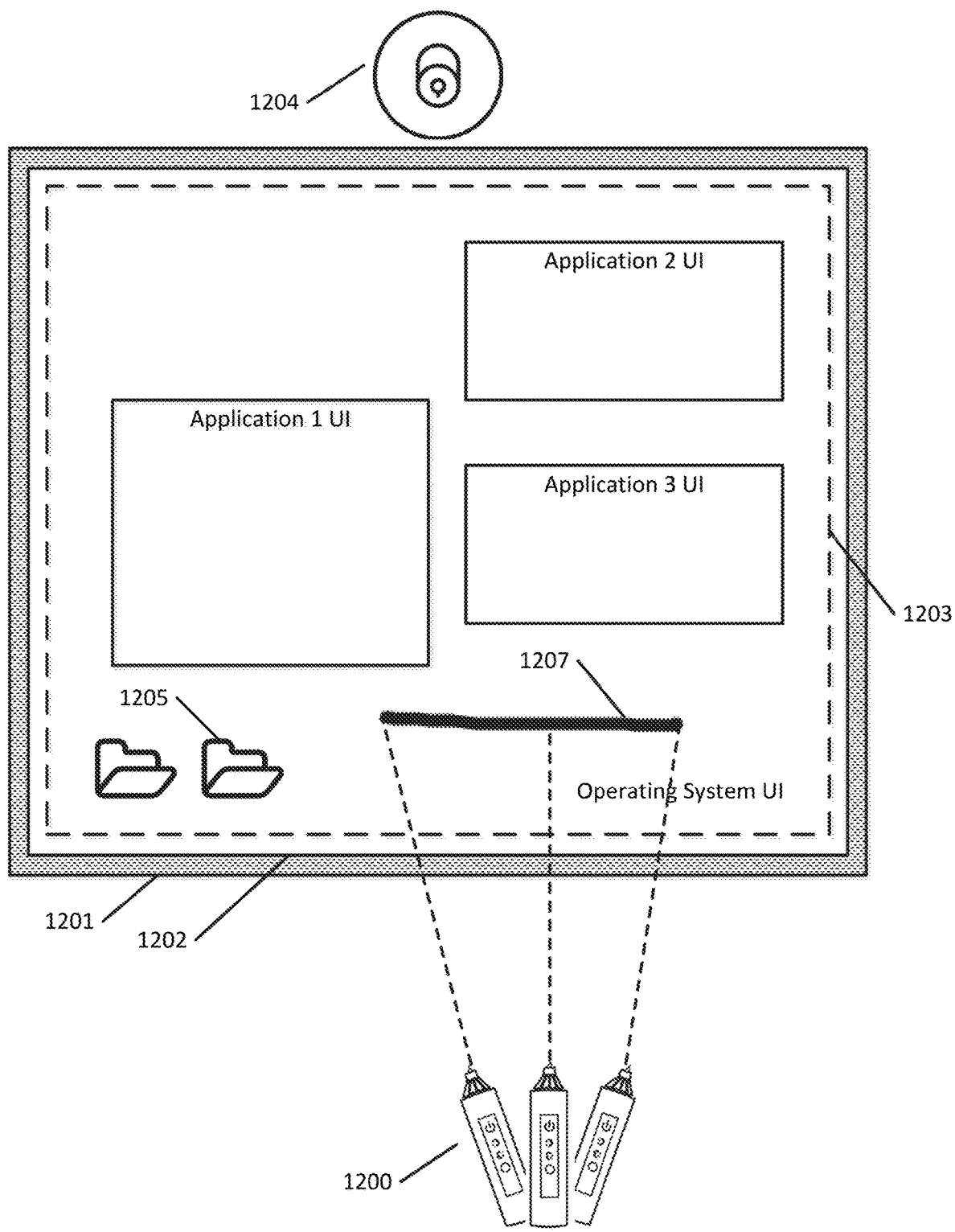
FIG. 12C illustrates an example of receiving input coordinates when the drawing mode is toggled according to an exemplary embodiment.

FIG. 12C illustrates an example of receiving input coordinates when the drawing mode is toggled and the user has swept stylus 1200 over multiple input coordinates. In this case, the determined transparent layer command can include a native operating system command to alter the display output at the locations of each of the input coordinates, resulting in the user drawing line 1207 on the user interface 1202. The modified graphical output produced in drawing mode can be stored as part of the transparent layer 1203, for example, as metadata related to a path of input coordinates. The user can then select an option to export the altered display output as an image.

In the situation wherein the user input is identified as a gesture, converting the user input into one or more transparent layer commands based at least in part on the identified context can include determining a transparent layer command based at least in part on the identified gesture and the identified context. The transparent layer command can include at least one native command in the identified context, the at least one native command being configured to perform an action associated with the identified gesture in the identified context. An example of this is discussed above with respect to a swipe gesture and a web browser application context that results in a native command configured to perform a scrolling action in the web browser.

In the situation wherein the user input is identified as one or more words (such as by using voice recognition), converting the user input into one or more transparent layer commands based at least in part on the identified can include determining a transparent layer command based at least in part on the identified one or more words and the identified context. The transparent layer command can include at least one native command in the identified context, the at least one native command being configured to perform an action associated with the identified one or more words in the identified context.

Figure 13:
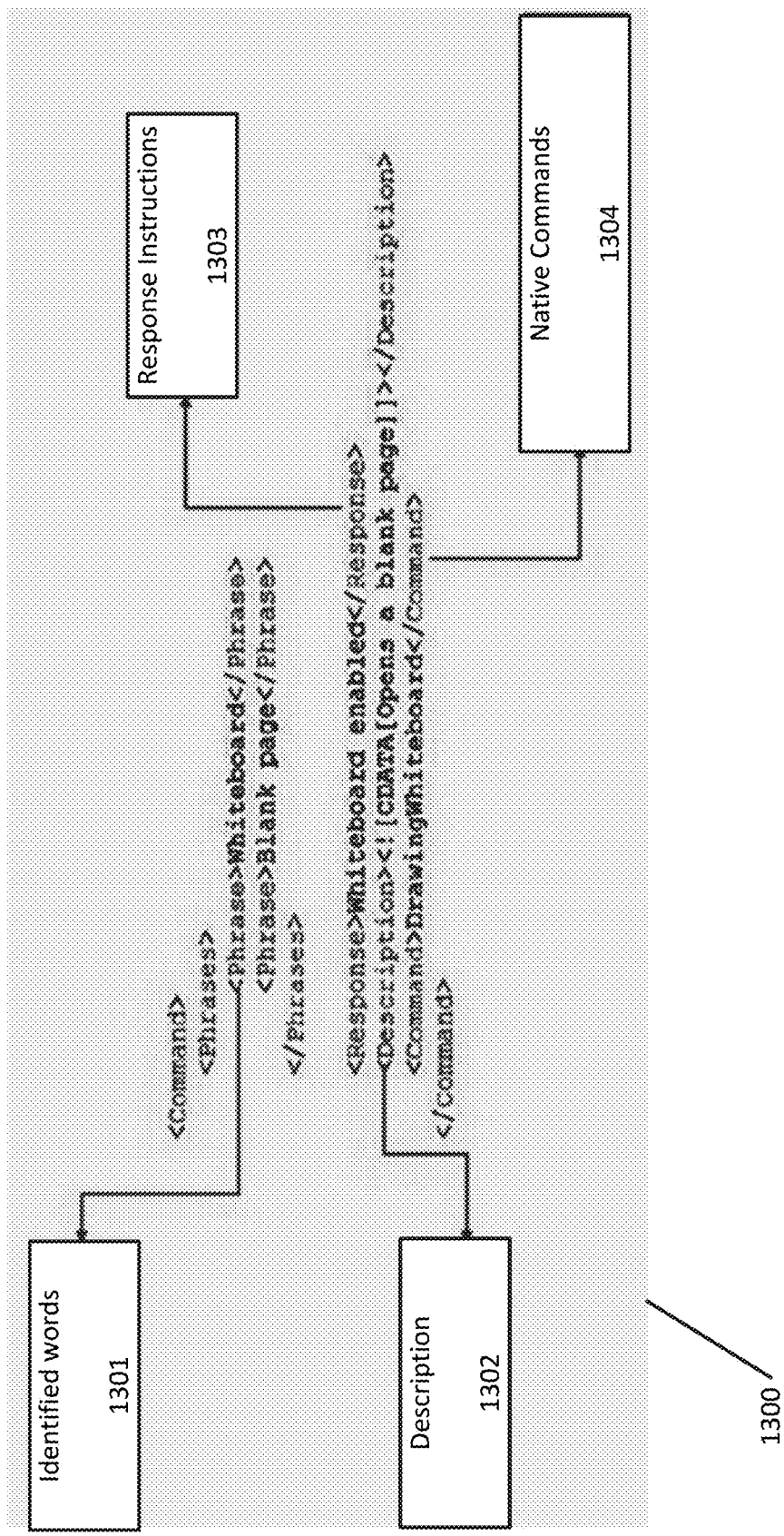
FIG. 13 illustrates an example of a transparent layer command determined based on one or more words identified in input voice data according to an exemplary embodiment.

FIG. 13 illustrates an example of a transparent layer command 1300 determined based on one or more words identified in input voice data. The identified words 1301 include one of the phrases "whiteboard" or "blank page." Transparent layer command 1300 also includes a description 1302 of the command, and response instructions 1303 which are output instructions sent by the transparent layer to the virtual driver and to a hardware output device upon execution of the transparent layer command. Additionally, transparent layer command 1300 includes the actual native command 1304 used to call the white board function.

Figure 14:
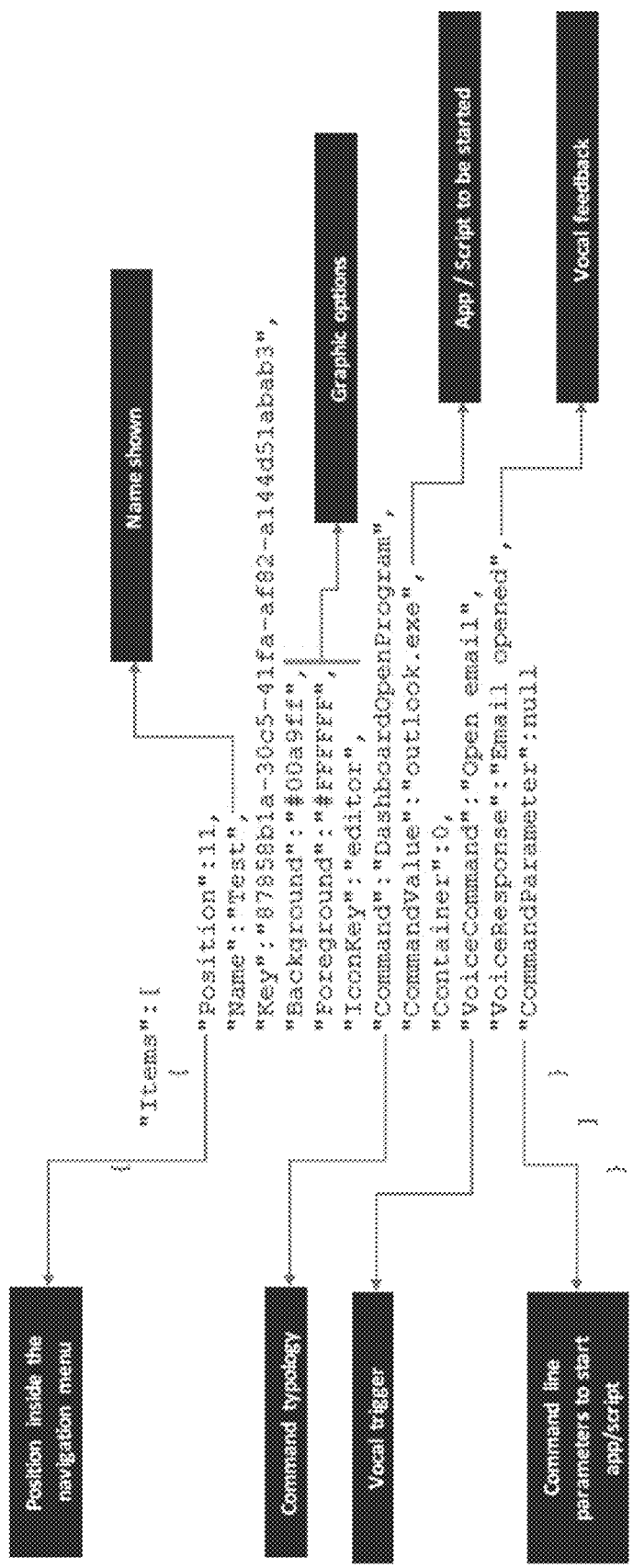
FIG. 14 illustrates another example of a transparent layer command determined based on one or more words identified in input voice data according to an exemplary embodiment.

FIG. 14 illustrates another example of a transparent layer command 1400 determined based on one or more words identified in input voice data according to an exemplary embodiment. In this example, the one or more words are "open email." As shown in FIG. 14, the transparent layer command 1400 includes the native command "outlook.exe," which is an instruction to run a specific executable file that launches the outlook application. Transparent layer command 1400 also includes a voice response "email opened" which will be output in response to receiving the voice command.

Returning to FIG. 3, at step 304 the one or more transparent layer commands are executed on the transparent layer. Execution of the one or more transparent layer commands is configured to cause execution of one or more native commands in the identified context.

Figure 15:
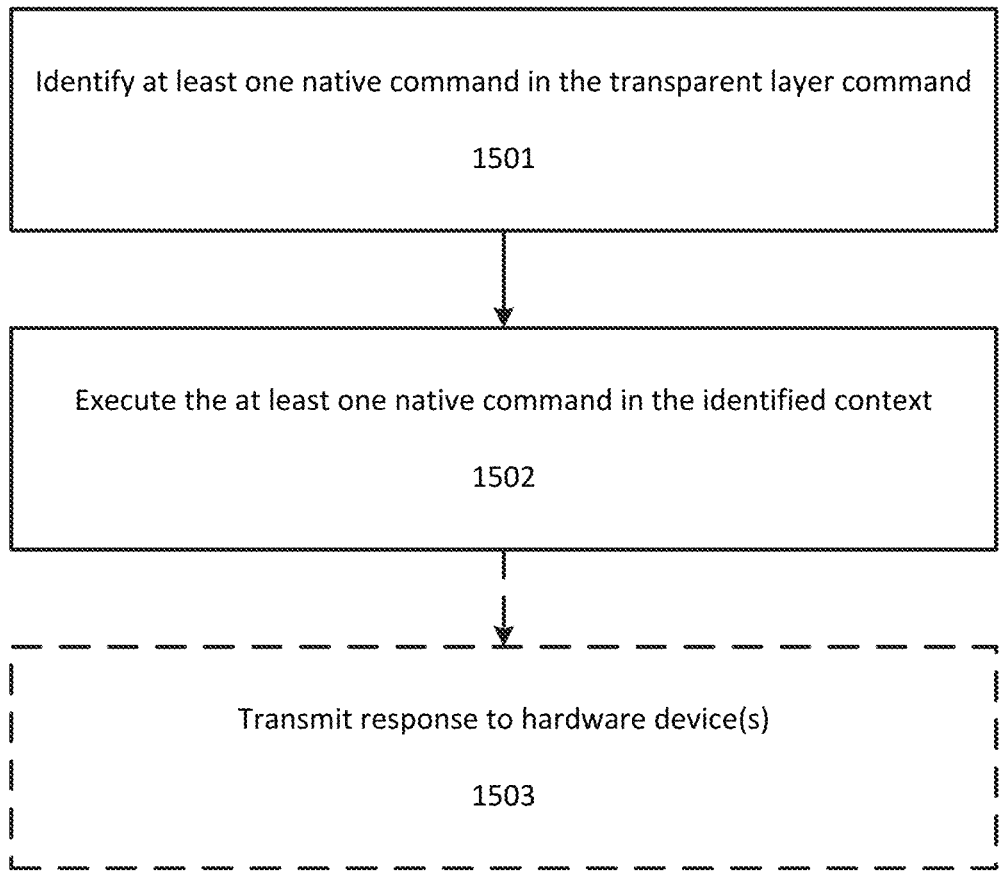
FIG. 15 illustrates a flowchart for executing the one or more transparent layer commands on the transparent layer according to an exemplary embodiment.

FIG. 15 illustrates a flowchart for executing the one or more transparent layer commands on the transparent layer according to an exemplary embodiment. At step 1501 at least one native command in the transparent layer command is identified. The native command can be, for example, designated as a native command within the structure of the transparent layer command, allowing for identification.

At step 1502 the at least one native command is executed in the identified context. This step can include passing the at least one native command to the identified context via an API identified for that context and executing the native command within the identified context. For example, if the identified context is the operating system, then the native command can be passed to the operating system for execution via the operating system API. Additionally, if the identified context is an application, then the native command can be passed to application for execution via the application API.

Optionally, at step 1503, a response can be transmitted to hardware device(s). As discussed earlier, this response can be routed from the transparent layer to the virtual driver and on to the hardware device.

Figure 16:
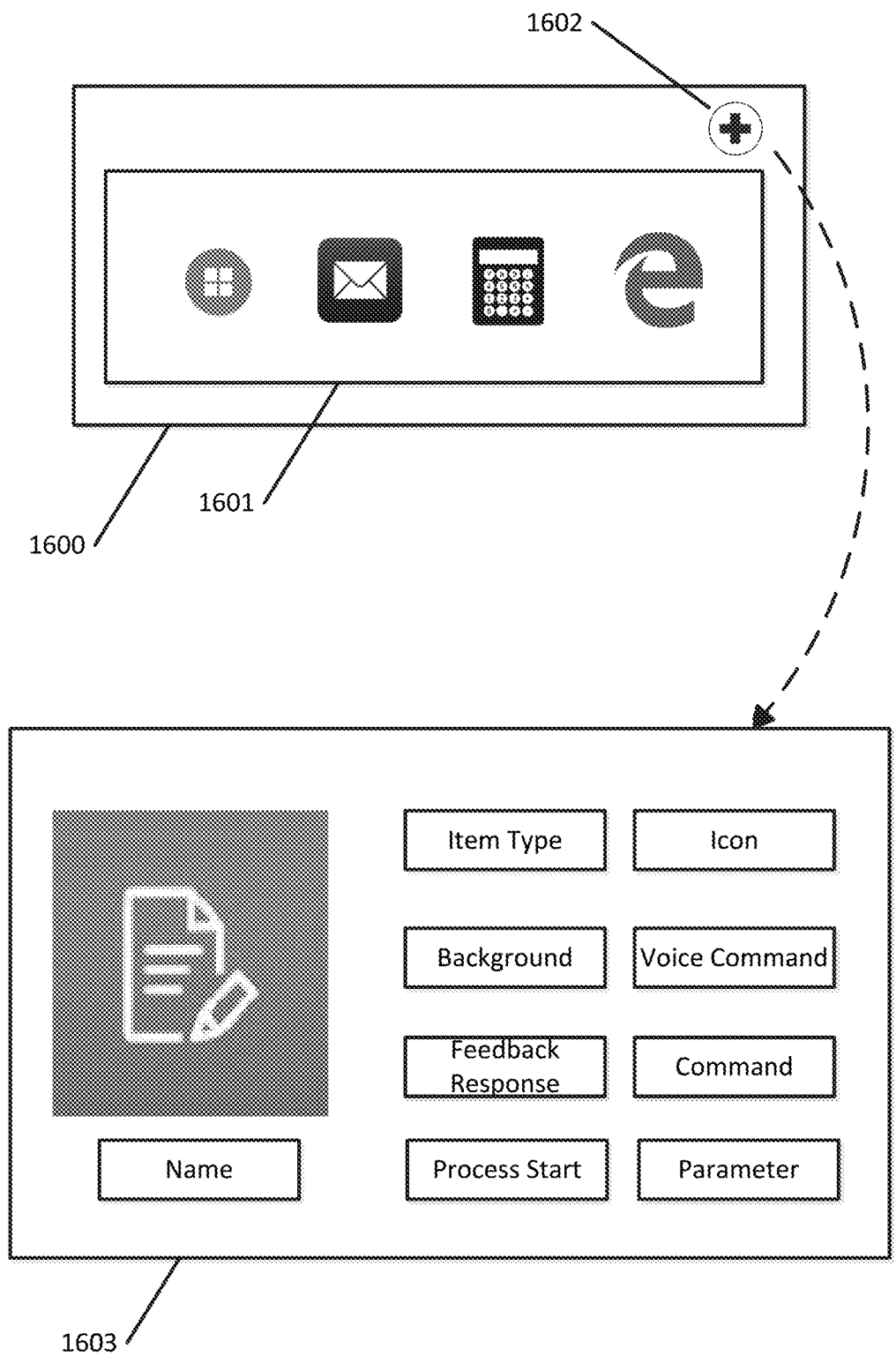
FIG. 16 illustrates an example interface for adding new commands corresponding to user input according to an exemplary embodiment.

FIGS. 16-19 illustrate additional features of the system disclosed herein. FIG. 16 illustrates an example interface for adding new commands corresponding to user input according to an exemplary embodiment. The dashboard in interface 1600 includes icons of applications 1601 which have already been added and can be launched using predetermined user inputs and hardware devices (e.g., voice commands). The dashboard can also show other commands that are application-specific and that are mapped to certain user inputs. Selection of addition button 1602 opens the add command menu 1603. This menu allows users to select between the following options: Item type: Fixed Item to add on bottom bar menu/Normal Item to add in a drag menu; Icon: Select the image icon; Background: Select the background icon color; Color: Select the icon color; Name: Set the new item name; Voice command: Set the voice activation command to open the new application; Feedback response: Set the application voice response feedback; Command: Select application type or custom command type to launch (e.g., launch application command, perform action within application command, close application command, etc.); Process Start: if launching a new process or application, the name of the process or application; and Parameter: any parameters to pass into the new process or application.

Figure 17:
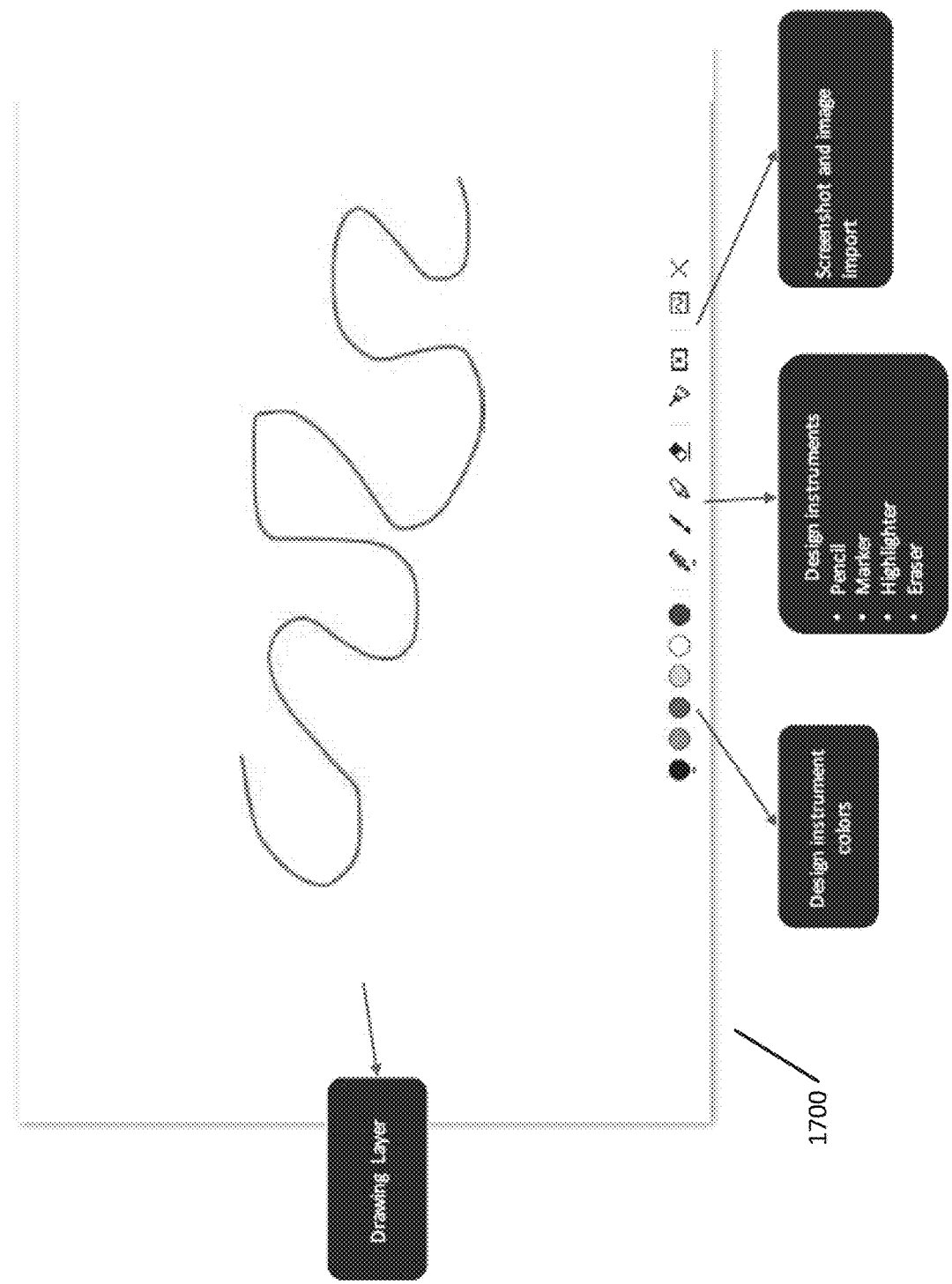
FIG. 17 illustrates various components and options of a drawing interface and draw mode according to an exemplary embodiment.
Figure 18:
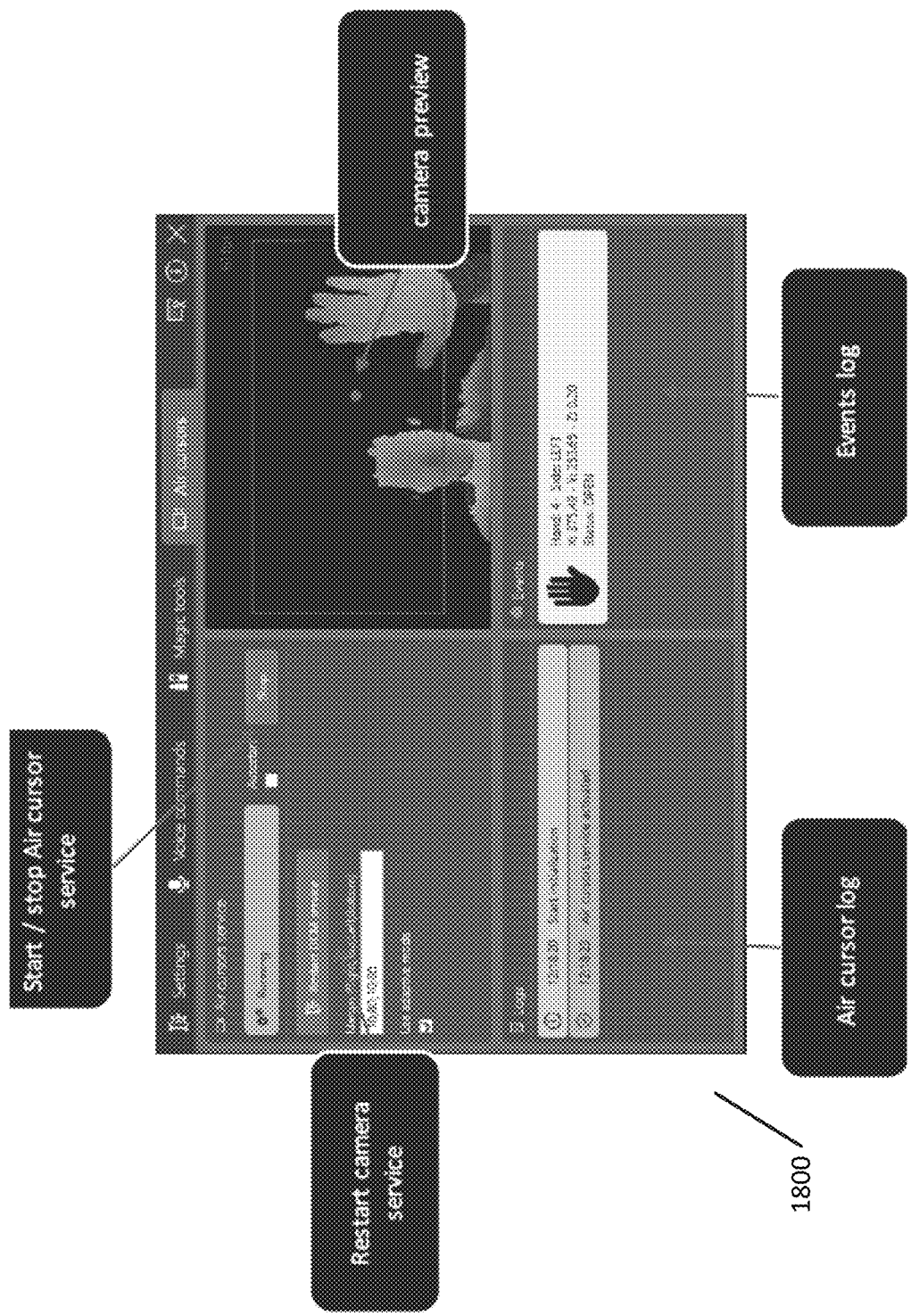
FIG. 18 illustrates a calibration and settings interface for a video camera hardware device that is used to recognize objects and allows for a user to provide input using touch and gestures according to an exemplary embodiment.
Figure 19:
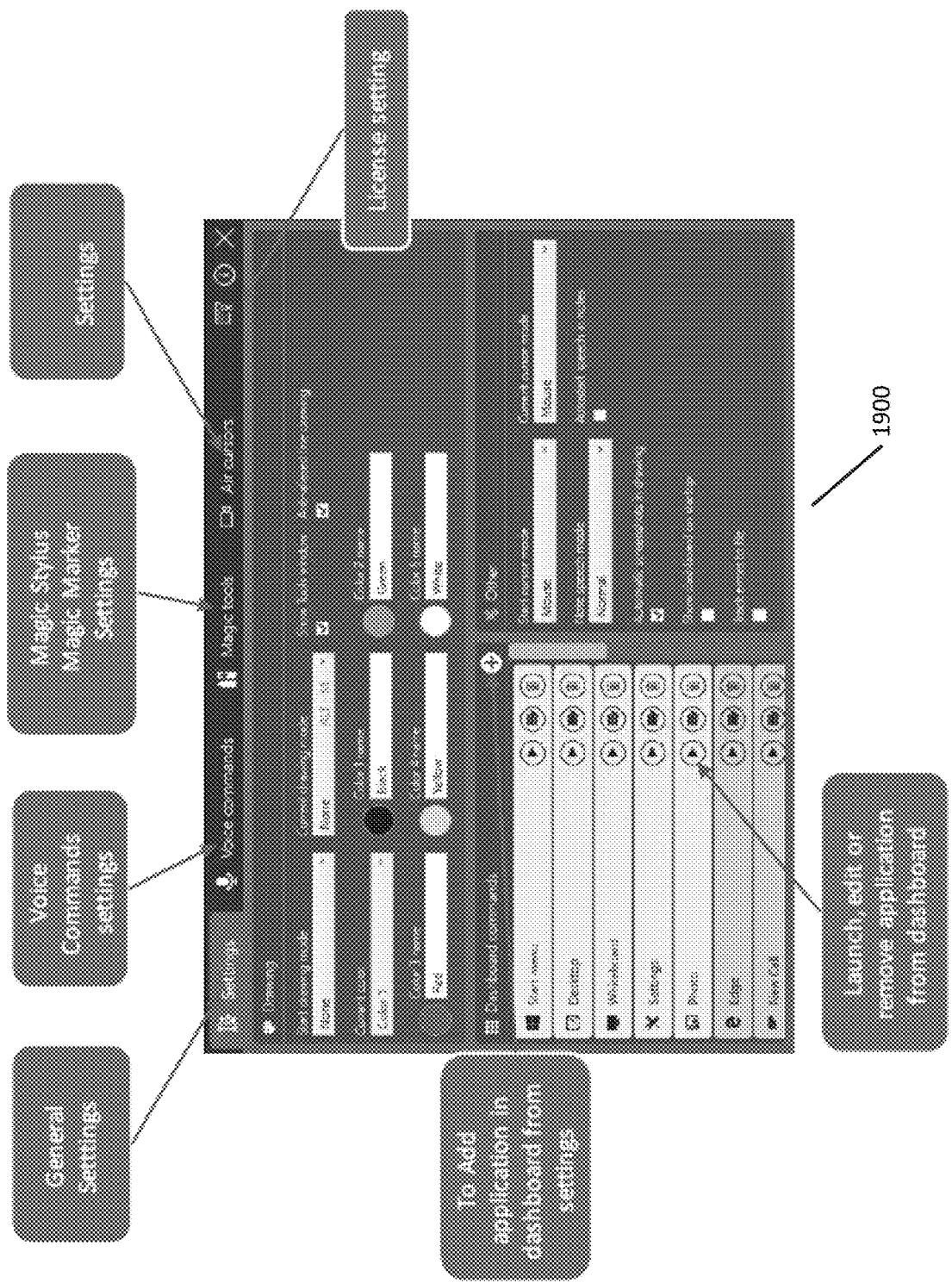
FIG. 19 illustrates a general settings interface that allows a user to customize various aspects of the interface, toggle input modes, and make other changes according to an exemplary embodiment.

FIG. 17 illustrates various components and options of the drawing interface 1700 and draw mode according to an exemplary embodiment. FIG. 18 illustrates a calibration and settings interface 1800 for a video camera hardware device that is used to recognize objects and allows for a user to provide input using touch and gestures. FIG. 19 illustrates a general settings interface 1900 which allows a user to customize various aspects of the interface, toggle input modes, and make other changes. As shown in interface 1900, a user can also access a settings page to calibrate and adjust settings for a hardware stylus (referred to as the "Magic Stylus").

The system disclosed herein can be implemented on multiple networked computing devices and used an aid in conducting networked collaboration sessions. For example, the whiteboard functionality described earlier can be a shared whiteboard between multiple users on multiple computing devices.

However, one of the problems with existing whiteboards or other shared collaboration spaces is that there is no easy way to interact with a remote computing device or to share a desktop screen without disrupting or interrupting the collaboration session. For example, if a participant in a collaboration workspace wishes to share a presentation with other participants, all participants are required to minimize or close the collaboration session, execute a screen sharing application, and join a screen sharing meeting. During shared collaboration sessions, this frequently interrupts the workflow and shared brainstorming sessions that the collaboration space was designed to promote.

In addition to the earlier described methods and systems for implementation of a universal hardware-software interface, Applicant has additionally discovered methods, apparatuses and computer-readable media that allow for desktop sharing over a web socket connection in a networked collaboration workspace.

Figure 20:
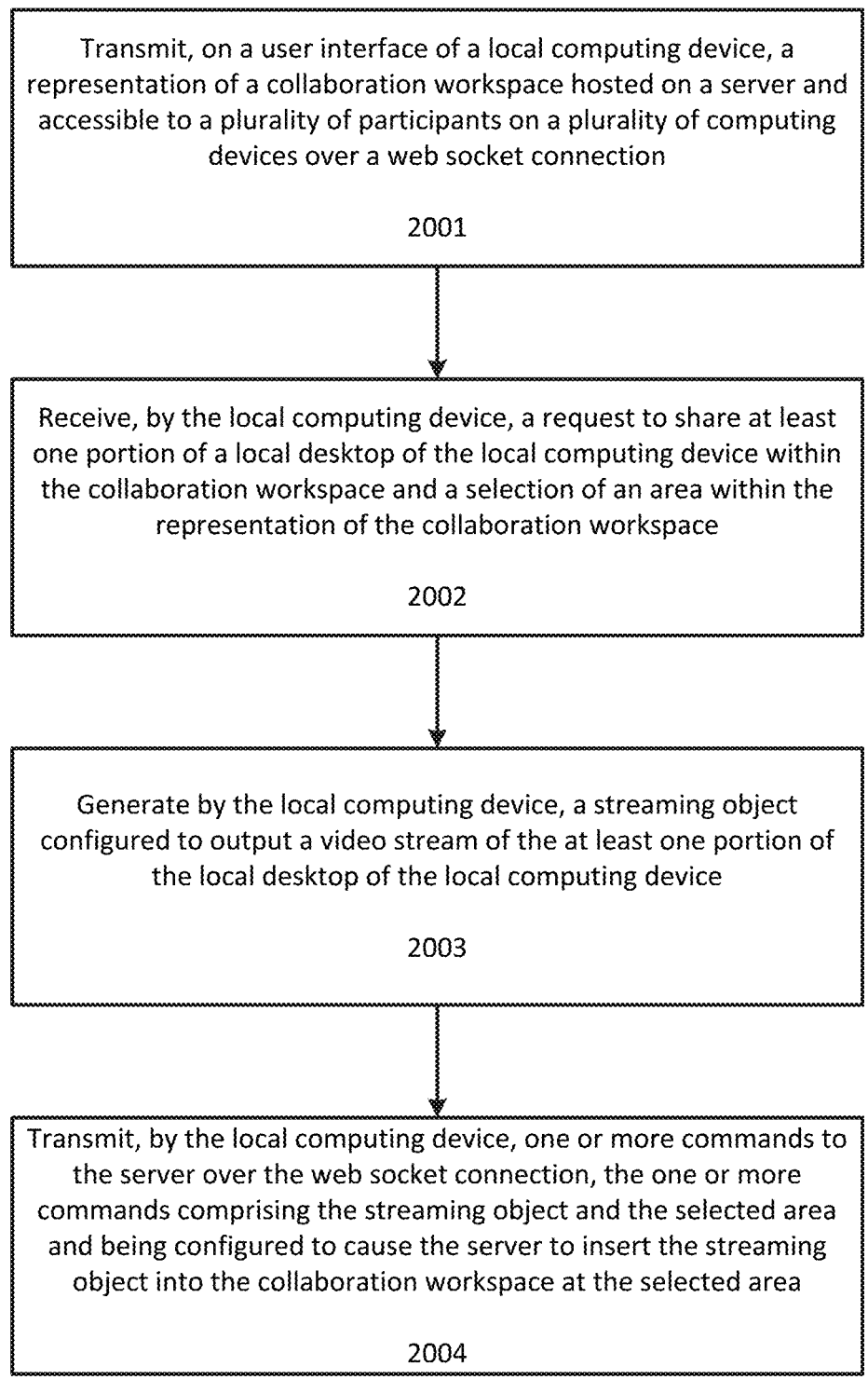
FIG. 20 illustrates a flowchart for desktop sharing over a web socket connection in a networked collaboration workspace according to an exemplary embodiment.

FIG. 20 illustrates a flowchart for desktop sharing over a web socket connection in a networked collaboration workspace according to an exemplary embodiment. All of the steps shown in FIG. 20 can be performed on a local computing device, such as a client device connected to a server, and do not require multiple computing devices. The disclosed process can also be implemented by multiple devices connected to a server.

At step 2001 a representation of a collaboration workspace hosted on a server is transmitted on a user interface of a local computing device. The collaboration workspace is accessible to a plurality of participants on a plurality of computing devices over a web socket connection, including a local participant at the local computing device and one or more remote participants at remote computing devices. As used herein, remote computing devices and remote participants refers to computing devices and participants other than the local participant and the local computing device. Remote computing devices are separated from the local device by a network, such as a wide area network (WAN).

Figure 21A:
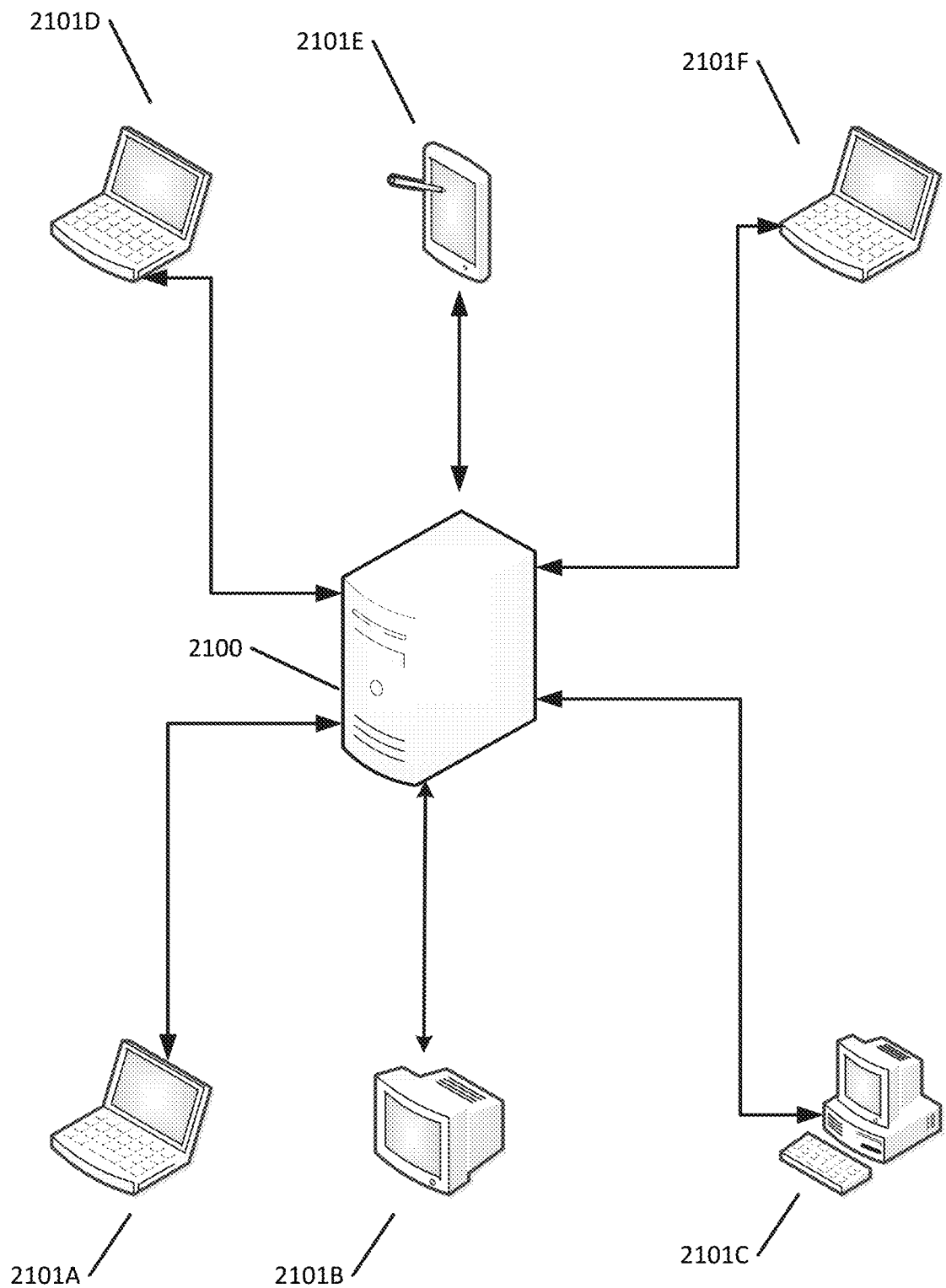
FIG. 21A illustrates the network architecture used to host and transmit collaboration workspace according to an exemplary embodiment.

FIG. 21A illustrates the network architecture used to host and transmit collaboration workspace according to an exemplary embodiment. As shown in FIG. 21A, server 2100 is connected to computing devices 2101A-2101F. The server 2100 and computing devices 2101A-2101F can be connected via a network connection, such as web socket connection, that allows for bi-directional communication between the computing devices 2101A-2101F (clients) and the server 2100. As shown in FIG. 21A, the computing devices can be any type of computing device, such as a laptop, desktop, smartphone, or other mobile device.

Figure 21B:
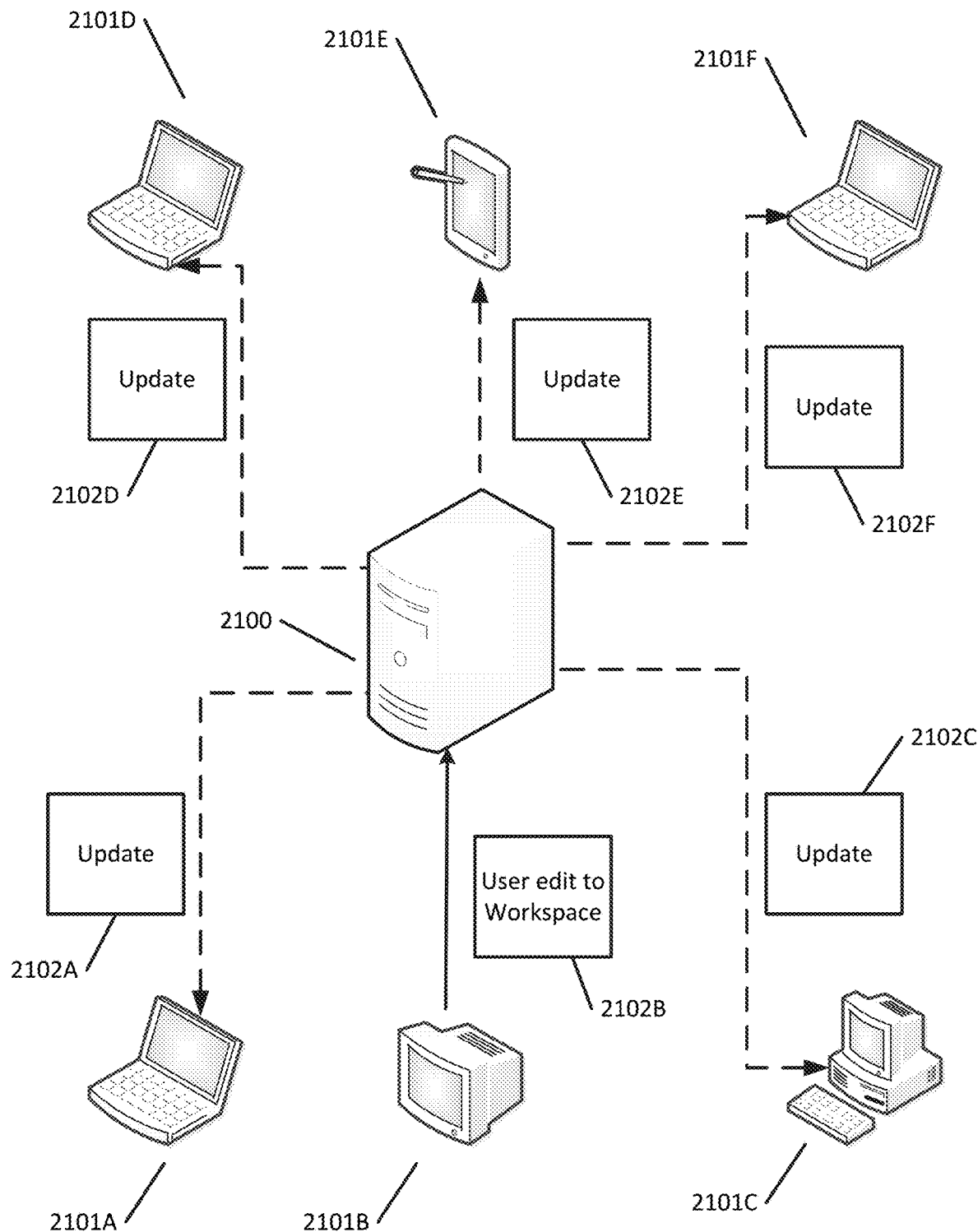
FIG. 21B illustrates the process for propagating edits to the collaboration workspace within the network according to an exemplary embodiment.

The collaboration workspace can be, for example, a digital whiteboard configured to propagate any edits from any participants in the plurality of participants to other participants over the web socket connection. FIG. 21B illustrates the process for propagating edits to the collaboration workspace within the network according to an exemplary embodiment. As shown in FIG. 21B, if a user at computing device 2101B makes an edit or an alteration to the collaboration workspace, this edit or alteration 2102B is sent to the server 2100, where it is used to update the hosted version of the workspace. The edit or alteration is then propagated as updates 2102A, 2102C, 2102D, 2102E, and 2102F by the server 2100 to the other connected computing devices 2101A, 2101C, 2101D, 2101E, and 2101F.

Each representation of the collaboration workspace can be a version of the collaboration workspace that is customized to a local participant. For example, as discussed above, each representation of the collaboration workspace can include one or more remote participant objects corresponding to one or more remote computing devices connected to the server.

Figure 22:
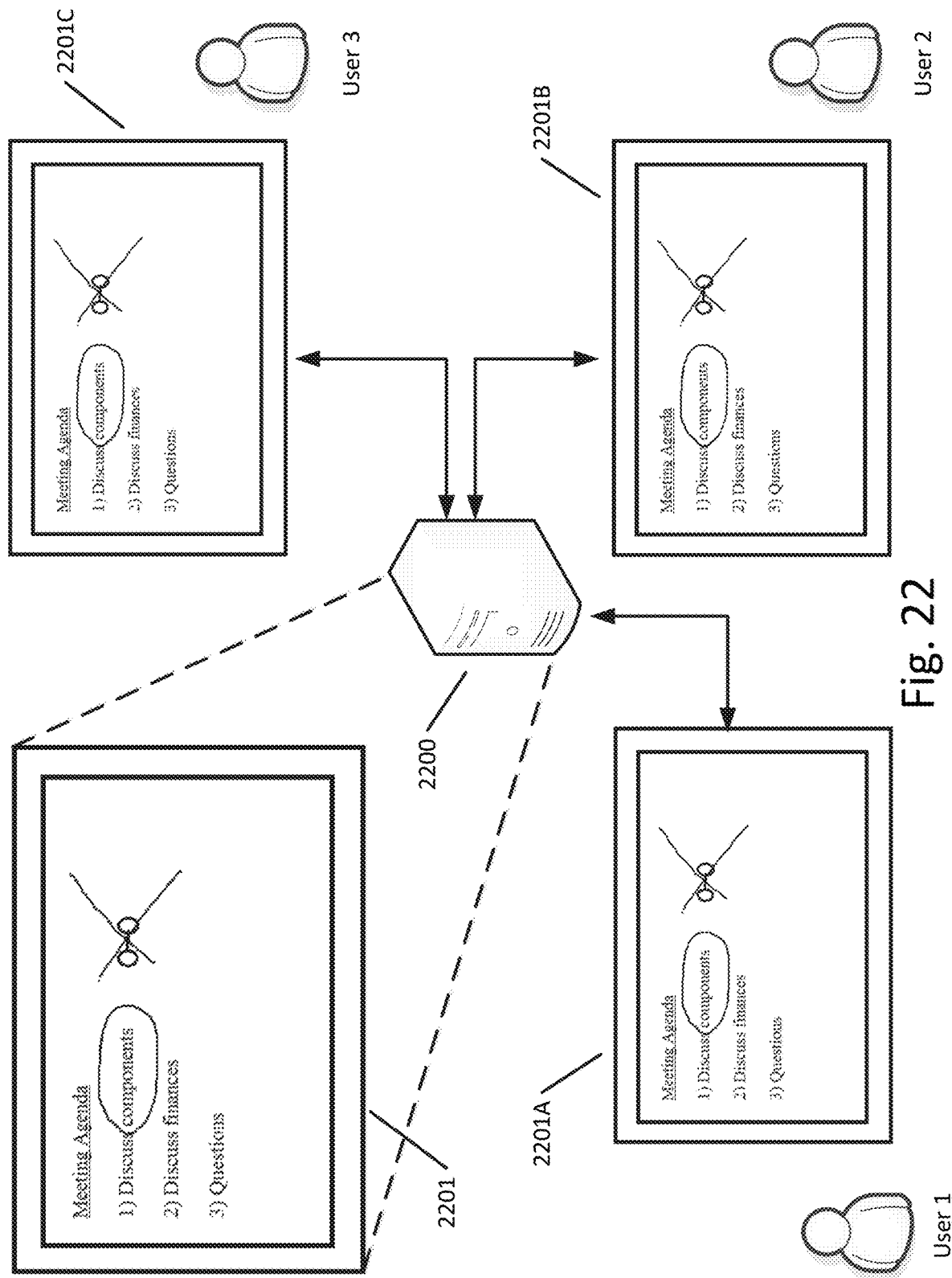
FIG. 22 illustrates multiple representations of a collaboration workspace according to an exemplary embodiment.

FIG. 22 illustrates multiple representations of a collaboration workspace according to an exemplary embodiment. As shown in FIG. 22, server 2200 hosts collaboration workspace 2201. The version of the collaboration workspace hosted on the server is propagated to the connected devices, as discussed earlier. FIG. 22 also illustrates the representations of the collaboration workspace for three connected users, User 1, User 2, and User 3. Each representation can optionally be customized to the local participant (to the local computing device at each location).

Returning to FIG. 20, at step 2002 a request to share at least one portion of a local desktop of the local computing device within the collaboration workspace and a selection of an area within the representation of the collaboration workspace is received by the local computing device.

Figure 23A:
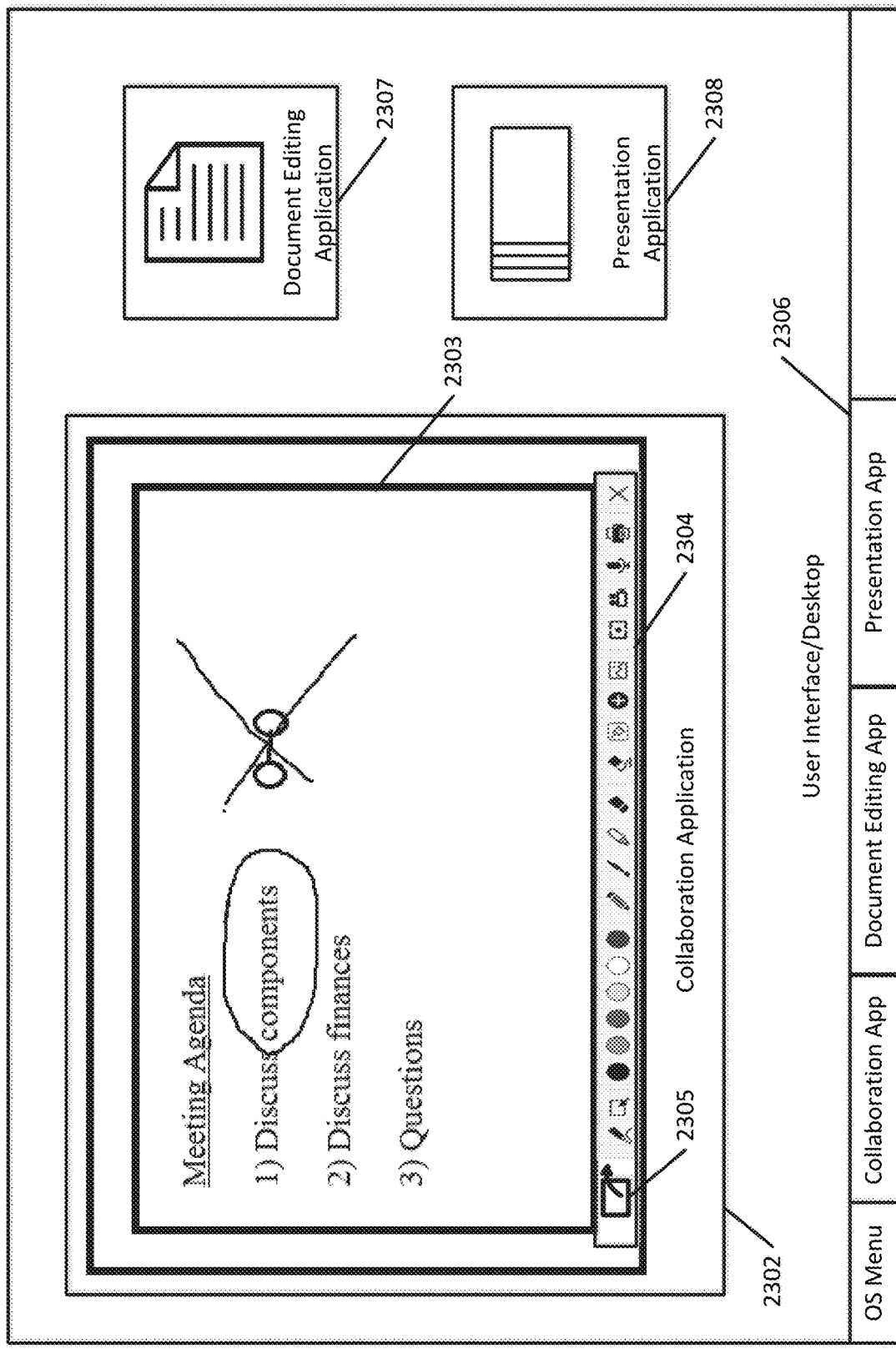
FIG. 23A illustrates an example of the user interface (desktop) of a local computing device prior to receiving the request and selection of an area according to an exemplary embodiment.
Figure 23B:
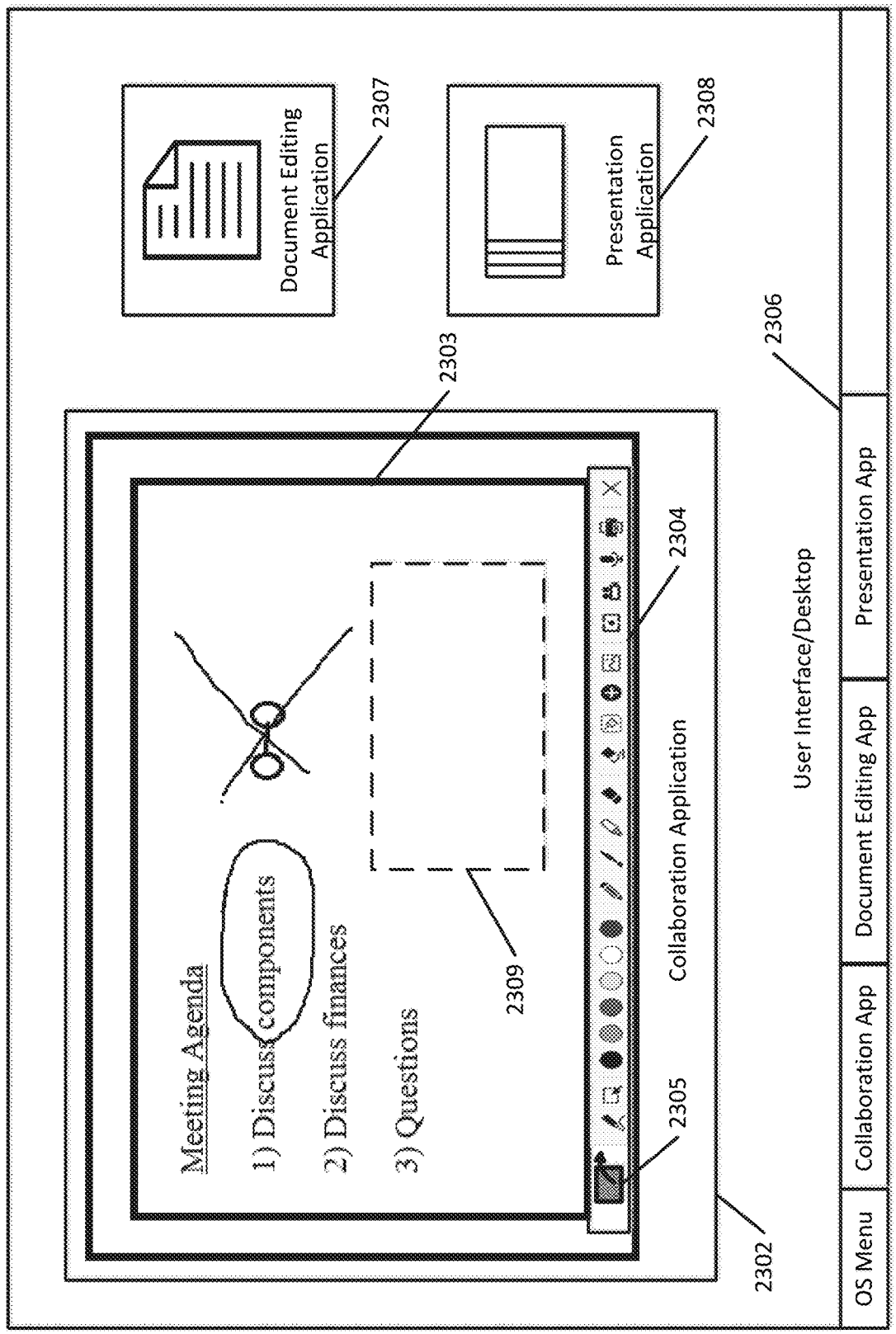
FIG. 23B illustrates an example of the user interface (desktop) of the local computing device after receiving the request and prior to the selection of an area according to an exemplary embodiment.

FIGS. 23A-23B illustrate an example of the step of receiving a request to share at least one portion of a local desktop of the local computing device within the collaboration workspace and a selection of an area within the representation of the collaboration workspace according to an exemplary embodiment.

FIG. 23A illustrates an example of the user interface (desktop) of a local computing device prior to receiving the request and selection of an area. As shown in FIG. 23A, user interface 2301 includes a collaboration application 2302 that locally displays the representation of the collaboration workspace 2303 hosted on the server, as well as a separate presentation application 2308 (such as Powerpoint™) and a separate document editing application (such as Word™). All user applications executing on the local computing device are shown as tabs in a taskbar 2306 of the operating system ("OS"), in addition to an OS menu button that brings up a menu associated with the OS.

Collaboration application 2302 can include the representation of the collaboration workspace 2303 that contains all edits and contributions by the local participant and any other participants, as well as a toolbar 2304. The toolbar 2304 can include various editing tools, settings, commands, and options for interacting with or configuring the representation of the collaboration workspace. For example, the toolbar 2304 can include editing tools to draw on the representation of the collaboration workspace 2303, with edits being propagated over the web socket connection to the server and other connected computed devices.

Toolbar 2304 additionally includes a screen sharing button 2305 that, when selected, cause the local computing device to receive a request to share at least one portion of a local desktop of the local computing device within the collaboration workspace. A user can therefore initiate screen sharing within the collaboration workspace by selecting the screen sharing button 2305.

FIG. 23B illustrates an example of the user interface (desktop) of the local computing device after receiving the request and prior to the selection of an area. As shown in FIG. 23B, selection of the screen sharing button 2305 can cause the appearance of an area window 2309 within the representation of the collaboration workspace 2303. The window 2309 determines the resulting output area for the screen sharing of the local desktop (or portion of the local desktop) and can be moved and/or customized by the user, in terms of size, shape, orientation, location etc. Once the user selects a location/size/shape for the window 2309, the user can finalize the selection through some input (such as depressing a pointing device, reselecting button 2305, or some other input). The selected area, including the relevant parameters (size, shape, orientation, etc.) within the collaboration workspace can then be received by the local computing device. Optionally, the area can be set to some default value, including a default size, location, and orientation, and can be further configured by the user if they wish to deviate from the area.

Of course, the process shown in FIGS. 23A-23B is only one example of receiving a request to share at least one portion of a local desktop of the local computing device within the collaboration workspace and a selection of an area within the representation of the collaboration workspace. This step can be implemented in a variety of ways. For example, the screen share button 2305 can be dragged into the collaboration workspace 2303 rather than selected. The screen share request can also be initiated by the user using some input command, such as a keyboard command or selection within a menu or submenu, which can be recognized by the collaboration application as a request to share a screen. The request to initiate a screen share within the collaboration workspace can also be initiated after a separate screen share session has already been initiated. For example, the user can drag a taskbar tab, icon, or screen share window to a location within the collaboration workspace, resulting the computing device receiving both a request and a selection of an area within the collaboration workspace.

The step of receiving a request to share at least one portion of a local desktop of the local computing device and a selection of an area within the representation of the collaboration workspace can include sub-steps that allow a user to select a source for the screen share, such as whether to share their entire desktop, one or more windows within their desktop, or the output associated with one or more applications running on their local computing devices. These sub-steps can include transmitting a source selection interface within the user interface, the source selection interface being configured to receive a selection of the at least one portion of the local desktop and receiving a selection of the at least one portion of the local desktop within the source selection interface.

Figure 24A:
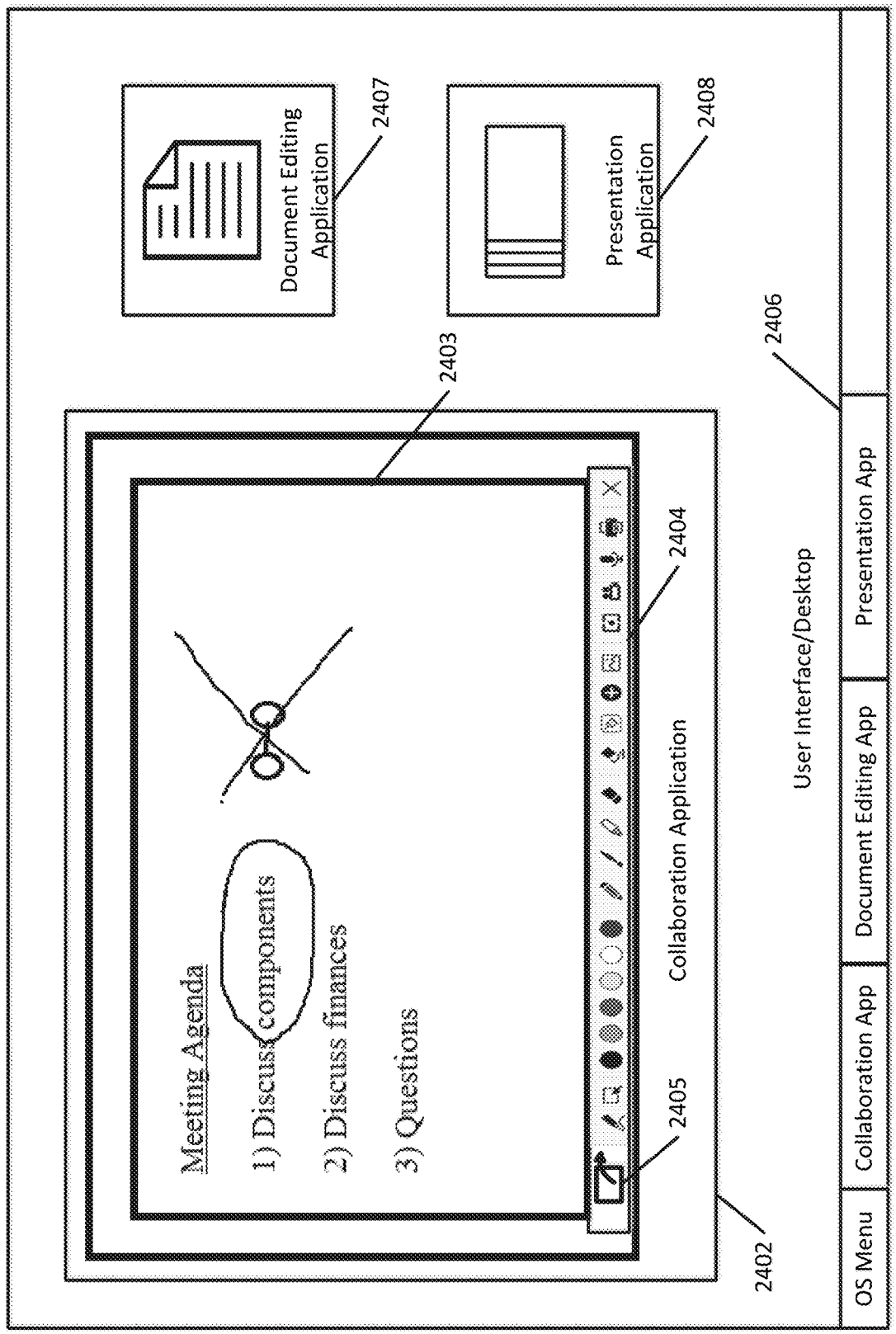
FIGS. 24A-24C illustrate an example of the source selection process according to an exemplary embodiment.
Figure 24B:
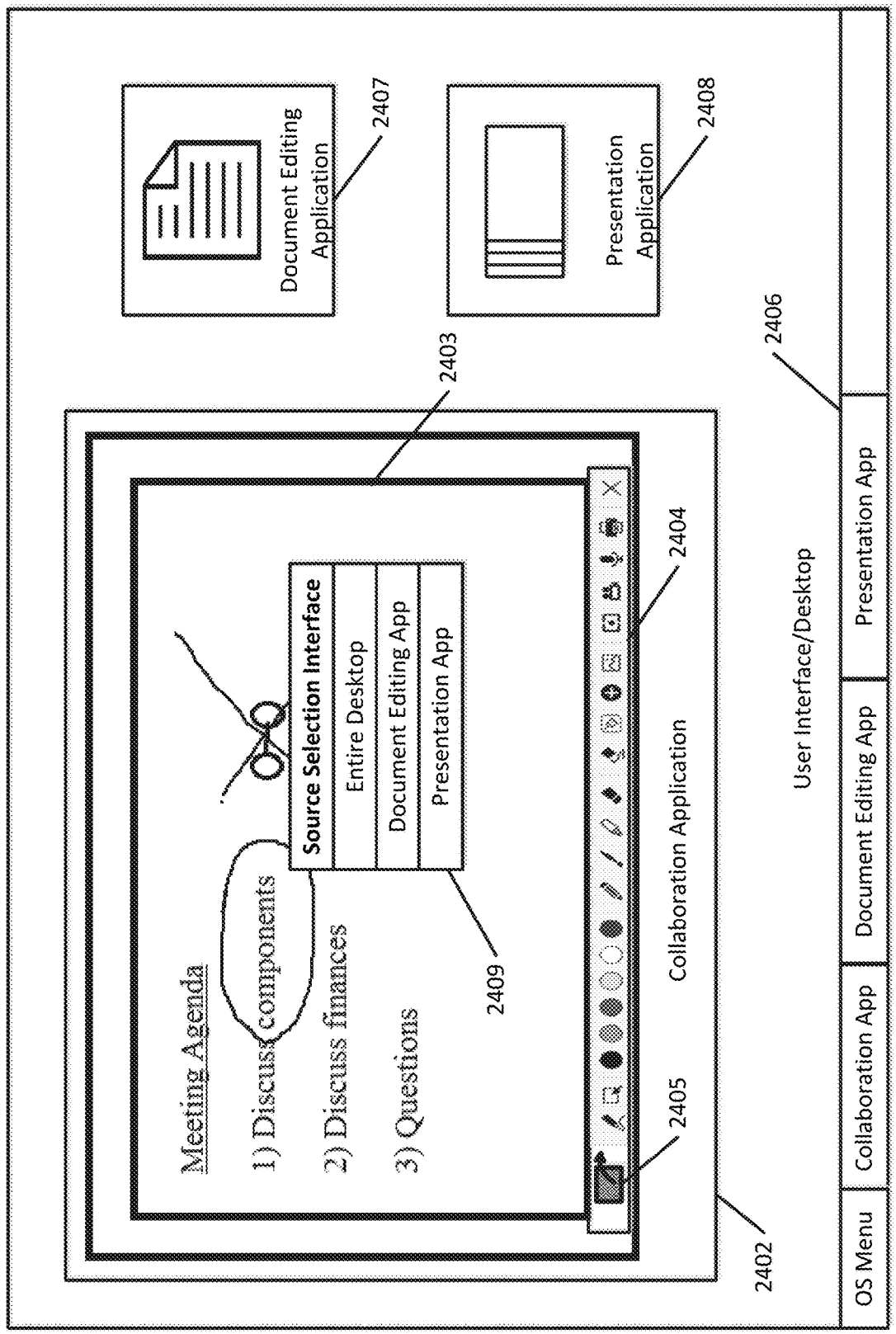
Figure 24C:
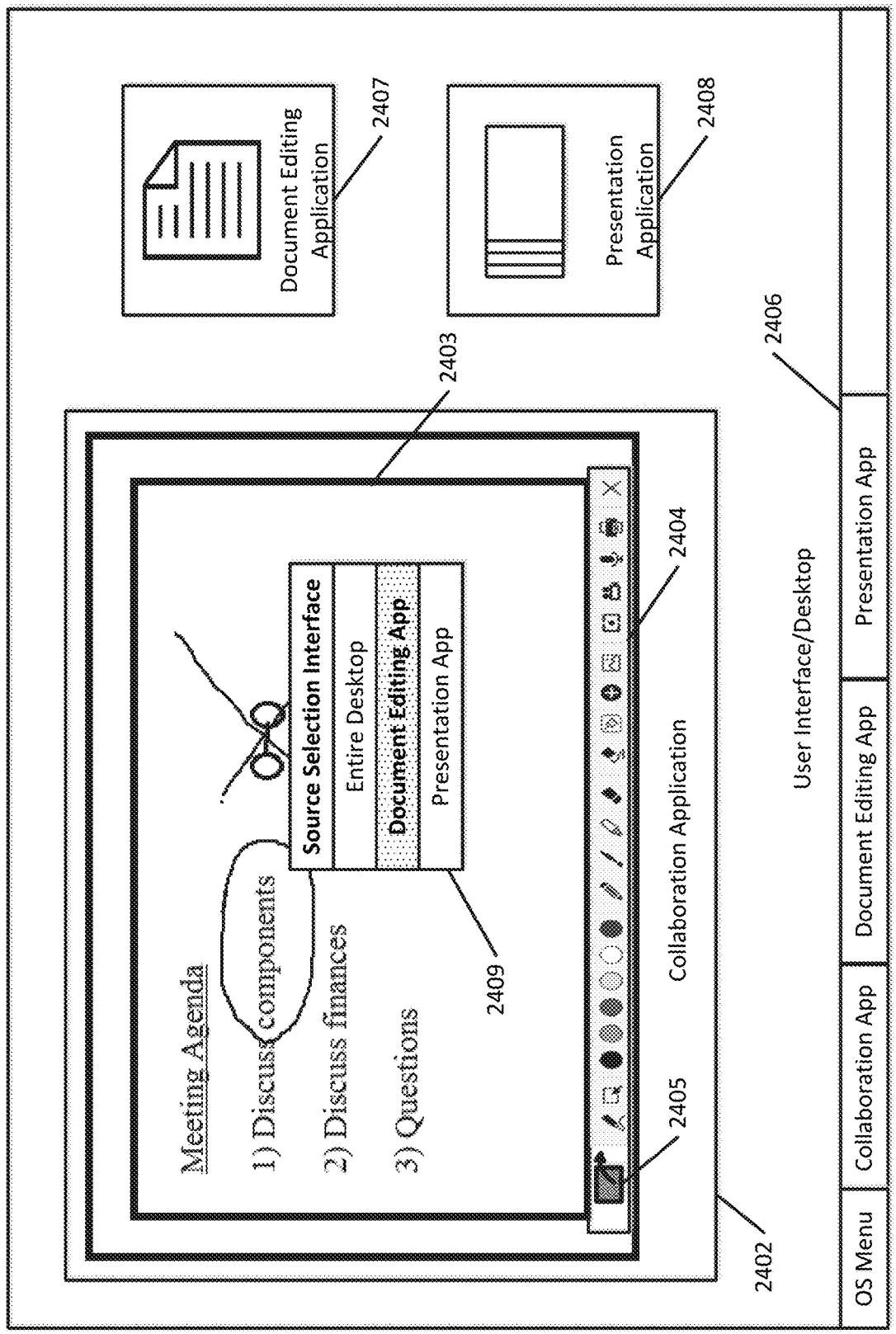

FIGS. 24A-24C illustrate an example of the source selection process according to an exemplary embodiment. FIG. 24A illustrates a user interface (desktop) 2406 of a local computing device prior to the user selecting any screen sharing command or button. Numerals 2401-2408 denote the same components as numerals 2301-2308 in FIG. 23A, discussed above.

FIG. 24B illustrates the user interface 2406 after the user has selected screen share button 2405. As shown in FIG. 24B, a source selection interface 2409 can be transmitted within the collaboration workspace 2403 or within the collaboration application 2404 that allows a user to select whether they would like to share their entire desktop or a portion of their desktop, and which portion of their desktop they would like to share. The source selection interface can list all currently active applications running on the local computing devices, as well as any windows (such as windows corresponding to the OS or windows created by applications) and allow the user to select between sharing the entire local desktop, sharing one or more windows within the local desktop, or sharing one or more interfaces corresponding to one or more applications executing on the local computing device. For example, if a user selects an application for sharing, then all interfaces associated with that application (such as windows, prompts, displays etc.) can be shared. If a user selects a single window for sharing, then only that window will be shared. Additionally, if the user selects to share their entire desktop, then the contents of the entire desktop can be shared with other participants.

FIG. 24C illustrates the interface 2401 after the user has selected the "document editing app" within the selection interface 2409. This selection will designate the document editing app as the source of the screen sharing stream, meaning other participants in the collaboration workspace will be able to view the interface corresponding to the document editing application that is executing on the local computing device. The selection can be stored in memory and/or passed to the application or program used to generate the streaming object that captures the relevant portion of the desktop, as will be discussed further below.

The source selection steps described above and with respect to FIGS. 24A-24C can be performed as part of, prior to, or after the selection of an area as discussed with respect to FIGS. 23A-23B. For example, the system can display a source selection interface after the user selects an area for the screen sharing window. Alternatively, the source selection interface can be displayed prior to selection of an area. The source selection process can also be performed at a later step in the overall process, such as when a streaming object is generated.

The source selection process can also be omitted (defaulting to sharing the entire desktop) and/or can be performed in other ways. For example, rather than displaying a source selection interface, a prompt can be displayed that instructs the user to select all active windows that they would like to share or to enter a command to share the entire desktop. Many variations are possible and these examples are not intended to be limiting.

The inputs described with respect to step 2002 and FIGS. 23A-23B and 24A-24C can be received via any type of pointing device, such as a mouse, touchscreen, or stylus. The earlier described techniques involving the virtual driver and/or the transparent layer can be used to detect inputs. For example, the input can be a pointing gesture by the user. Additionally, the actions described above, such as drag-and-drop actions, selection, deselection, or other inputs or sequences of inputs, can also be input using the earlier described techniques involving the virtual driver and/or transparent layer.

Returning to FIG. 20, at step 2003 a streaming object configured to output a video stream of the at least one portion of the local desktop of the local computing device is generated. The streaming object can be a media stream such as a video stream that is configured to capture a stream of the at least one portion of the local desktop.

As discussed earlier, the representation of a collaboration workspace hosted on the server can be transmitted on the local computing device by a local collaboration application executing on the local computing device. This collaboration application can be, for example, a web application, and communicate and interface with a screen capture program on the local computing device. The screen capture program is a program that is configured to generate a stream of at least a portion of the desktop. The collaboration application can interface with the screen capture program via an Application Programming Interface (API). Additionally, the collaboration application can interface with the screen capture program via the transparent layer, which itself interfaces with multiple applications running on the local computing device. The screen capture program functionality used to generate the media stream can also be integrated into the collaboration application so that the collaboration application can simply call the relevant routine or process to instantiate the streaming object.

Figure 25:
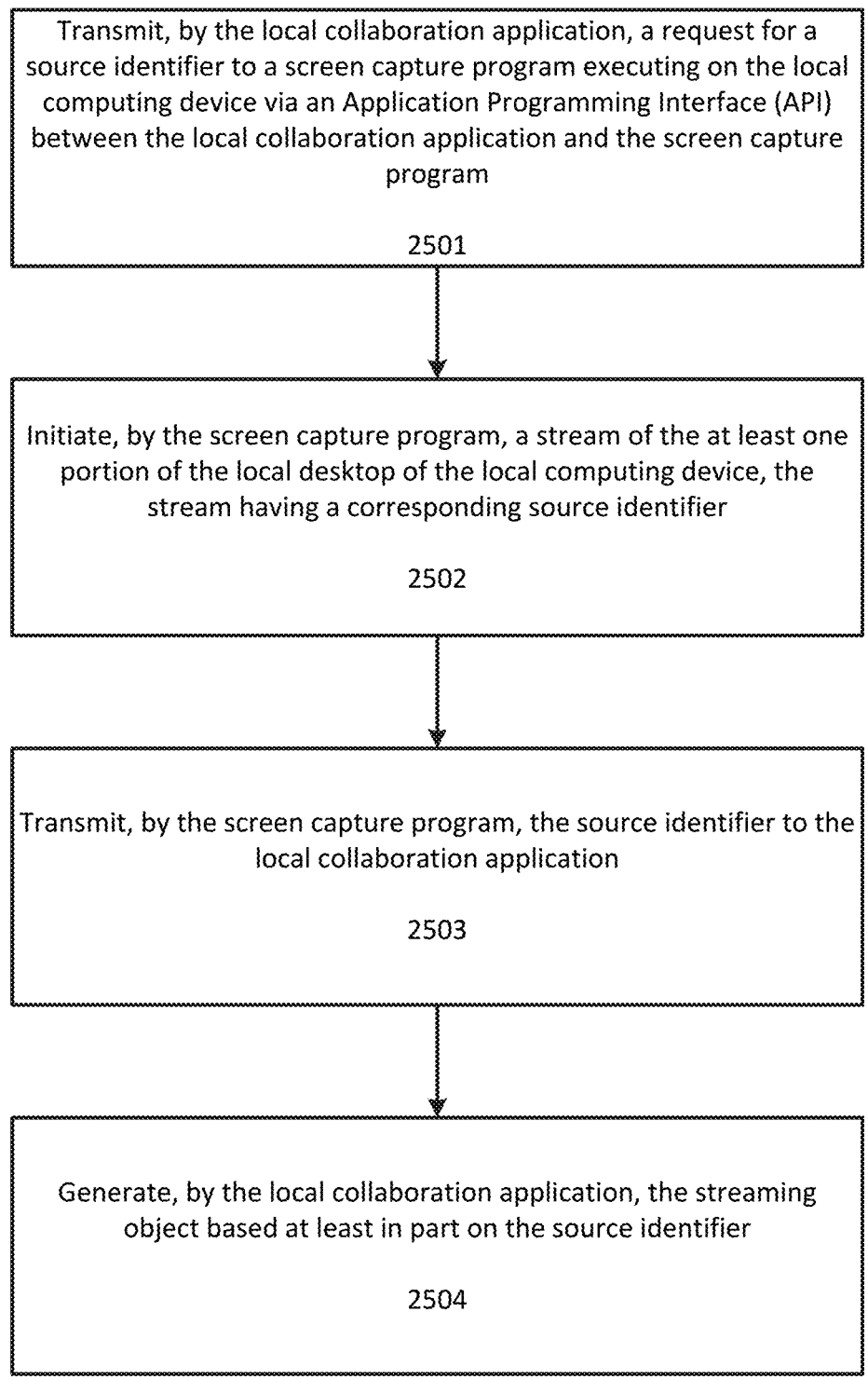
FIG. 25 illustrates a flowchart for generating a streaming object configured to output a video stream of the at least one portion of the local desktop of the local computing device according to an exemplary embodiment.

FIG. 25 illustrates a flowchart for generating a streaming object configured to output a video stream of the at least one portion of the local desktop of the local computing device according to an exemplary embodiment.

At step 2501 the local collaboration application transmits a request for a source identifier to a screen capture program executing on the local computing device via an Application Programming Interface (API) between the local collaboration application and the screen capture program. As discussed earlier, this API can be the transparent layer itself. The request can include additional attributes, such as the selected source of the screen sharing stream (such as a particular application or window). Alternatively, the source selection process can be performed after the request is submitted or omitted in place of a default source (such as the entire desktop). The source identifier is the handle or address of the media stream which will be created and which allows applications to access the output of the media stream and the resulting screen share.

At step 2502 the screen capture program initiates a stream of the at least one portion of the local desktop of the local computing device, the stream having a corresponding source identifier. When source parameters are provided to the screen capture program, the screen capture program can initiate the stream using only the identified components (such as a particular application or window). Otherwise, the screen capture program can either initiate a stream of the entire local desktop by default or present source selection options to the user as discussed earlier. The initiated stream is a sequence of screen captures that capture a snapshot of the at least one portion of the desktop periodically (such as 30 times per second). The stream can be accessed using the source identifier, which as discussed above, is a handle that allows programs to access the stream.

At step 2503 the screen capture program transmits the source identifier to local collaboration application. At step 2504 the local collaboration application generates a streaming object based at least in part on the source identifier. In addition to the source identifier, the local collaboration application can optionally utilize the earlier provided information, such as the area specified by the user, to create the streaming object. The streaming object is a media stream and a corresponding output interface that has a defined format. The defined format can optionally be based upon user input, such as the selected area. The streaming object is a media stream object that is compatible with and configured to be embedded within the collaboration workspace, similar to a video stream from a participant's camera.

The screen capture program is a program that is configured to generate a stream of the local desktop or a portion of the local desktop or a component that is integrated into the local collaboration application and that is configured to generate a stream of the local desktop or a portion of the local desktop. For example, the screen capture program can be a web browser or browser engine component that is a base or end-point for Web Real-Time Communication (WebRTC) streaming. The following sections provide an example implementation of the step of generating a streaming object when the screen capture program is Chrome.

Screen capture functionality in Chrome can be accessed through a MediaDevices.getUserMedia( ) function interface. The gUM function can be called once to retrieve an user audio/video stream, and a second time to get a screen stream.

In Chrome, permission to use the screen capture functionality can be enabled by utilizing a chrome extension in a web application (such as one possible implementation of the collaboration application). The extension utilizes the function chrome.desktopCapture.chooseDesktopMedia( ) to return a sourceID. The sourceID can then be used as an argument in the gUM function to retrieve the corresponding stream.

The extension for screen sharing a can include a content script which runs in the context of the collaboration application and a background script running in a separate extension context. The content script can communicate with the collaboration application by sending messages to window or via document object model (DOM) manipulation, whereas the background script cannot. The background script can access all Chrome extension API's, but the content script cannot. The content script and background script can communicate with each other via the function chrome.runtime.connect( ). Given this architecture, the process of generating a streaming object configured to output a video stream of the at least one portion of the local desktop of the local computing device can be performed by:

(1) The collaboration application sending a request to the content script for a screen share source identifier;

(2) The content script passing the request to the background script;

(3) The background script calling the function chrome.desktopCapture.chooseDesktopMedia( ) and returning the source identifier back to the content script.

(4) The content script returning this to the collaboration application, which finally calls the getUserMedia( ) function with the source identifier as one of the constraints/arguments.

For the gUM function in Chrome, the constraints for video streams can include {chromeMediaSource: 'desktop'; maxWidth: 1920; maxHeight: 1080; maxFrameRate: 10; minAspectRatio: 1.77; chromeMediaSourceId: sourceId} or {maxWidth: 1920; maxHeight: 1080; maxFrameRate: 10; minAspectRatio: 1.77; chromeMediaSourceId: sourceId}.

The screen sharing gUM call returns a mediaStream which can be shared over peer connections as a WebRTC mediaStream.

Of course, the above-mentioned implementation utilizing the Chrome browser as a screen capture program is provided as an example only, and the step of generating a streaming object can be performed using other programs or browsers that support screen capture functionality, such as Firefox, or a separate and stand-alone screen capture program.

Returning to FIG. 20, at step 2004 the local computing device transmits one or more commands to the server over the web socket connection. The one or more commands can include the streaming object and information corresponding to the selected area and are configured to cause the server to insert the streaming object into the collaboration workspace based at least in part on the selected area.

For example, if the user previously selected a circular area in the bottom-right-hand corner of the collaboration workspace as the selected area for the screen share, then the streaming object can be inserted into the collaboration workspace by the server such that the media stream is displayed in a circular format and in the bottom-right-hand corner of the collaboration workspace when embedded in the collaboration workspace. The size and orientation of the circle can be based upon the same attributes of the selected area. Of course, like any other object in the collaboration workspace, the streaming object can be adjusted or moved by participants after it is embedded in the collaboration workspace by interacting with their representation of the collaboration workspace.

The format of the streaming object within the collaboration workspace can be determined based upon the area previously selected, including attributes of the selected area, such as the shape, size, and position. These attributes can be transmitted along with the streaming object itself in the one or more commands sent to the server. The server can then determine an insertion point and format for embedding the streaming object into the collaboration workspace based upon these attributes.

Alternatively, the streaming object can be a media stream object with predefined spatial attributes based upon the user's previous selection of an area. In this case, the display attributes of the streaming object can be integrated into the streaming object when the streaming object is generated at the local computing device The streaming object (with embedded spatial attributes) can then be sent to the server, which embeds the streaming object into the collaboration workspace at the appropriate location and in the appropriate format based upon the embedded spatial attributes.

Rather than including the streaming object itself, the one or more commands can optionally include an address of the streaming object or other identifier that can be used by the server to retrieve the streaming object or instantiate its own instance of the streaming object.

The insertion of the streaming object into the collaboration workspace by the server causes representations of the streaming object to be propagated to the plurality of computing devices over the web socket connection. Each of the connected computing devices will therefore have a representation of the streaming object in their respective representations of the collaboration workspace.

The inserted streaming object is configured to receive the video stream of the at least one portion of the local desktop of the local computing device and transmit the video stream of the at least one portion of the local desktop of the local computing device to the plurality of computing devices over the web socket connection.

As discussed earlier, this process involves the stream information being forwarded from the local computing device that instantiated the streaming object (and which is identified as the source of the media stream by the stream identifier) to the server, and then to each of the plurality of computing devices connected to the server in their representation of the collaboration workspace. Therefore, the streaming object itself can be embedded within the collaboration workspace on the server and the resulting stream can be propagated to the connected clients.

Figure 26:
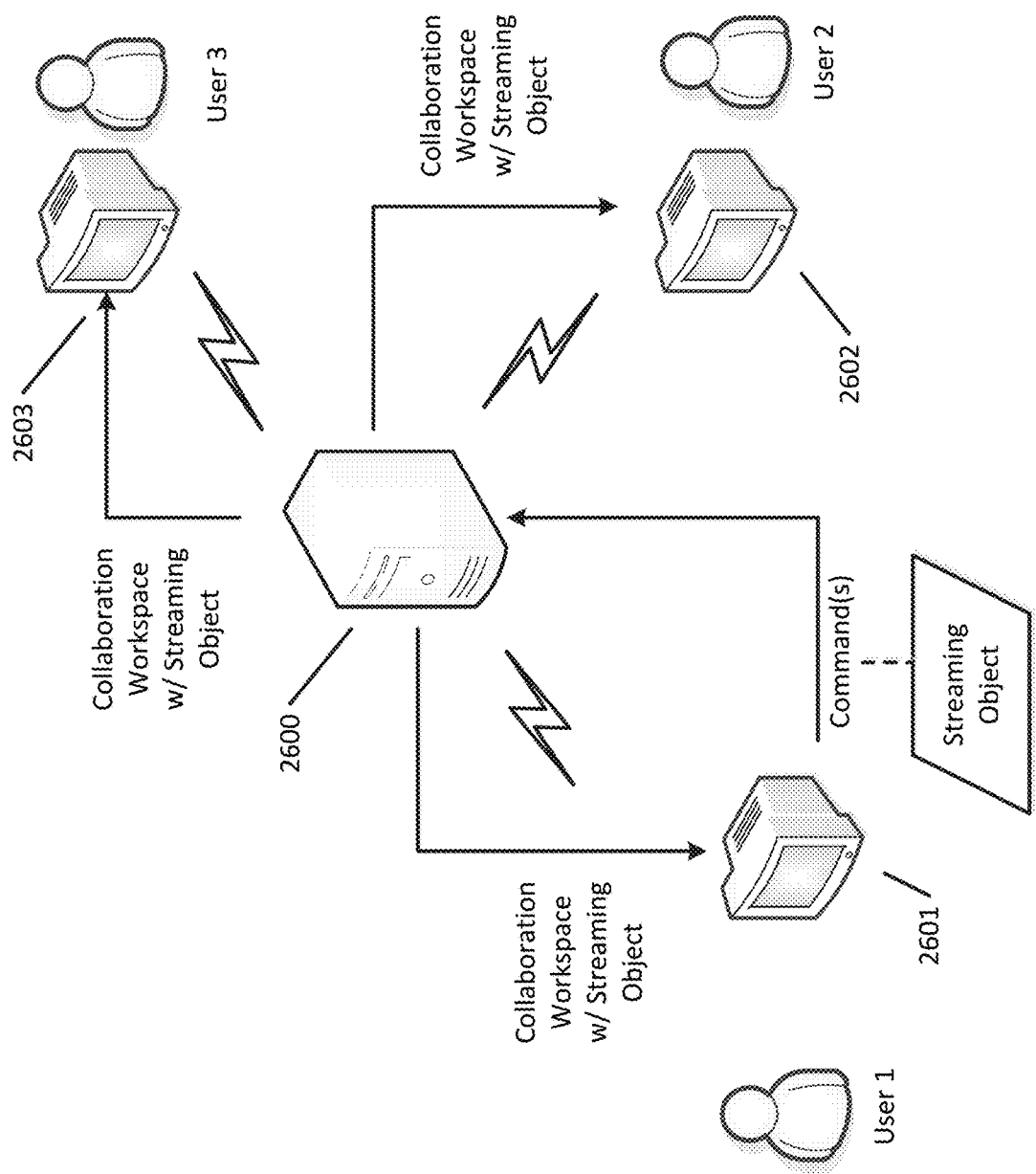
FIG. 26 illustrates the process of sending the commands from the local computing device and propagating the streaming object according to an exemplary embodiment.

FIG. 26 illustrates the process of sending the commands from the local computing device and propagating the streaming object according to an exemplary embodiment. As shown in FIG. 26, local computing device 2601 sends commands (including either the streaming object or a reference/pointer to the streaming object) to server 2600.

Server 2600 then inserts the streaming object into the collaboration workspace, resulting in the collaboration workspace with embedded streaming object being propagated to all connected devices, including local computing device 2601 and remote computing devices 2602 and 2603.

Figure 27:
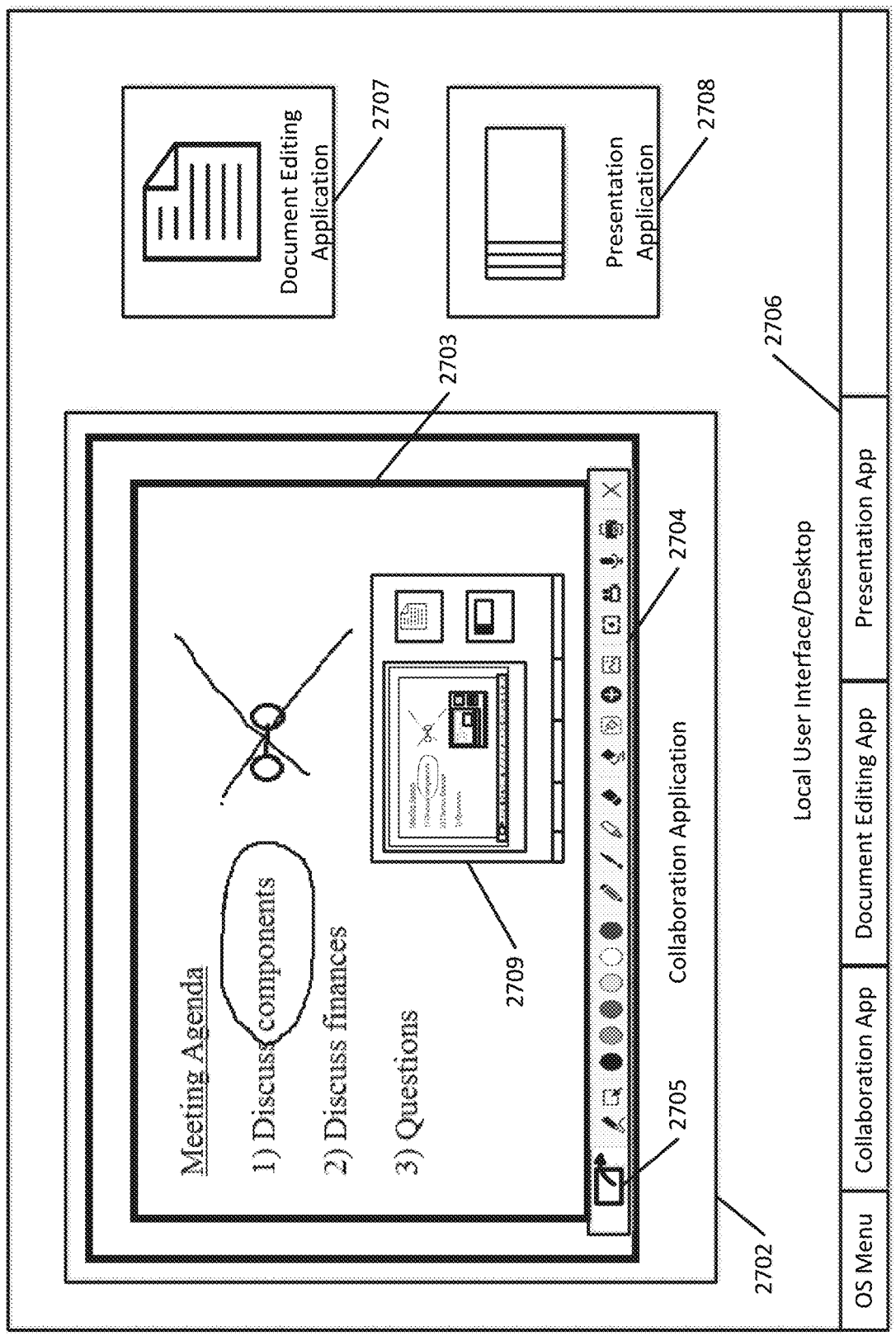
FIG. 27 illustrates an example of the interface of the local computing device after the server embeds the streaming object within the collaboration workspace according to an exemplary embodiment.

FIG. 27 illustrates an example of the interface of the local computing device after the server embeds the streaming object within the collaboration workspace according to an exemplary embodiment. Numerals 2701-2708 correspond to the same components described with respect to numerals 2301-2308 in FIG. 23A. FIG. 27 additionally shows the embedded streaming object 2709 which displays a media stream of the user's desktop. In this case, it is assumed that the selected source is the entire desktop. Each of the remote participants connected to the server will have the same streaming object embedded within their representations of the collaboration workspace. As shown in FIG. 27, the resulting embedded stream provides a "picture-in-picture" effect that allows both the local participant and remote participants to view the contents of a shared screen within the context of the collaboration workspace. Participants may therefore share pertinent programs and information without disrupting the collaboration session.

In addition to the above described techniques, Applicant has additionally discovered novel techniques for allowing both local participants and remote participants to control the desktop or portion of desktop displayed within the embedded streaming object. This novel technique utilizes the transparent layer and allows users (both local and remote) to effectively browse the desktop or portion of desktop presented within the embedded streaming object.

Figure 28:
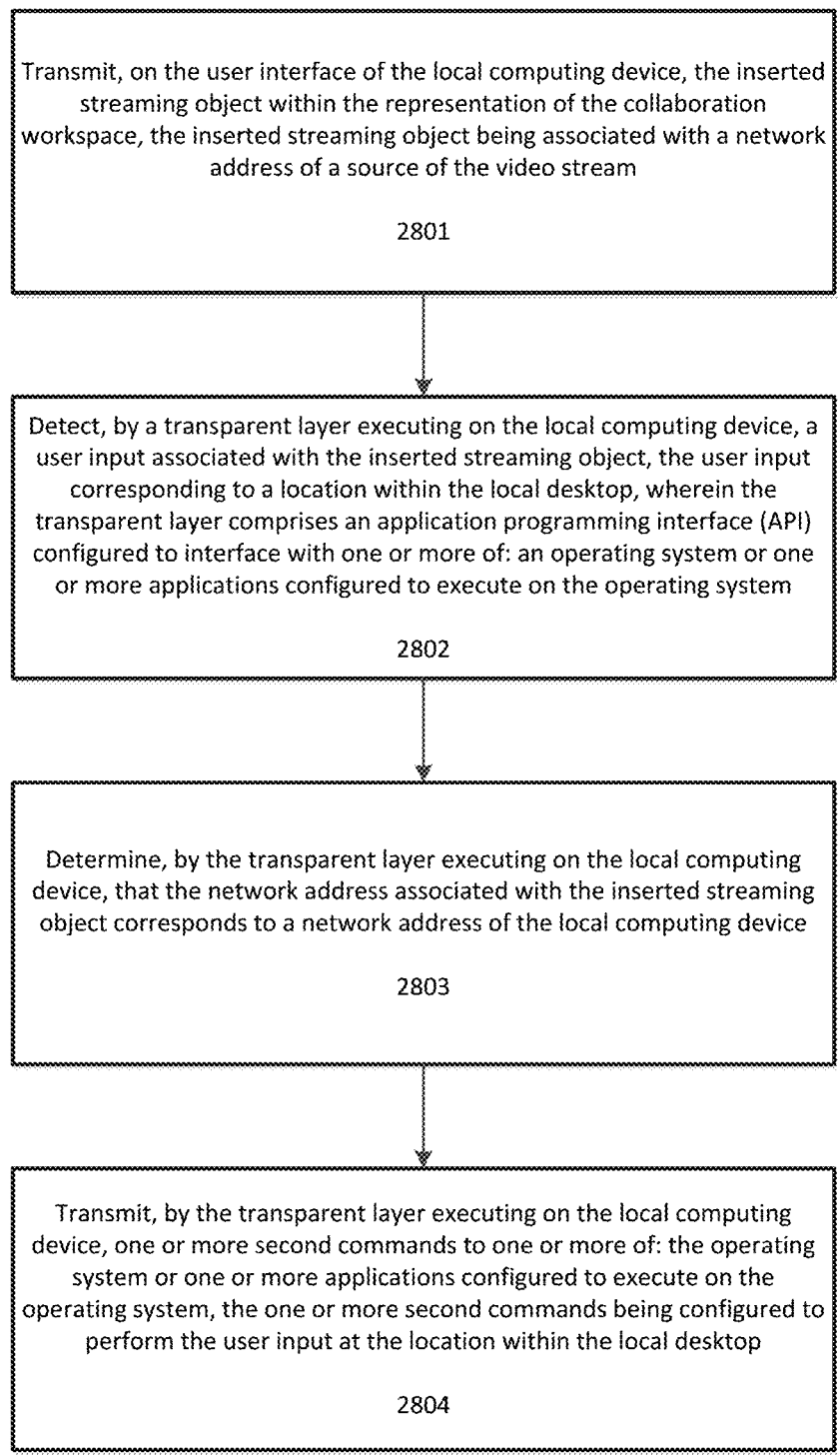
FIG. 28 illustrates a flowchart for controlling a desktop or portion of a desktop via an embedded streaming object from a local computing device according to an exemplary embodiment.

FIG. 28 illustrates a flowchart for controlling a desktop or portion of a desktop via an embedded streaming object from a local computing device according to an exemplary embodiment.

At step 2801 the inserted streaming object is transmitted within the representation of the collaboration workspace on the user interface of the local computing device. The inserted streaming object is associated with a network address of a source of the video stream. This association can be supplied by the server in the form of a tag or metadata associated with the streaming object. Additionally, the association can be part of the streaming object and can be based upon, for example, the source identifier discussed earlier. For example, when the streaming object is created, the device creating the streaming object can include a tag indicating the IP address of the device.

At step 2802 a transparent layer executing on the local computing device detects a user input associated with the inserted streaming object, the user input corresponding to a location within the local desktop. As discussed earlier, the transparent layer comprises an application programming interface (API) configured to interface with one or more of: an operating system or one or more applications configured to execute on the operating system. The transparent layer can detect a user input associated with the inserted streaming object based upon a location of the input (as determined by the coordinates) and the location of the streaming object. For example, if there is an overlap between a mouse click and some portion of the streaming object, this input can be detected as a user input associated with the inserted streaming object.

The user input can additionally be mapped to a specific location within the local desktop based upon the location of the input within the inserted streaming object. Once again, a map can be stored indicating areas or coordinates within the inserted streaming object associated with different portions of the local desktop and the location can be mapped to a respective portion of the local desktop. For example, a sub-area of the inserted streaming object can be associated with a particular application occupying a corresponding area in the local desktop or can be associated with a corresponding coordinate within the local desktop.

The mapping procedure can utilize a scaling mechanism or process that detects the relative location of an input within the inserted streaming object and maps the relative location to an absolute location within the desktop (or portion of a desktop) that is being streamed by the streaming object.

Additionally, as discussed earlier, the input can be from a pointing device, such as a mouse, or via other input means, such as input mechanisms that rely upon the virtual driver and transparent layer.

At step 2804 the transparent layer executing on the local computing device determines that the network address associated with the inserted streaming object corresponds to a network address of the local computing device. This can be determined, for example, by comparing the IP address of the device providing the input to the IP address associated with the streaming object to determine if there is a match.

At step 2805, based on the determination that the network address associated with the inserted streaming object corresponds to a network address of the computing device providing the input, the transparent layer transmits one or more second commands to one or more of: the operating system or one or more applications configured to execute on the operating system, the one or more second commands being configured to perform the user input at the location within the local desktop.

As discussed earlier, the transparent layer can interface with the OS or with applications running on the OS. Therefore any input within the inserted streaming object can be mapped to a corresponding location within the local desktop and a command can be sent (depending on the relevant context, as discussed earlier) to the appropriate application or to the OS, to perform an input at the corresponding location within the local desktop.

Figure 29A:
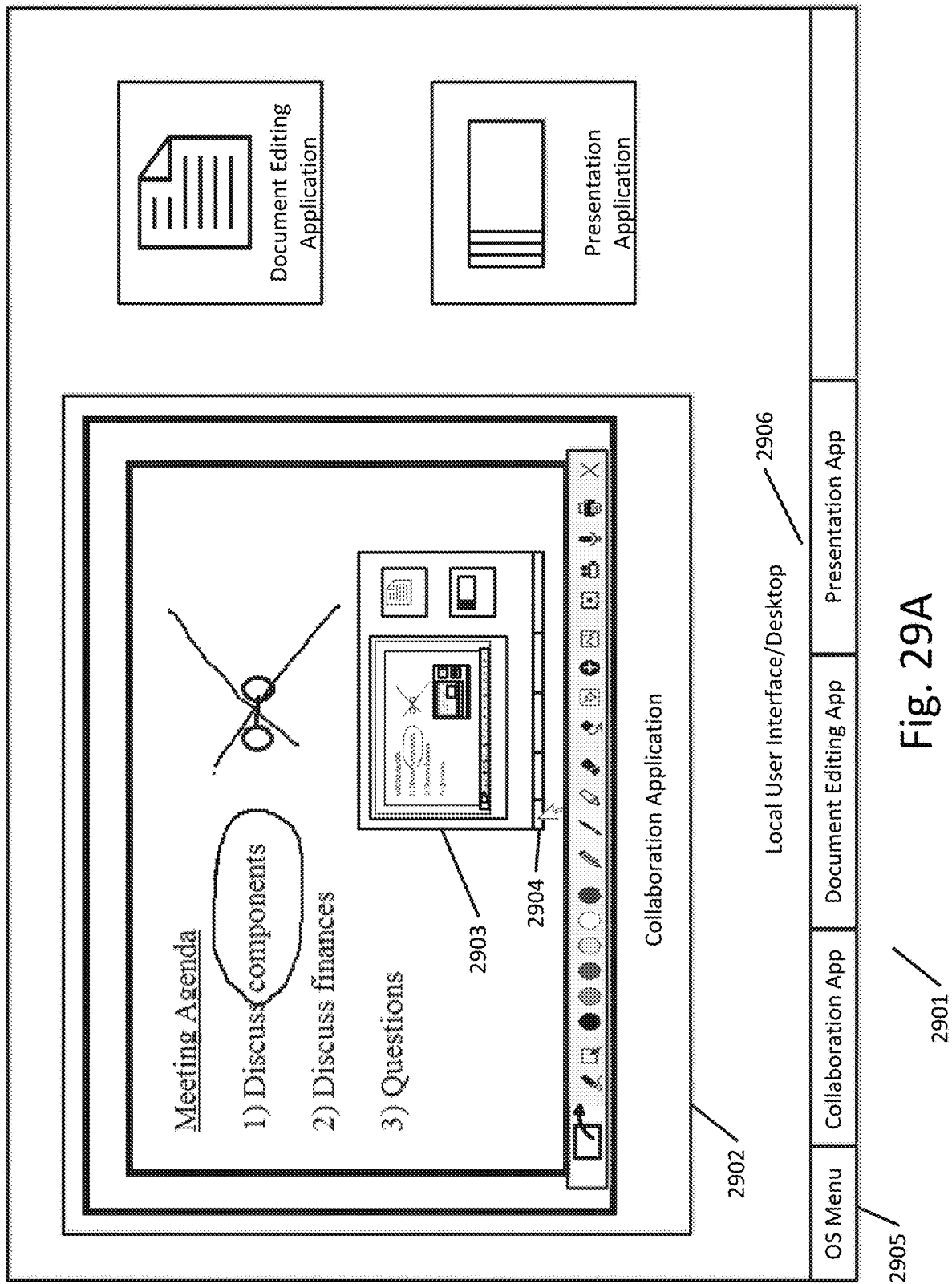
FIGS. 29A-29C illustrate an example of controlling a desktop or portion of a desktop via an embedded streaming object from a local computing device according to an exemplary embodiment.
Figure 29B:
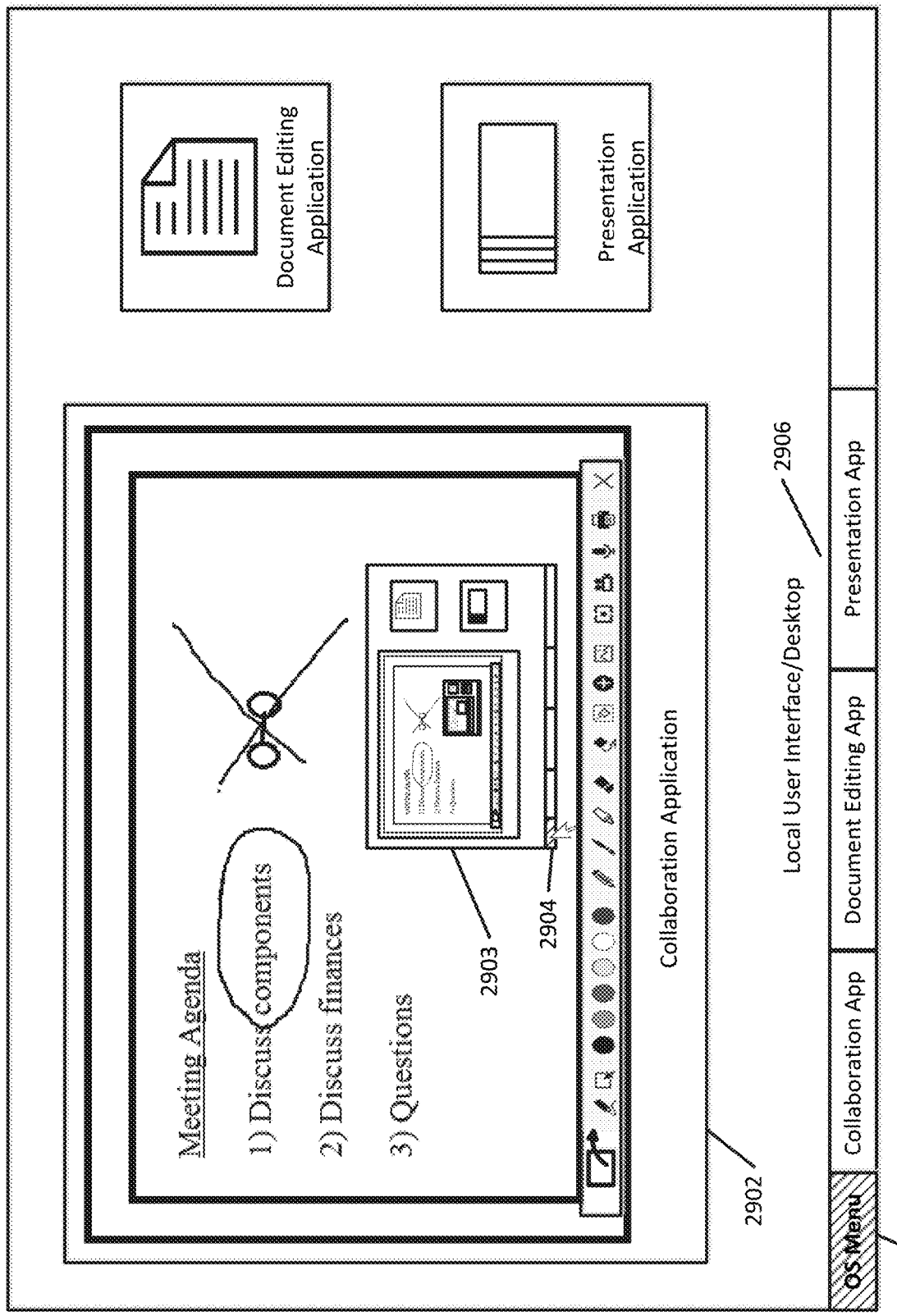
Figure 29C:
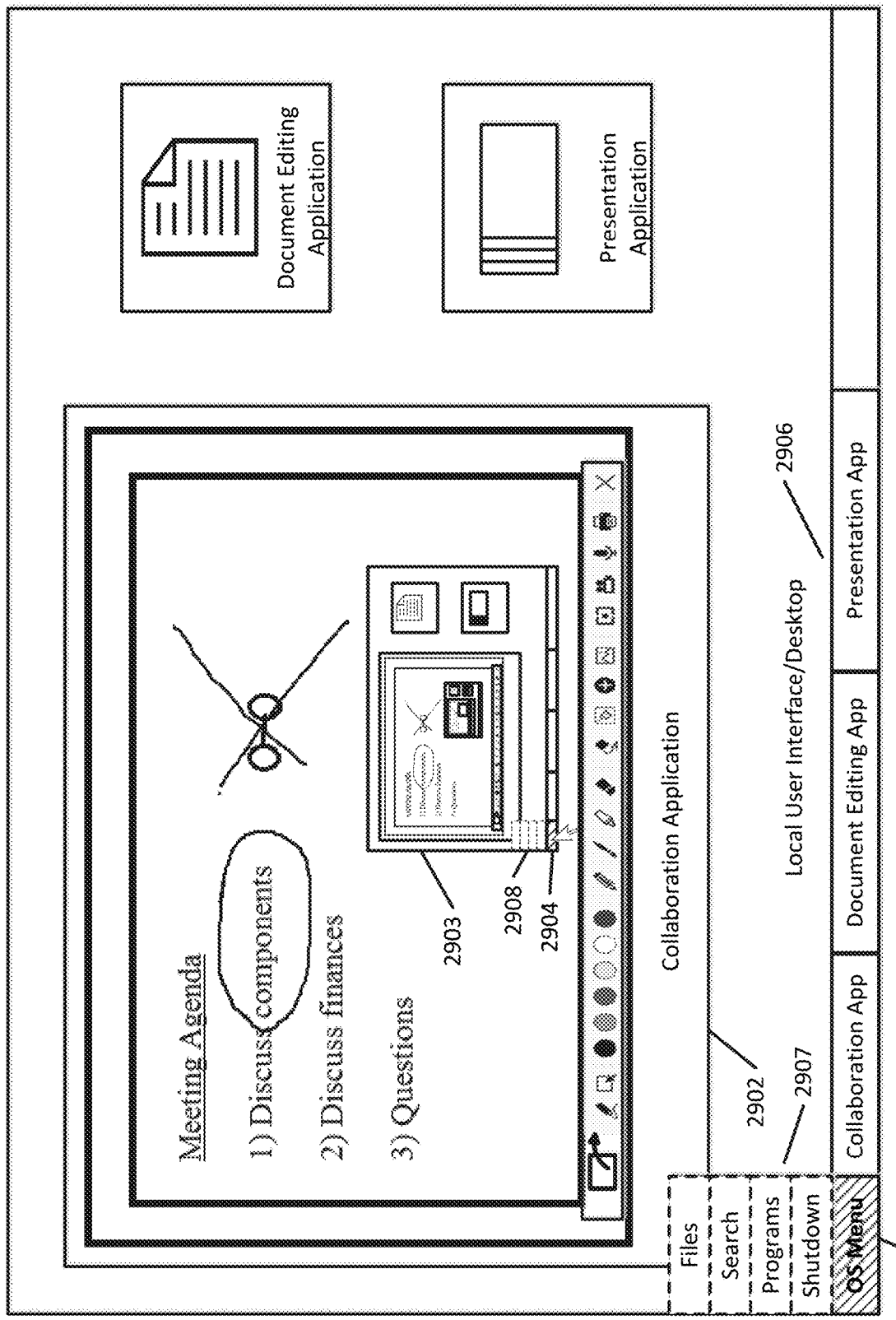

FIGS. 29A-29C illustrate an example of controlling a desktop or portion of a desktop via an embedded streaming object from a local computing device according to an exemplary embodiment.

As shown in FIG. 29A, the local user interface (desktop) 2901 includes a collaboration application 2902 displaying a representation of a collaboration workspace. The representation includes an inserted/embedded streaming object 2903 which is streaming the local desktop itself. The local user interface 2901 also includes a task bar 2906, including an OS Menu button 2905. As shown in the figure, the mouse pointer is over a button 2904 within the inserted streaming object 2903 that corresponds to the OS Menu button 2905 within the local desktop.

FIG. 29B illustrates the result of the user clicking at the location of the button 2904 within the streaming object 2903. As a result of that input, which is detected by the transparent layer, the location of the input within the streaming object 2903 is mapped to a corresponding location within the desktop 2901. Since the corresponding location is OS Menu button 2905, this input results in the transparent layer sending a command to the OS to activate OS Menu button 2905. This change in the desktop 2901 is itself captured by the streaming object, which shows button 2904 within the inserted streaming object being activated as well.

FIG. 29C illustrates the interface 2901 and inserted streaming object 2903 after the input is carried through to the local desktop. As shown in FIG. 29C, the OS Menu is opened and includes a list of selectable indicators 2907. This change is consequently captured by the inserted streaming object 2903, which itself shows a corresponding opening of button 2904, including a list of selectable indicators 2908.

As shown above, the transparent layer can effectively be used to control the local desktop through the embedded streaming object. This effectively provides a user participating in the collaboration session with a remote control interface that allows them to stay within the collaboration session and at the same time navigate their desktop or applications within their desktop that they are sharing with other participants.

The present system can also be utilized to allow a remote participant to control a desktop or portion of a desktop that is being shared. This functionality has great utility as it allows remote participants to access other desktops and applications that are being shared via an inserted streaming object within a collaboration workspace.

Figure 30:
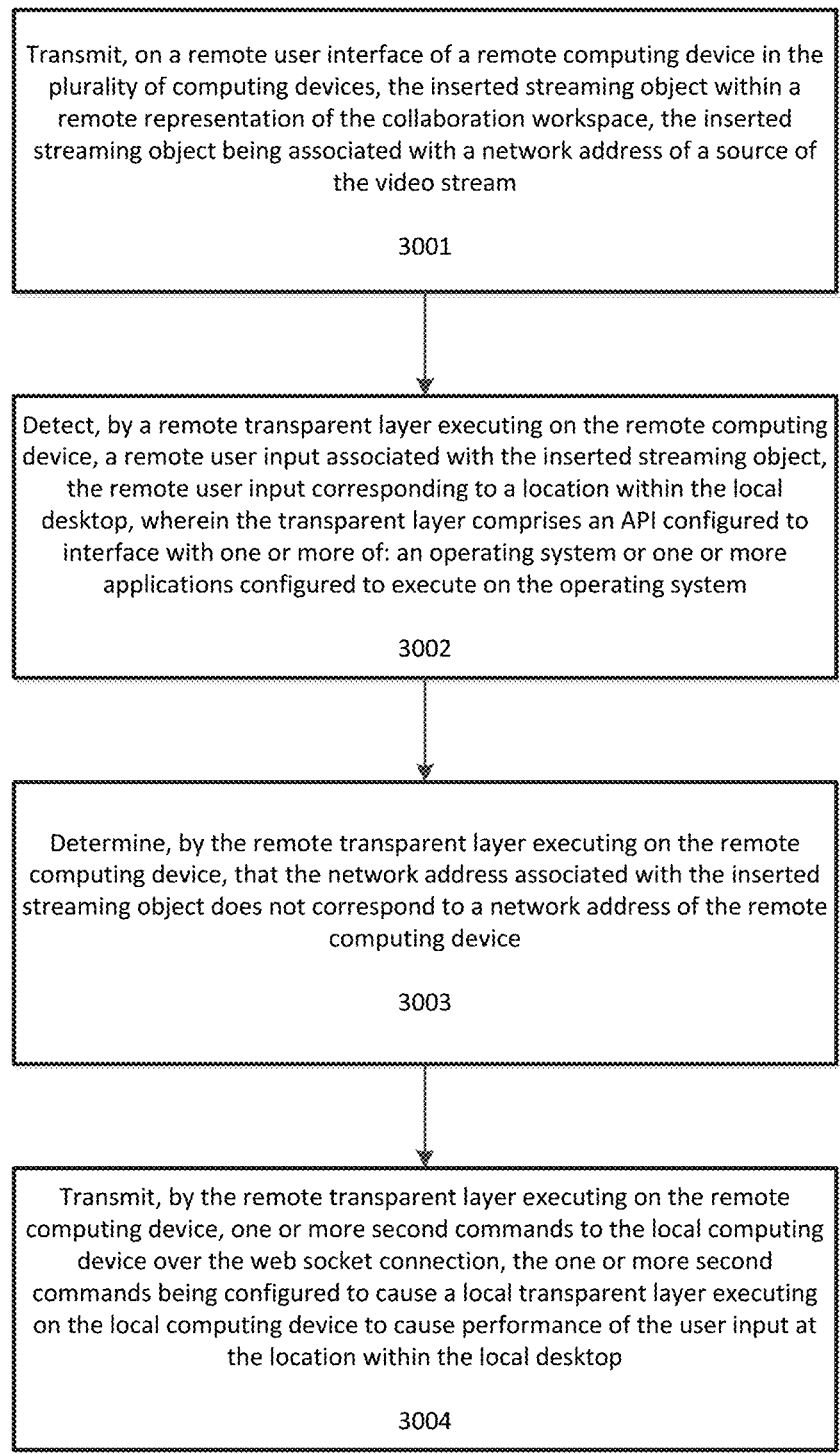
FIG. 30 illustrates a flowchart for controlling a desktop or portion of a desktop via an embedded streaming object from a remote computing device according to an exemplary embodiment.

FIG. 30 illustrates a flowchart for controlling a desktop or portion of a desktop via an embedded streaming object from a remote computing device according to an exemplary embodiment.

At step 3001 the inserted streaming object is transmitted within the representation of the collaboration workspace on the user interface of a remote computing device. The inserted streaming object is associated with a network address of a source of the video stream. This association can be supplied by the server in the form of a tag or metadata associated with the streaming object. Additionally, the association can be part of the streaming object and can be based upon, for example, the source identifier discussed earlier. For example, when the streaming object is created, the device creating the streaming object can include a tag indicating the IP address of the device.

At step 3002 a transparent layer executing on the remote computing device detects a user input associated with the inserted streaming object, the user input corresponding to a location within the local desktop. As discussed earlier, the transparent layer comprises an application programming interface (API) configured to interface with one or more of: an operating system or one or more applications configured to execute on the operating system. The transparent layer can detect a user input associated with the inserted streaming object based upon a location of the input (as determined by the coordinates) and the location of the streaming object. For example, if there is an overlap between a mouse click and some portion of the streaming object, this input can be detected as a user input associated with the inserted streaming object.

The user input can additionally be mapped to a specific location within the local desktop based upon the location of the input within the inserted streaming object. Once again, a map can be stored indicating areas or coordinates within the inserted streaming object associated with different portions of the local desktop and the location can be mapped to a respective portion of the local desktop. For example, a sub-area of the inserted streaming object can be associated with a particular application occupying a corresponding area in the local desktop or can be associated with a corresponding coordinate within the local desktop.

The mapping procedure can utilize a scaling mechanism or process that detects the relative location of an input within the inserted streaming object and maps the relative location to an absolute location within the desktop (or portion of a desktop) that is being streamed by the streaming object.

Additionally, as discussed earlier, the input can be from a pointing device, such as a mouse, or via other input means, such as input mechanisms that rely upon the virtual driver and transparent layer.

At step 3004 the transparent layer executing on the remote computing device determines that the network address associated with the inserted streaming object does not correspond to a network address of the remote computing device. This can be determined, for example, by comparing the IP address of the device providing the input (the remote computing device) to the IP address associated with the streaming object to determine if there is a match.

At step 3005, based on the determination that the network address associated with the inserted streaming object does not correspond to a network address of the computing device providing the input, the transparent layer transmits one or more second commands to the local computing device over the web socket connection, the one or more second commands being configured to cause a local transparent layer executing on the local computing device to cause performance of the user input at the location within the local desktop.

The one or more second commands can be routed from the remote computing device to the local computing device through the server and over the web socket connection. In particular, the one or more second commands can be sent to the server with the destination address as the IP address of the local computing device and then routed by the server to the local computing device.

The one or more second commands can be configured to cause the local transparent layer at the local computing device to itself send local commands to one or more of: the local operating system or one or more local applications configured to execute on the local operating system, the one or more local commands being configured to perform the user input at the location within the local desktop.

As discussed earlier, the transparent layer can interface with the OS or with applications running on the OS. Therefore any input within the inserted streaming object can be mapped to a corresponding location within the local desktop and a command can be sent from the local transparent layer (depending on the relevant context, as discussed earlier) to the appropriate application or to the OS on the local computing device, to perform an input at the corresponding location within the local desktop.

Figure 31A:
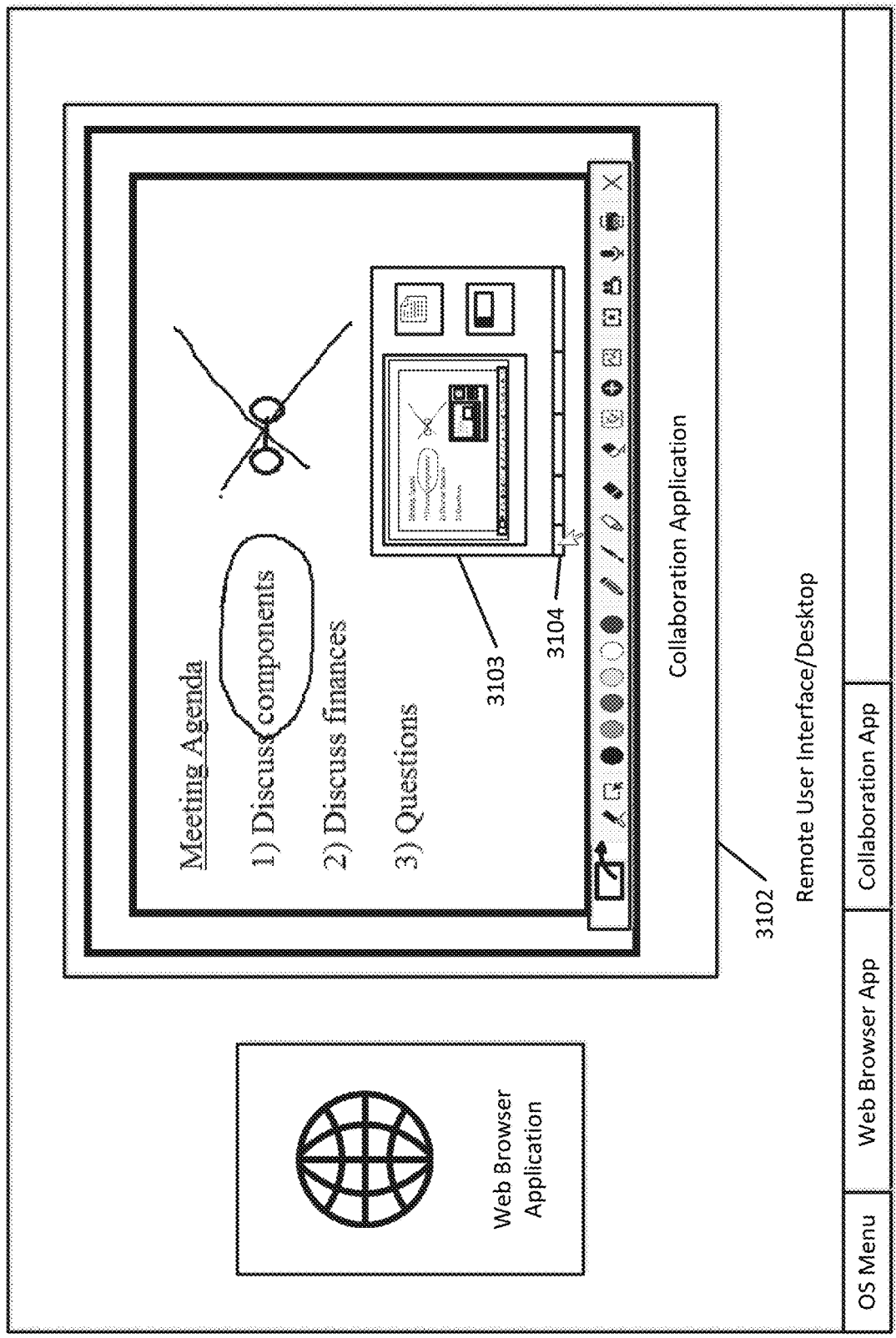
FIGS. 31A-31C illustrate an example of controlling a desktop or portion of a desktop via an embedded streaming object from a remote computing device according to an exemplary embodiment.
Figure 31B:
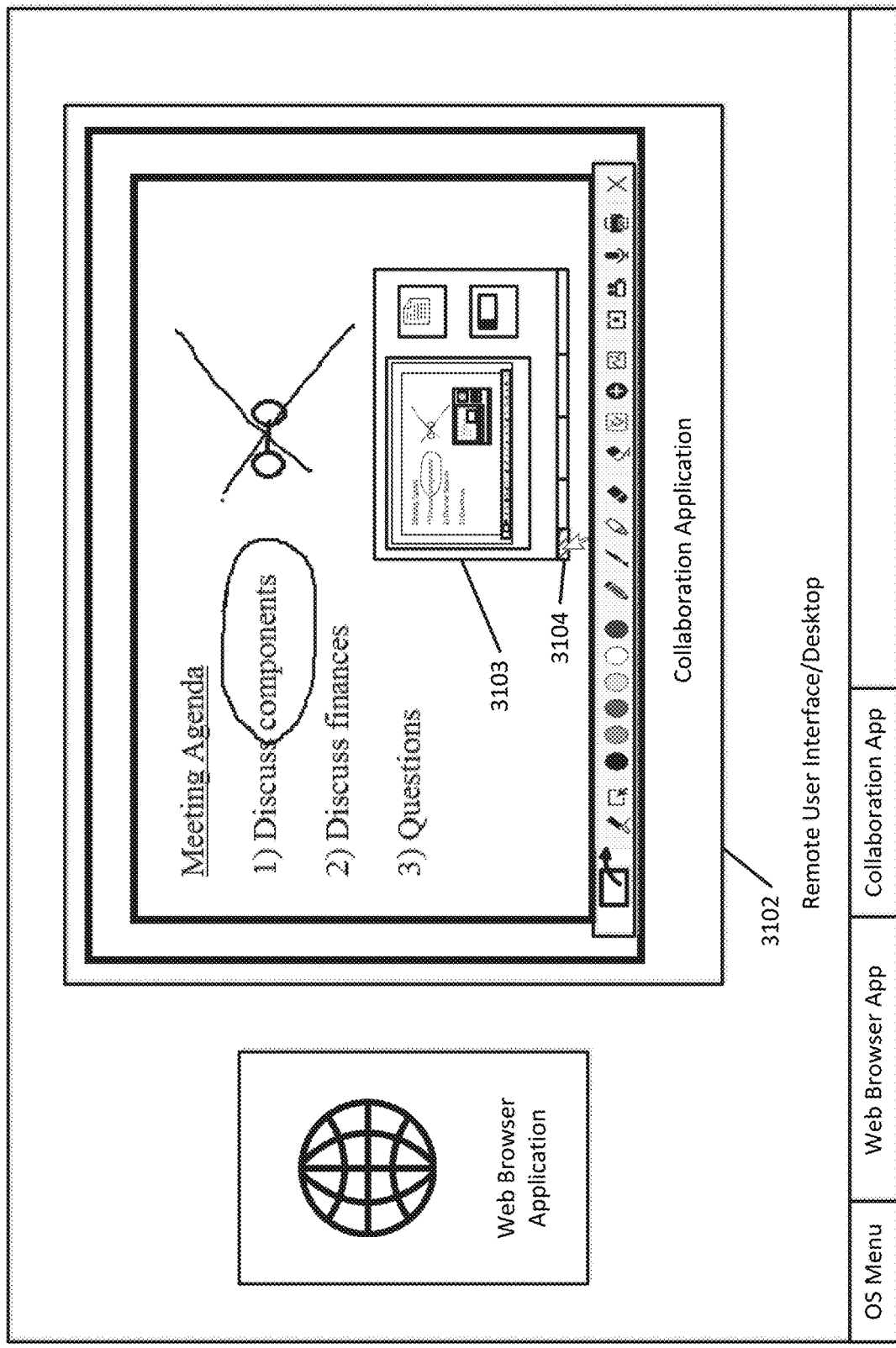
Figure 31C:
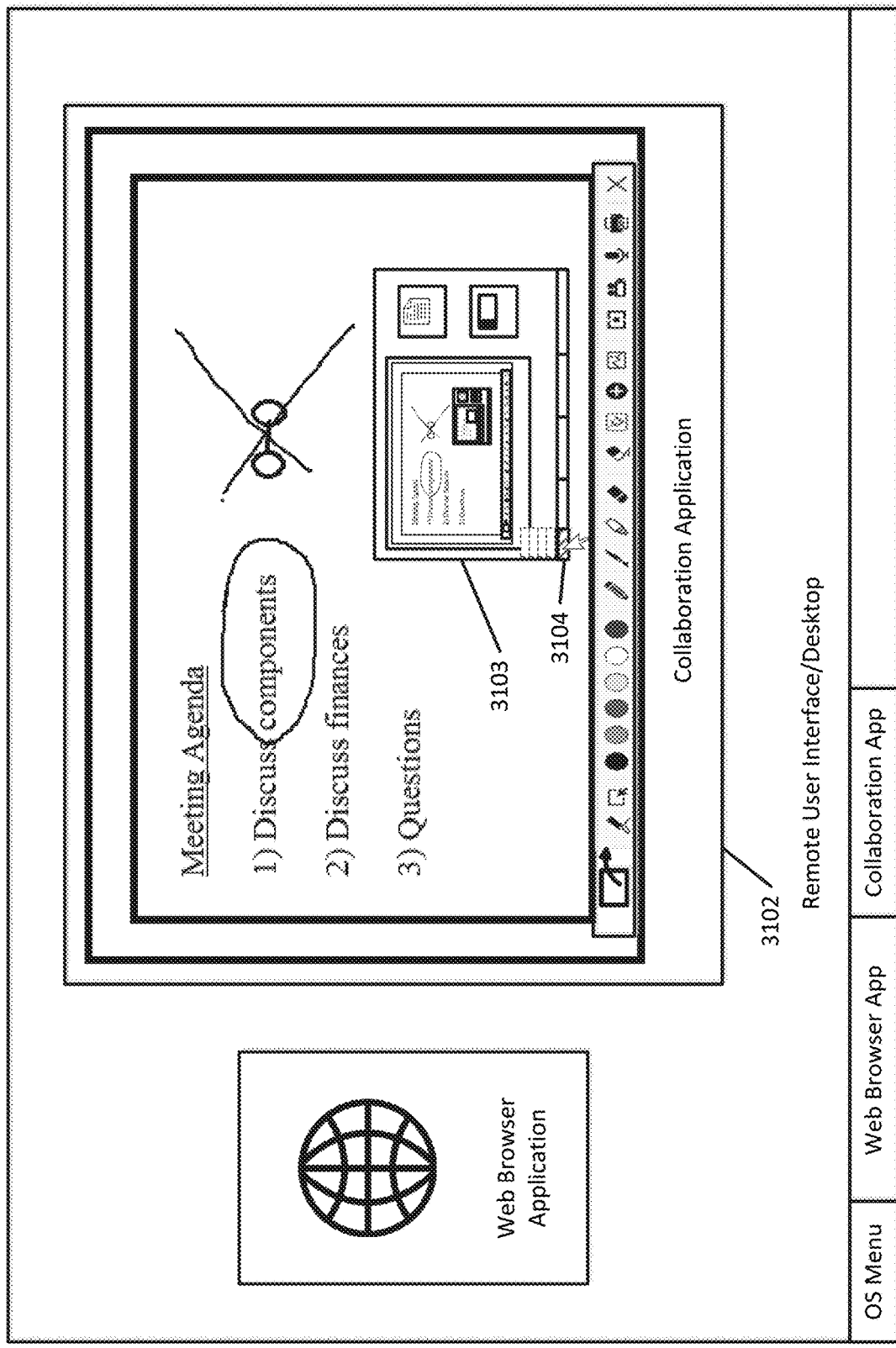

FIGS. 31A-31C illustrate an example of controlling a desktop or portion of a desktop via an embedded streaming object from a remote computing device according to an exemplary embodiment.

As shown in FIG. 31A, the remote user interface (desktop) 3101 includes a collaboration application 3102 displaying a representation of a collaboration workspace. The representation includes an inserted/embedded streaming object 3103 which is streaming a local desktop (as used herein, "local" refers to the device that instantiated the streaming object and which is sharing its desktop or a portion of its desktop). The remote user interface 3101 also includes a task bar and a window corresponding to a web browser application that is running on the remote desktop. As shown in the figure, the mouse pointer is over a button 3104 within the inserted streaming object 3103 that corresponds to an OS Menu button within the local desktop that is being streamed.

FIG. 31B illustrates the result of the user clicking at the location of the button 3104 within the streaming object 3103. As a result of that input, which is detected by the remote transparent layer, the location of the input within the streaming object 3103 is mapped to a corresponding location within the local desktop being streamed. The remote transparent layer then sends commands to the local transparent layer on the local computing device to cause an input at the corresponding location within the local desktop. Since the corresponding location is OS Menu button of local desktop, this input results in the remote transparent layer sending command(s) to the local transparent layer, which itself sends commands to the local OS to activate OS Menu button of local desktop. This change in the local desktop is captured by the streaming object 3103, which shows button 3104 within the inserted streaming object being activated. Note that the remote desktop 3101 is not affected by this input (other than the update to the streaming object 3103) since the inserted streaming object is not streaming the remote desktop but rather a different desktop associated with the local computing device.

FIG. 31C illustrates the interface 3101 and inserted streaming object 3103 after the input is carried through to the local desktop. At the time shown in FIG. 31C, the local OS Menu in the local desktop being streamed is opened and includes a list of selectable indicators. This change is consequently captured by the inserted streaming object 3103, which itself shows a corresponding opening of button 3104 to include a list of selectable indicators.

As shown above, the transparent layer can be used to control a remote desktop through the embedded streaming object. This effectively provides a user participating in the collaboration session with a remote control interface that allows them to stay within the collaboration session and at the same time navigate the desktop or applications of other participants within the collaboration workspace. For example, if two participants were presenting a presentation to a group of other participants, a first presenting participant could share a presentation application on their desktop and explain a first set of slides shared with a streaming object in the collaboration workspace. The first presenting participant could then "yield" control of the presentation application to a second presenting participant, who could remotely control the presentation application on the first presenting participant's desktop.

Optionally, the remote control functionality can include permissions, authentication, or some other access control mechanism that allows each participant to configure whether other participants can remotely control their shared desktop through a streaming object and which participants may remotely control their shared desktop. For example, each user can store preferences indicated whether they allow their local desktop or a portion of their local desktop to be controlled by other participants. These preferences can be stored at each computing device (and can be accessible to the transparent layer and used by transparent layer to allow or block remote control inputs) or can be stored at the server and used by the server to allow or block remote control inputs between computing devices. Regardless of how these access control mechanisms are stored, they can be used to determine whether a remote participant can provide input to another participant's desktop via an inserted streaming object.

Figure 32:
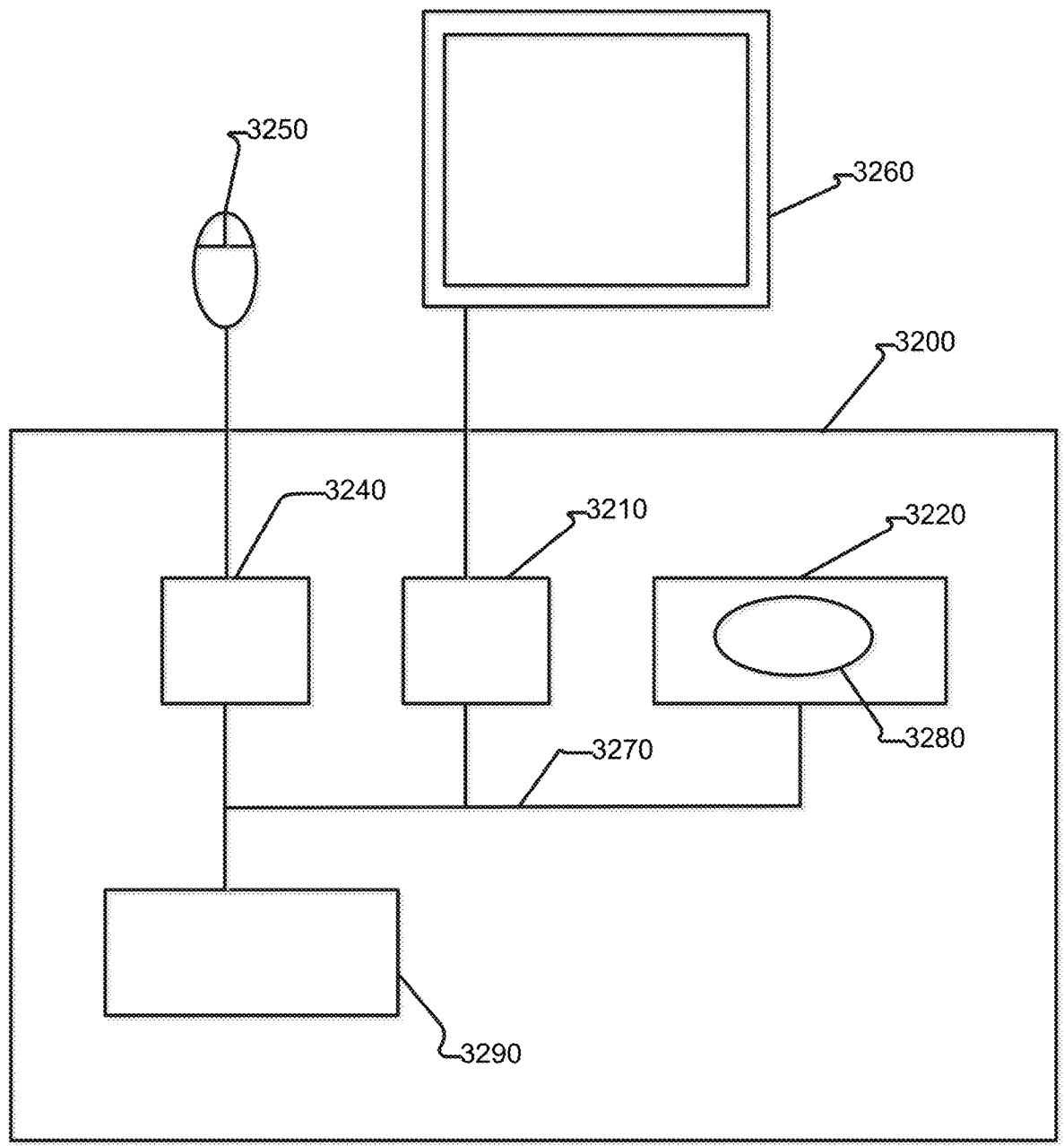
FIG. 32 illustrates an exemplary computing environment configured to carry out the disclosed methods.

One or more of the above-described techniques can be implemented in or involve one or more computer systems. FIG. 32 illustrates an example of a specialized computing environment 3200. The computing environment 3200 is not intended to suggest any limitation as to scope of use or functionality of a described embodiment(s).

With reference to FIG. 32, the computing environment 3200 includes at least one processing unit 3210 and memory 3220. The processing unit 3210 executes computer-executable instructions and can be a real or a virtual processor. In a multi-processing system, multiple processing units execute computer-executable instructions to increase processing power. The memory 3220 can be volatile memory (e.g., registers, cache, RAM), non-volatile memory (e.g., ROM, EEPROM, flash memory, etc.), or some combination of the two. The memory 3220 can store software 3280 implementing described techniques.

A computing environment can have additional features. For example, the computing environment 3200 includes storage 3240, one or more input devices 3250, one or more output devices 3260, and one or more communication connections 3290. An interconnection mechanism 3270, such as a bus, controller, or network interconnects the components of the computing environment 3200. Typically, operating system software or firmware (not shown) provides an operating environment for other software executing in the computing environment 3200, and coordinates activities of the components of the computing environment 3200.

The storage 3240 can be removable or non-removable, and includes magnetic disks, magnetic tapes or cassettes, CD-ROMs, CD-RWs, DVDs, or any other medium which can be used to store information and which can be accessed within the computing environment 3200. The storage 3240 can store instructions for the software 3280.

The input device(s) 3250 can be a touch input device such as a keyboard, mouse, pen, trackball, touch screen, or game controller, a voice input device, a scanning device, a digital camera, remote control, or another device that provides input to the computing environment 3200. The output device(s) 3260 can be a display, television, monitor, printer, speaker, or another device that provides output from the computing environment 3200.

The communication connection(s) 3290 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 3200, computer-readable media include memory 3220, storage 3240, communication media, and combinations of any of the above.

Of course, FIG. 32 illustrates computing environment 3200, display device 3260, and input device 3250 as separate devices for ease of identification only. Computing environment 3200, display device 3260, and input device 3250 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 3200 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method for desktop sharing over a web socket connection in a networked collaboration workspace, the method comprising:
    transmitting, on a user interface of a local computing device, a representation of a collaboration workspace hosted on a server and accessible to a plurality of participants on a plurality of computing devices over a web socket connection;
    receiving, by the local computing device, a request to share an entire local desktop of the local computing device within the collaboration workspace at a selected area within the representation of the collaboration workspace, wherein the selected area is smaller than the representation of the collaboration workspace;
    generating, by the local computing device, a streaming object configured to output a video stream of the entire local desktop of the local computing device by identifying a source identifier corresponding to the entire local desktop, retrieving a media stream corresponding to the identified source identifier, and instantiating a media stream object linked to the media stream and having spatial attributes corresponding to the selected area within the representation of the collaboration workspace, wherein the streaming object comprises a media stream configured to duplicate the entire local desktop; and
    transmitting, by the local computing device, one or more commands to the server over the web socket connection, the one or more commands comprising the streaming object and information corresponding to the selected area and being configured to cause the server to embed the streaming object into the collaboration workspace, wherein a spatial location of the streaming object within the collaboration workspace corresponds to the selected area and is independent of a position of the entire local desktop relative to the collaboration workspace and wherein the user interface renders both the entire local desktop and the streaming object duplicating the entire local desktop within the collaboration workspace.

2. The method of claim 1, wherein user input at a position within the streaming object within the collaboration workspace results in a corresponding user input being applied at a corresponding position within the entire local desktop.

3. The method of claim 2, wherein the user input comprises input from a remote user of a remote computing device in the plurality of computing devices.

4. The method of claim 2, wherein the user input comprises input from a local user of the local computing device.

5. The method of claim 1, wherein the inserted streaming object is configured to receive the video stream of the entire local desktop of the local computing device and transmit the video stream of the entire local desktop of the local computing device to the plurality of computing devices over the web socket connection.

6. The method of claim 1, further comprising:
    transmitting, on the user interface of the local computing device, the inserted streaming object within the representation of the collaboration workspace, the inserted streaming object being associated with a network address of a source of the video stream; and
    detecting, by a transparent layer executing on the local computing device, a user input associated with the inserted streaming object, the user input corresponding to a location within the entire local desktop, wherein the transparent layer comprises an application programming interface (API) configured to interface with one or more of: an operating system or one or more applications configured to execute on the operating system;
    determining, by the transparent layer executing on the local computing device, that the network address associated with the inserted streaming object corresponds to a network address of the local computing device; and
    transmitting, by the transparent layer executing on the local computing device, one or more second commands to one or more of: the operating system or one or more applications configured to execute on the operating system, the one or more second commands being configured to perform the user input at the location within the entire local desktop.

7. The method of claim 1, further comprising:
    transmitting, on a remote user interface of a remote computing device in the plurality of computing devices, the inserted streaming object within a remote representation of the collaboration workspace, the inserted streaming object being associated with a network address of a source of the video stream; and
    detecting, by a remote transparent layer executing on the remote computing device, a remote user input associated with the inserted streaming object, the remote user input corresponding to a location within the entire local desktop, wherein the transparent layer comprises an application programming interface (API) configured to interface with one or more of: an operating system or one or more applications configured to execute on the operating system;
    determining, by the remote transparent layer executing on the remote computing device, that the network address associated with the inserted streaming object does not correspond to a network address of the remote computing device; and
    transmitting, by the remote transparent layer executing on the remote computing device, one or more second commands to the local computing device over the web socket connection, the one or more second commands being configured to cause a local transparent layer executing on the local computing device to cause performance of the user input at the location within the entire local desktop.

8. A local computing device for desktop sharing over a web socket connection in a networked collaboration workspace, the local computing device comprising:
    one or more processors; and
    one or more memories operatively coupled to at least one of the one or more processors and having instructions stored thereon that, when executed by at least one of the one or more processors, cause at least one of the one or more processors to:

transmit, on a user interface of a local computing device, a representation of a collaboration workspace hosted on a server and accessible to a plurality of participants on a plurality of computing devices over a web socket connection;

receive, by the local computing device, a request to share an entire local desktop of the local computing device within the collaboration workspace at a selected area within the representation of the collaboration workspace, wherein the selected area is smaller than the representation of the collaboration workspace; generate, by the local computing device, a streaming object configured to output a video stream of the the entire local desktop of the local computing device by identifying a source identifier corresponding to the entire local desktop, retrieving a media stream corresponding to the identified source identifier, and instantiating a media stream object linked to the media stream and having spatial attributes corresponding to the selected area within the representation of the collaboration workspace, wherein the streaming object comprises a media stream configured to duplicate the entire local desktop; and transmit, by the local computing device, one or more commands to the server over the web socket connection, the one or more commands comprising the streaming object and information corresponding to the selected area and being configured to cause the server to embed the streaming object into the collaboration workspace, wherein a spatial location of the streaming object within the collaboration workspace corresponds to the selected area and is independent of a position of the entire local desktop relative to the collaboration workspace and wherein the user interface renders both the entire local desktop and the streaming object duplicating the entire local desktop within the collaboration workspace.

9. The local computing device of claim 8, wherein user input at a position within the streaming object within the collaboration workspace results in a corresponding user input being applied at a corresponding position within the entire local desktop.

10. The local computing device of claim 9, wherein the user input comprises input from a remote user of a remote computing device in the plurality of computing devices.

11. The local computing device of claim 9, wherein the user input comprises input from a local user of the local computing device.

12. The local computing device of claim 8, wherein the inserted streaming object is configured to receive the video stream of the entire local desktop of the local computing device and transmit the video stream of the entire local desktop of the local computing device to the plurality of computing devices over the web socket connection.

13. The local computing device of claim 8, wherein at least one of the one or more memories has further instructions stored thereon that, when executed by at least one of the one or more processors, cause at least one of the one or more processors to:

transmit, on the user interface of the local computing device, the inserted streaming object within the representation of the collaboration workspace, the inserted streaming object being associated with a network address of a source of the video stream; and detect, by a transparent layer executing on the local computing device, a user input associated with the inserted streaming object, the user input corresponding to a location within the entire local desktop, wherein the transparent layer comprises an application programming interface (API) configured to interface with one or more of: an operating system or one or more applications configured to execute on the operating system;

determine, by the transparent layer executing on the local computing device, that the network address associated with the inserted streaming object corresponds to a network address of the local computing device; and transmit, by the transparent layer executing on the local computing device, one or more second commands to one or more of: the operating system or one or more applications configured to execute on the operating system, the one or more second commands being configured to perform the user input at the location within the entire local desktop.

14. At least one non-transitory computer-readable medium storing computer-readable instructions that, when executed by a local computing device, cause the local computing device to:

transmit, on a user interface of a local computing device, a representation of a collaboration workspace hosted on a server and accessible to a plurality of participants on a plurality of computing devices over a web socket connection;

receive, by the local computing device, a request to share an entire local desktop of the local computing device within the collaboration workspace at a selected area within the representation of the collaboration workspace, wherein the selected area is smaller than the representation of the collaboration workspace;

generate, by the local computing device, a streaming object configured to output a video stream of the entire local desktop of the local computing device by identifying a source identifier corresponding to the entire local desktop, retrieving a media stream corresponding to the identified source identifier, and instantiating a media stream object linked to the media stream and having spatial attributes corresponding to the selected area within the representation of the collaboration workspace, wherein the streaming object comprises a media stream configured to duplicate the entire local desktop; and transmit, by the local computing device, one or more commands to the server over the web socket connection, the one or more commands comprising the streaming object and information corresponding to the selected area and being configured to cause the server to embed the streaming object into the collaboration workspace, wherein a spatial location of the streaming object within the collaboration workspace corresponds to the selected area and is independent of a position of the entire local desktop relative to the collaboration workspace and wherein the user interface renders both the entire local desktop and the streaming object duplicating the entire local desktop within the collaboration workspace.

15. The at least one non-transitory computer-readable medium of claim 14, wherein user input at a position within the streaming object within the collaboration workspace results in a corresponding user input being applied at a corresponding position within the entire local desktop.

16. The at least one non-transitory computer-readable medium of claim 15, wherein the user input comprises input from a remote user of a remote computing device in the plurality of computing devices.

17. The at least one non-transitory computer-readable medium of claim 15, wherein the user input comprises input from a local user of the local computing device.

18. The at least one non-transitory computer-readable medium of claim 14, wherein the inserted streaming object is configured to receive the video stream of the entire local desktop of the local computing device and transmit the video stream of the entire local desktop of the local computing device to the plurality of computing devices over the web socket connection.

19. The at least one non-transitory computer-readable medium of claim 14, further storing computer-readable instructions that, when executed by the local computing device, cause the local computing device to:
- transmit, on the user interface of the local computing device, the inserted streaming object within the representation of the collaboration workspace, the inserted streaming object being associated with a network address of a source of the video stream; and
- detect, by a transparent layer executing on the local computing device, a user input associated with the inserted streaming object, the user input corresponding to a location within the entire local desktop, wherein the transparent layer comprises an application programming interface (API) configured to interface with one or more of: an operating system or one or more applications configured to execute on the operating system;
- determine, by the transparent layer executing on the local computing device, that the network address associated with the inserted streaming object corresponds to a network address of the local computing device; and
- transmit, by the transparent layer executing on the local computing device, one or more second commands to one or more of: the operating system or one or more applications configured to execute on the operating system, the one or more second commands being configured to perform the user input at the location within the entire local desktop.

20. The at least one non-transitory computer-readable medium of claim 14, further storing computer-readable instructions that, when executed by a remote computing device in the plurality of computing devices, cause the remote computing device to:
- transmit, on a remote user interface of the remote computing device, the inserted streaming object within a remote representation of the collaboration workspace, the inserted streaming object being associated with a network address of a source of the video stream; and
- detect, by a remote transparent layer executing on the remote computing device, a remote user input associated with the inserted streaming object, the remote user input corresponding to a location within the entire local desktop, wherein the transparent layer comprises an application programming interface (API) configured to interface with one or more of: an operating system or one or more applications configured to execute on the operating system;
- determine, by the remote transparent layer executing on the remote computing device, that the network address associated with the inserted streaming object does not correspond to a network address of the remote computing device; and
- transmit, by the remote transparent layer executing on the remote computing device, one or more second commands to the local computing device over the web socket connection, the one or more second commands being configured to cause a local transparent layer executing on the local computing device to cause performance of the user input at the location within the entire local desktop.

* * * * *